US012701078B2

(12) United States Patent
Rampura Chandraprabhuraju

(10) Patent No.: US 12,701,078 B2
(45) Date of Patent: Aug. 4, 2026

(54) TECHNIQUES FOR ROUTING PACKETS IN OVERLAY NETWORKS

(71) Applicant: Oracle International Corporation, Redwood Shores, CA (US)

(72) Inventor: Siddharth Rampura Chandraprabhuraju, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 433 days.

(21) Appl. No.: 18/523,550

(22) Filed: Nov. 29, 2023

(65) Prior Publication Data

US 2025/0175421 A1      May 29, 2025

(51) Int. Cl.
H04L 45/64          (2022.01)
H04L 12/46          (2006.01)
H04L 45/74          (2022.01)

(52) U.S. Cl.
CPC .............. H04L 45/64 (2013.01); H04L 45/74 (2013.01); H04L 12/4633 (2013.01)

(58) Field of Classification Search
None
See application file for complete search history.

(56) References Cited

U.S. PATENT DOCUMENTS

| | | |
|---|---|---|
| 2014/0269712 A1 | 9/2014 | Kidambi |
| 2015/0350069 A1* | 12/2015 | Padgett ................... H04L 45/72 |
| | | 370/236 |
| 2018/0102920 A1 | 4/2018 | Benny et al. |
| 2020/0036610 A1* | 1/2020 | Indiresan ................ H04L 63/20 |

OTHER PUBLICATIONS

"The Locator/ID Separation Protocol (LISP) (RFC9300)", Internet Society RFC, D. Farinacci, et al., Nov. 19, 2022 (Year: 2022).*
"Oracle Cloud Infrastructure Documentation—Access to Other VCNs: Peering", 5 pages, Mar. 15, 2023 (Year: 2023).*
Application No. PCT/US2024/055359 , International Search Report and Written Opinion, Mailed On Feb. 20, 2025, 12 pages.

* cited by examiner

*Primary Examiner* — Walter J Divito
(74) *Attorney, Agent, or Firm* — Kilpatrick Townsend & Stockton LLP

(57)          ABSTRACT

Novel techniques are described for routing of overlay packets within overlay networks in a cloud environment. A network device, located in the data path between a compute instance in an overlay network that is the source of a packet and a compute instance in the overlay network that is the intended destination of the packet, is able to route the packet using only special encoded information included in the packet's header when the packet is received by the network device. The special encoded information is in the form of a special encoded address (e.g., an encoded IP address) that is included in a field of the packet's header. The special encoded address encodes various different pieces of information that are used by the network devices in the data path from the source compute instance to the destination compute instance to route the packet in the overlay network.

20 Claims, 24 Drawing Sheets

ENCODED IP ADDRESS 1000

| REGIONAL PREFIX 1002 | OVERLAY IP UID 1004 | SUBSTRATE IP 1006 | VNIC UID 1008 |
|---|---|---|---|

OVERLAY PACKET HEADER 802

| 810 SRC ADDR: CLIENT IP | 812 DST ADDR: SERVER ENCODED ADDR | 814 PROTO: TCP | 816 SRC PORT: CLIENT PORT | 818 DST PORT: SERVER PORT |
|---|---|---|---|---|

ENCAPSULATION HEADER 806

| 820 SRC SUB ADDR: CLIENT SUBSTRATE IP | 822 DST SUB ADDR: SERVER SUBSTRATE IP | 824 DST VNIC: SERVER VNIC_UID |
|---|---|---|

OVERLAY PACKET HEADER 804

| 810 SRC ADDR: CLIENT ENCODED ADDR | 812 DST ADDR: SERVER ENCODED ADDR | 814 PROTO: TCP | 816 SRC PORT: CLIENT PORT | 818 DST PORT: SERVER PORT |
|---|---|---|---|---|

OVERLAY PACKET HEADER 808

| 810 SRC ADDR: CLIENT ENCODED ADDR | 812 DST ADDR: SERVER IP | 814 PROTO: TCP | 816 SRC PORT: CLIENT PORT | 818 DST PORT: SERVER PORT |
|---|---|---|---|---|

*FIG. 8*

ENCODED IP ADDRESS 1000

| REGIONAL PREFIX 1002 | OVERLAY IP UID 1004 | SUBSTRATE IP 1006 | VNIC UID 1008 |
|---|---|---|---|

*FIG. 10*

Figure 11:
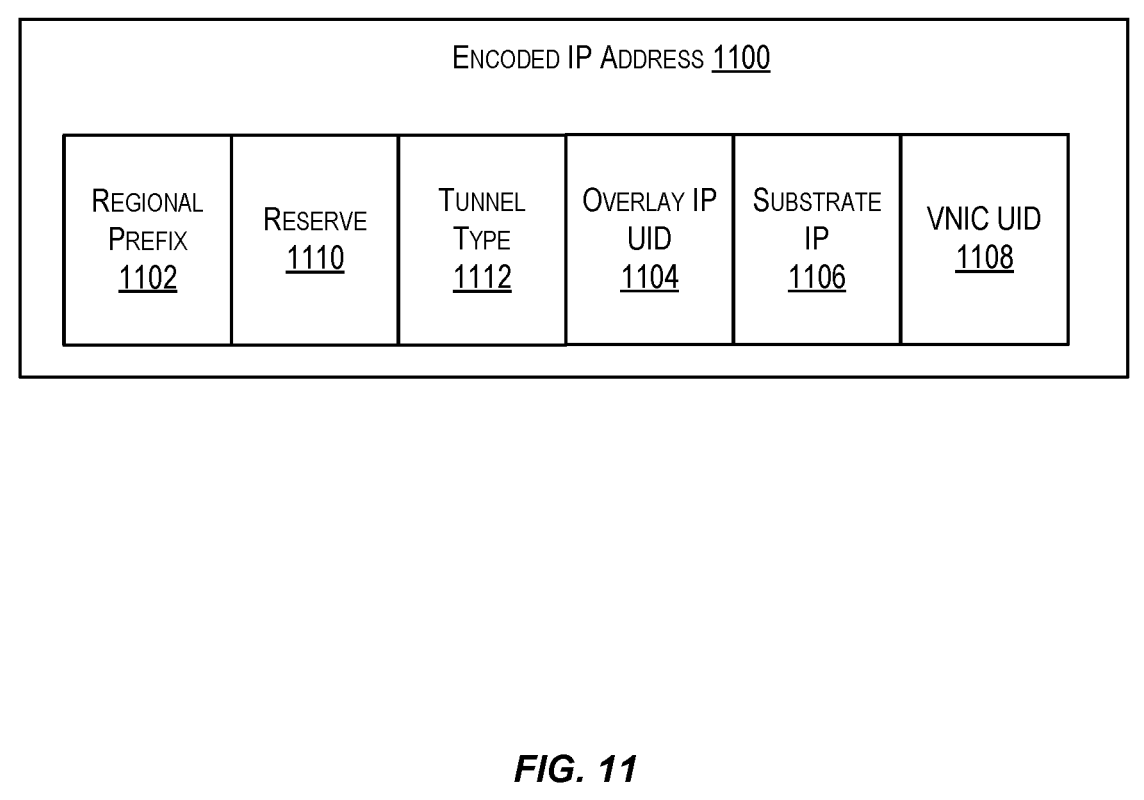

ENCODED IP ADDRESS 1100

| REGIONAL PREFIX 1102 | RESERVE 1110 | TUNNEL TYPE 1112 | OVERLAY IP UID 1104 | SUBSTRATE IP 1106 | VNIC UID 1108 |
|---|---|---|---|---|---|

Figure 12:
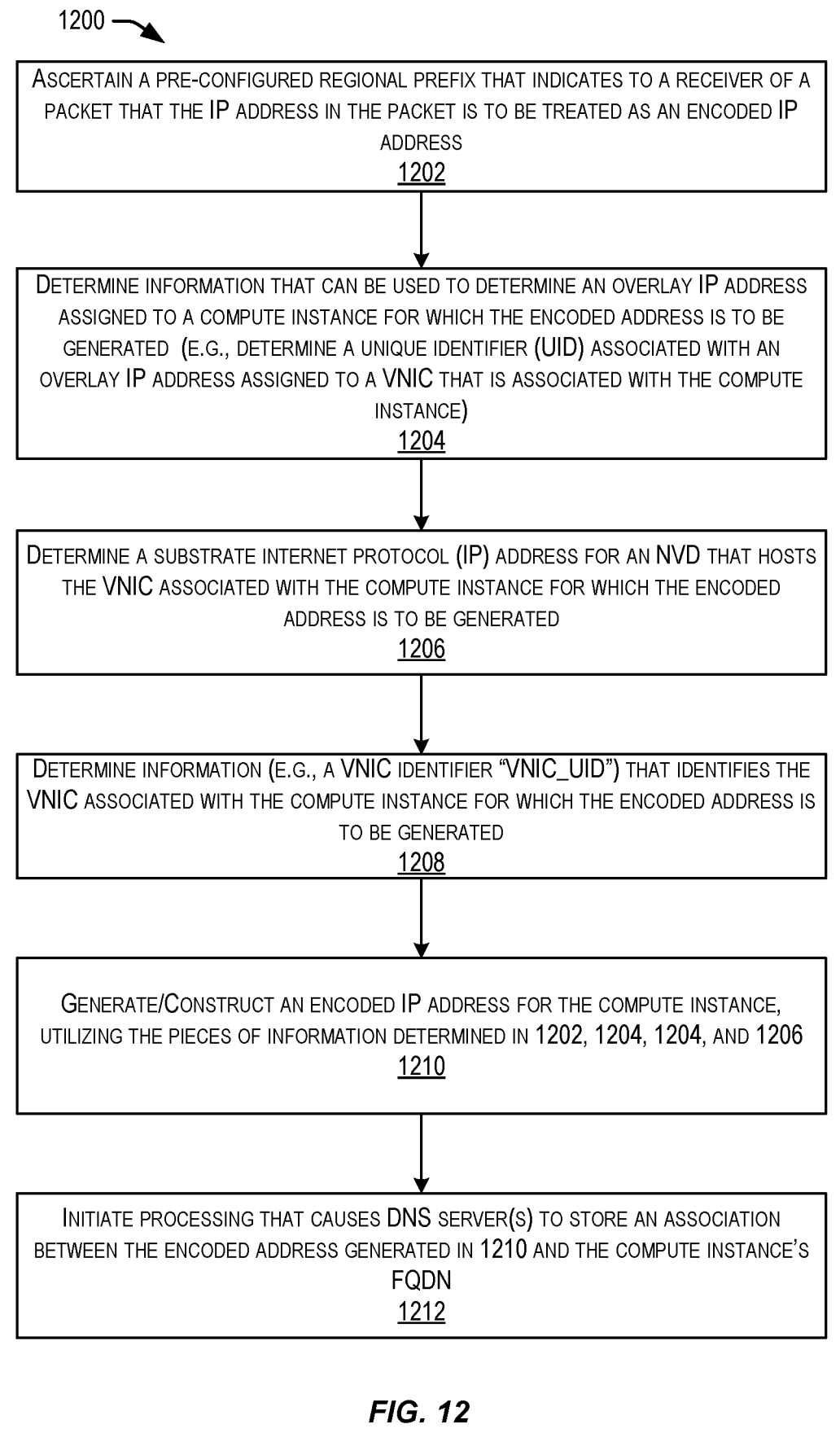

ASCERTAIN A PRE-CONFIGURED REGIONAL PREFIX THAT INDICATES TO A RECEIVER OF A PACKET THAT THE IP ADDRESS IN THE PACKET IS TO BE TREATED AS AN ENCODED IP ADDRESS
1202

DETERMINE INFORMATION THAT CAN BE USED TO DETERMINE AN OVERLAY IP ADDRESS ASSIGNED TO A COMPUTE INSTANCE FOR WHICH THE ENCODED ADDRESS IS TO BE GENERATED (E.G., DETERMINE A UNIQUE IDENTIFIER (UID) ASSOCIATED WITH AN OVERLAY IP ADDRESS ASSIGNED TO A VNIC THAT IS ASSOCIATED WITH THE COMPUTE INSTANCE)
1204

DETERMINE A SUBSTRATE INTERNET PROTOCOL (IP) ADDRESS FOR AN NVD THAT HOSTS THE VNIC ASSOCIATED WITH THE COMPUTE INSTANCE FOR WHICH THE ENCODED ADDRESS IS TO BE GENERATED
1206

DETERMINE INFORMATION (E.G., A VNIC IDENTIFIER "VNIC_UID") THAT IDENTIFIES THE VNIC ASSOCIATED WITH THE COMPUTE INSTANCE FOR WHICH THE ENCODED ADDRESS IS TO BE GENERATED
1208

GENERATE/CONSTRUCT AN ENCODED IP ADDRESS FOR THE COMPUTE INSTANCE, UTILIZING THE PIECES OF INFORMATION DETERMINED IN 1202, 1204, 1204, AND 1206
1210

INITIATE PROCESSING THAT CAUSES DNS SERVER(S) TO STORE AN ASSOCIATION BETWEEN THE ENCODED ADDRESS GENERATED IN 1210 AND THE COMPUTE INSTANCE'S FQDN
1212

Figure 13A:
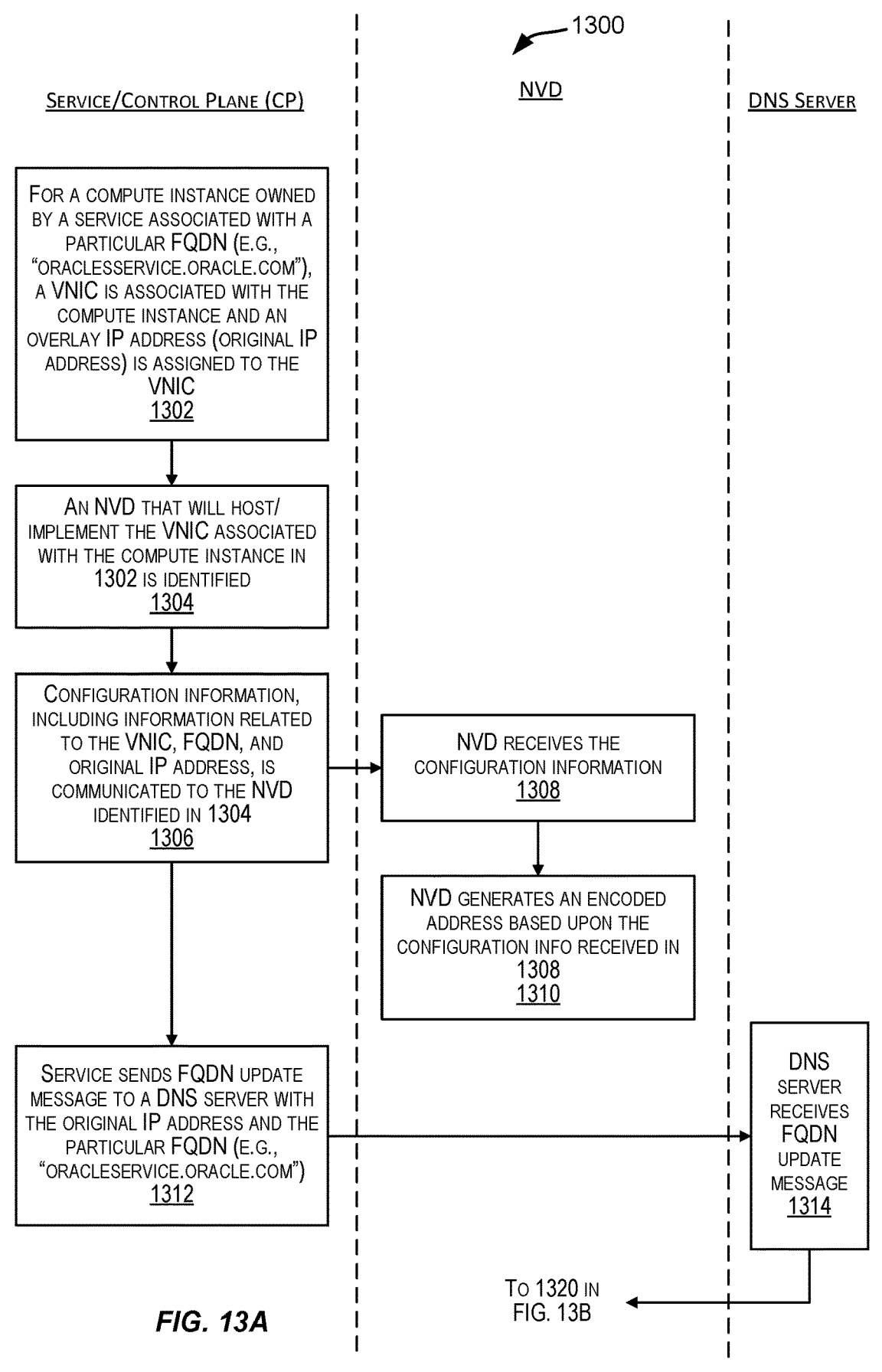

SERVICE/CONTROL PLANE (CP)     NVD     DNS SERVER

FOR A COMPUTE INSTANCE OWNED BY A SERVICE ASSOCIATED WITH A PARTICULAR FQDN (E.G., "ORACLESSERVICE.ORACLE.COM"), A VNIC IS ASSOCIATED WITH THE COMPUTE INSTANCE AND AN OVERLAY IP ADDRESS (ORIGINAL IP ADDRESS) IS ASSIGNED TO THE VNIC
1302

AN NVD THAT WILL HOST/ IMPLEMENT THE VNIC ASSOCIATED WITH THE COMPUTE INSTANCE IN 1302 IS IDENTIFIED
1304

CONFIGURATION INFORMATION, INCLUDING INFORMATION RELATED TO THE VNIC, FQDN, AND ORIGINAL IP ADDRESS, IS COMMUNICATED TO THE NVD IDENTIFIED IN 1304
1306

NVD RECEIVES THE CONFIGURATION INFORMATION
1308

NVD GENERATES AN ENCODED ADDRESS BASED UPON THE CONFIGURATION INFO RECEIVED IN 1308
1310

SERVICE SENDS FQDN UPDATE MESSAGE TO A DNS SERVER WITH THE ORIGINAL IP ADDRESS AND THE PARTICULAR FQDN (E.G., "ORACLESERVICE.ORACLE.COM")
1312

DNS SERVER RECEIVES FQDN UPDATE MESSAGE
1314

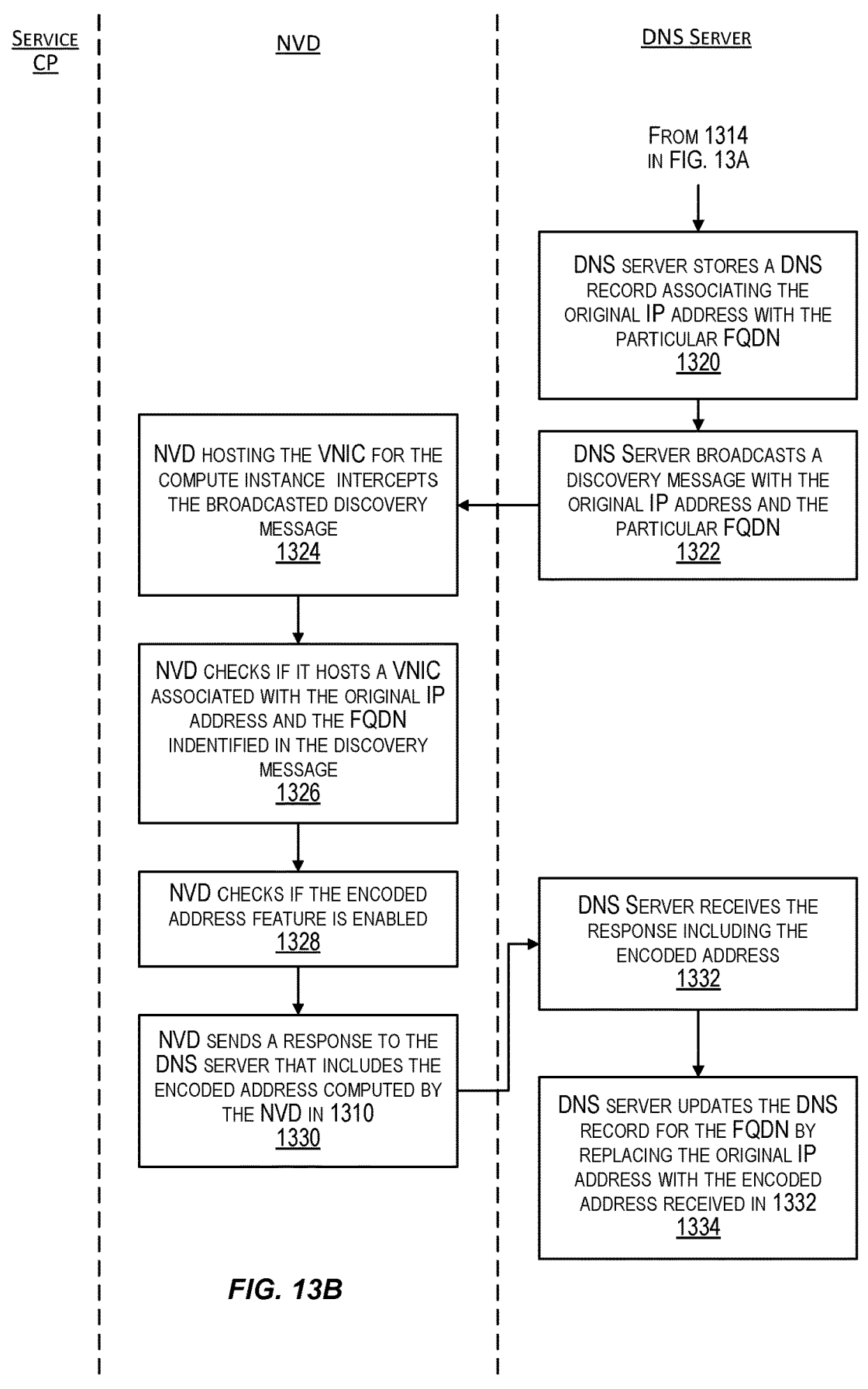

SERVICE
CP

NVD

DNS SERVER

FROM 1314
IN FIG. 13A

DNS SERVER STORES A DNS
RECORD ASSOCIATING THE
ORIGINAL IP ADDRESS WITH THE
PARTICULAR FQDN
1320

NVD HOSTING THE VNIC FOR THE
COMPUTE INSTANCE INTERCEPTS
THE BROADCASTED DISCOVERY
MESSAGE
1324

DNS SERVER BROADCASTS A
DISCOVERY MESSAGE WITH THE
ORIGINAL IP ADDRESS AND THE
PARTICULAR FQDN
1322

NVD CHECKS IF IT HOSTS A VNIC
ASSOCIATED WITH THE ORIGINAL IP
ADDRESS AND THE FQDN
INDENTIFIED IN THE DISCOVERY
MESSAGE
1326

NVD CHECKS IF THE ENCODED
ADDRESS FEATURE IS ENABLED
1328

DNS SERVER RECEIVES THE
RESPONSE INCLUDING THE
ENCODED ADDRESS
1332

NVD SENDS A RESPONSE TO THE
DNS SERVER THAT INCLUDES THE
ENCODED ADDRESS COMPUTED BY
THE NVD IN 1310
1330

DNS SERVER UPDATES THE DNS
RECORD FOR THE FQDN BY
REPLACING THE ORIGINAL IP
ADDRESS WITH THE ENCODED
ADDRESS RECEIVED IN 1332
1334

*FIG. 13B*

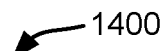

—1400

CREATE OVERLAY PACKET TO BE COMMUNICATED FROM A SOURCE COMPUTE
INSTANCE TO A DESTINATION COMPUTE INSTANCE
1402

OBTAIN AN ENCODED IP ADDRESS FOR THE DESTINATION COMPUTE INSTANCE
1404

CONFIGURE PACKET HEADER OF THE OVERLAY PACKET FOR COMMUNICATION TO
THE DESTINATION COMPUTE INSTANCE
1406

SET PACKET HEADER FIELDS OF OVERLAY PACKET (1408):
(1) SOURCE ADDRESS FIELD = OVERLAY IP ADDRESS OF SOURCE COMPUTE
INSTANCE
(2) DESTINATION ADDRESS FIELD = ENCODED ADDRESS OBTAINED IN 1404
FOR THE DESTINATION COMPUTE INSTANCE
(3) PROTOCOL FIELD = TCP
(4) SOURCE PORT = PORT ASSOCIATED WITH SOURCE COMPUTE INSTANCE
(5) DESTINATION PORT = PORT ASSOCIATED WITH DESTINATION COMPUTE
INSTANCE

COMMUNICATE OVERLAY PACKET FROM SOURCE HOST MACHINE TO THE SOURCE
NVD THAT HOSTS THE VNIC (SOURCE VNIC) ASSOCIATED WITH THE SOURCE
COMPUTE INSTANCE
1410

*FIG. 14*

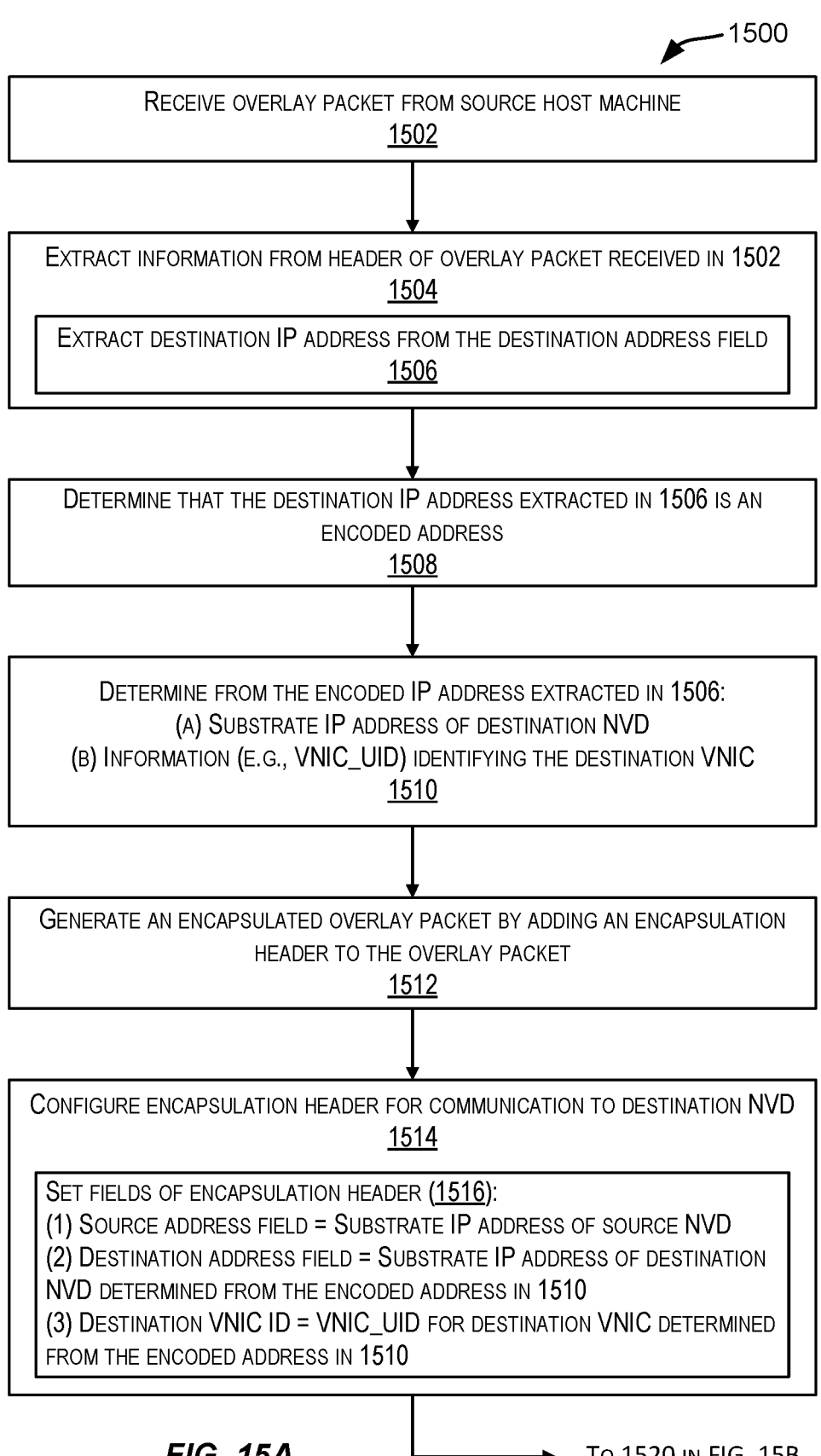

┌─────────────────────────────────────────────────────────┐
│ RECEIVE OVERLAY PACKET FROM SOURCE HOST MACHINE          │
│ 1502                                                    │
└─────────────────────────────────────────────────────────┘

┌─────────────────────────────────────────────────────────┐
│ EXTRACT INFORMATION FROM HEADER OF OVERLAY PACKET RECEIVED IN 1502 │
│ 1504                                                    │
│  ┌───────────────────────────────────────────────────┐  │
│  │ EXTRACT DESTINATION IP ADDRESS FROM THE DESTINATION ADDRESS FIELD │
│  │ 1506                                              │  │
│  └───────────────────────────────────────────────────┘  │
└─────────────────────────────────────────────────────────┘

┌─────────────────────────────────────────────────────────┐
│ DETERMINE THAT THE DESTINATION IP ADDRESS EXTRACTED IN 1506 IS AN │
│ ENCODED ADDRESS                                         │
│ 1508                                                    │
└─────────────────────────────────────────────────────────┘

┌─────────────────────────────────────────────────────────┐
│ DETERMINE FROM THE ENCODED IP ADDRESS EXTRACTED IN 1506: │
│ (A) SUBSTRATE IP ADDRESS OF DESTINATION NVD             │
│ (B) INFORMATION (E.G., VNIC_UID) IDENTIFYING THE DESTINATION VNIC │
│ 1510                                                    │
└─────────────────────────────────────────────────────────┘

┌─────────────────────────────────────────────────────────┐
│ GENERATE AN ENCAPSULATED OVERLAY PACKET BY ADDING AN ENCAPSULATION │
│ HEADER TO THE OVERLAY PACKET                            │
│ 1512                                                    │
└─────────────────────────────────────────────────────────┘

┌─────────────────────────────────────────────────────────┐
│ CONFIGURE ENCAPSULATION HEADER FOR COMMUNICATION TO DESTINATION NVD │
│ 1514                                                    │
│  ┌───────────────────────────────────────────────────┐  │
│  │ SET FIELDS OF ENCAPSULATION HEADER (1516):        │  │
│  │ (1) SOURCE ADDRESS FIELD = SUBSTRATE IP ADDRESS OF SOURCE NVD │
│  │ (2) DESTINATION ADDRESS FIELD = SUBSTRATE IP ADDRESS OF DESTINATION │
│  │ NVD DETERMINED FROM THE ENCODED ADDRESS IN 1510   │  │
│  │ (3) DESTINATION VNIC ID = VNIC_UID FOR DESTINATION VNIC DETERMINED │
│  │ FROM THE ENCODED ADDRESS IN 1510                  │  │
│  └───────────────────────────────────────────────────┘  │
└─────────────────────────────────────────────────────────┘

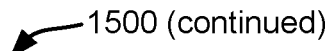

1500 (continued)

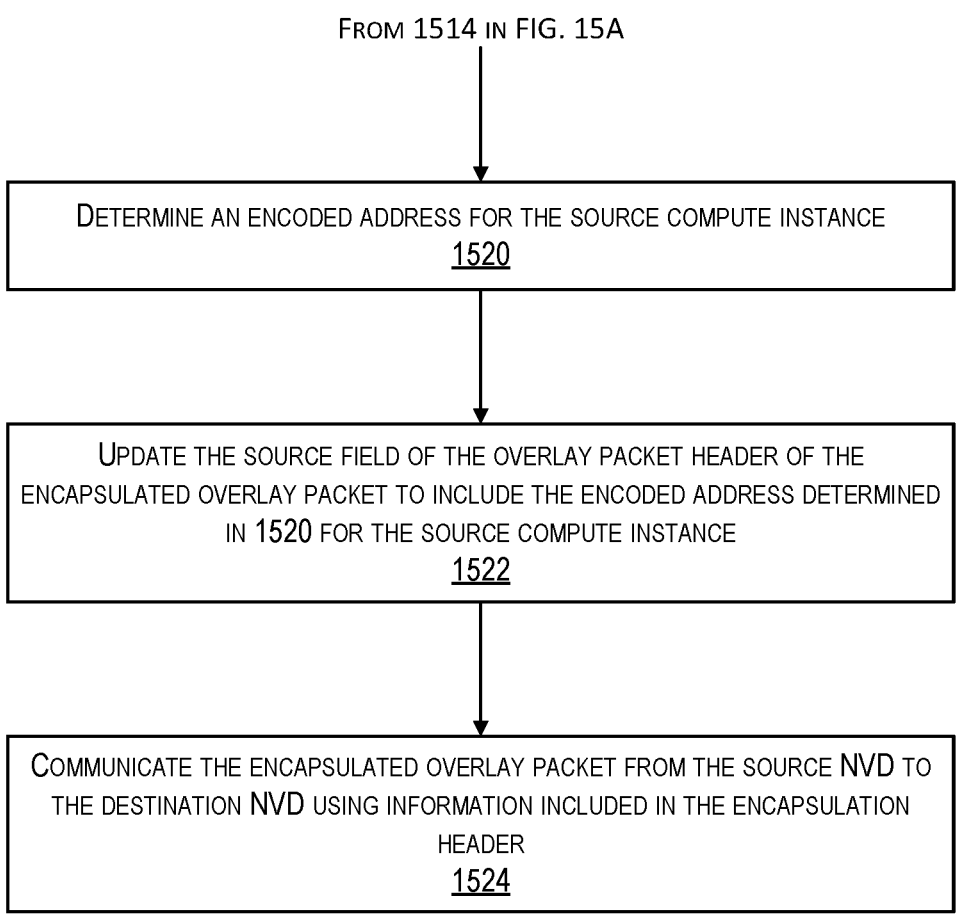

FROM 1514 IN FIG. 15A

DETERMINE AN ENCODED ADDRESS FOR THE SOURCE COMPUTE INSTANCE
1520

UPDATE THE SOURCE FIELD OF THE OVERLAY PACKET HEADER OF THE
ENCAPSULATED OVERLAY PACKET TO INCLUDE THE ENCODED ADDRESS DETERMINED
IN 1520 FOR THE SOURCE COMPUTE INSTANCE
1522

COMMUNICATE THE ENCAPSULATED OVERLAY PACKET FROM THE SOURCE NVD TO
THE DESTINATION NVD USING INFORMATION INCLUDED IN THE ENCAPSULATION
HEADER
1524

*FIG. 15B*

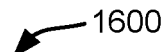

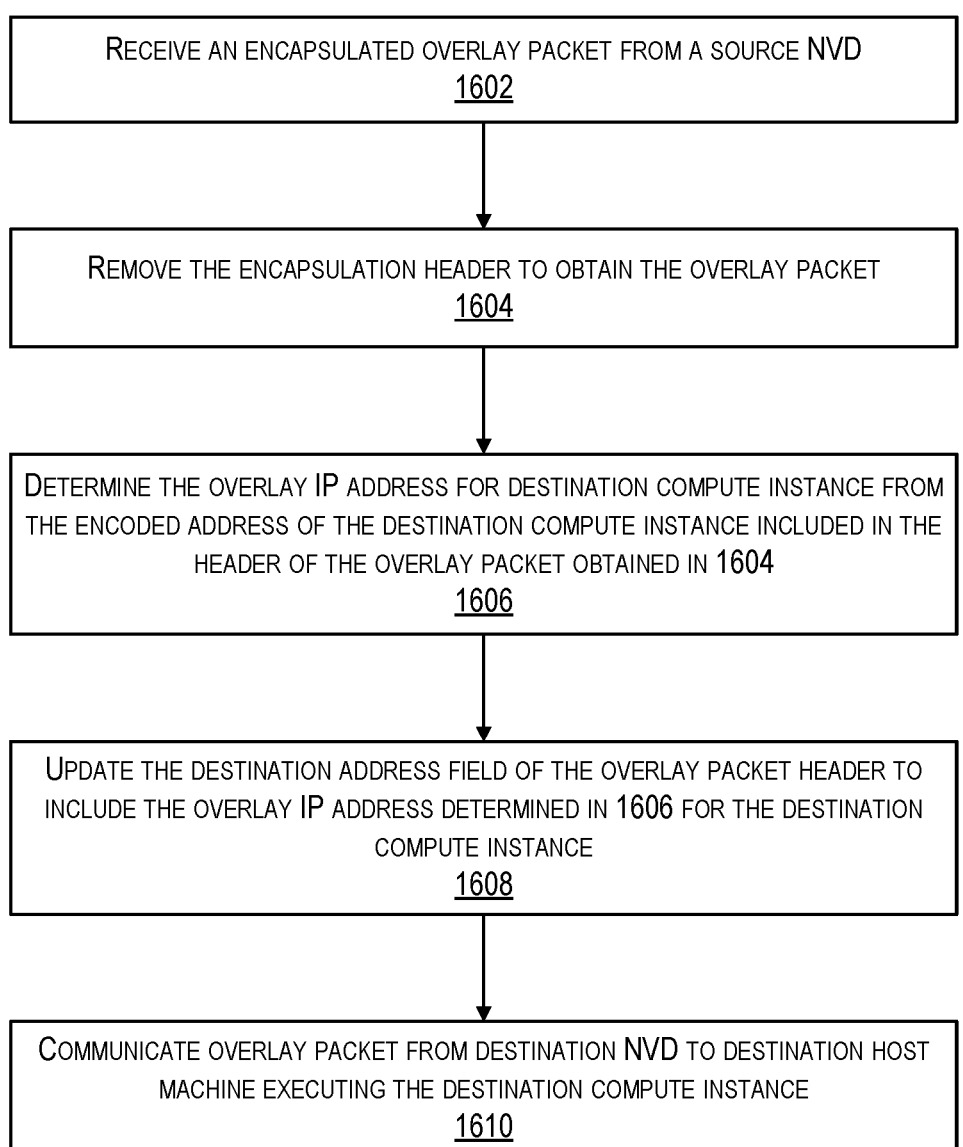

RECEIVE AN ENCAPSULATED OVERLAY PACKET FROM A SOURCE NVD
1602

REMOVE THE ENCAPSULATION HEADER TO OBTAIN THE OVERLAY PACKET
1604

DETERMINE THE OVERLAY IP ADDRESS FOR DESTINATION COMPUTE INSTANCE FROM THE ENCODED ADDRESS OF THE DESTINATION COMPUTE INSTANCE INCLUDED IN THE HEADER OF THE OVERLAY PACKET OBTAINED IN 1604
1606

UPDATE THE DESTINATION ADDRESS FIELD OF THE OVERLAY PACKET HEADER TO INCLUDE THE OVERLAY IP ADDRESS DETERMINED IN 1606 FOR THE DESTINATION COMPUTE INSTANCE
1608

COMMUNICATE OVERLAY PACKET FROM DESTINATION NVD TO DESTINATION HOST MACHINE EXECUTING THE DESTINATION COMPUTE INSTANCE
1610

*FIG. 16*

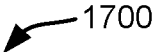
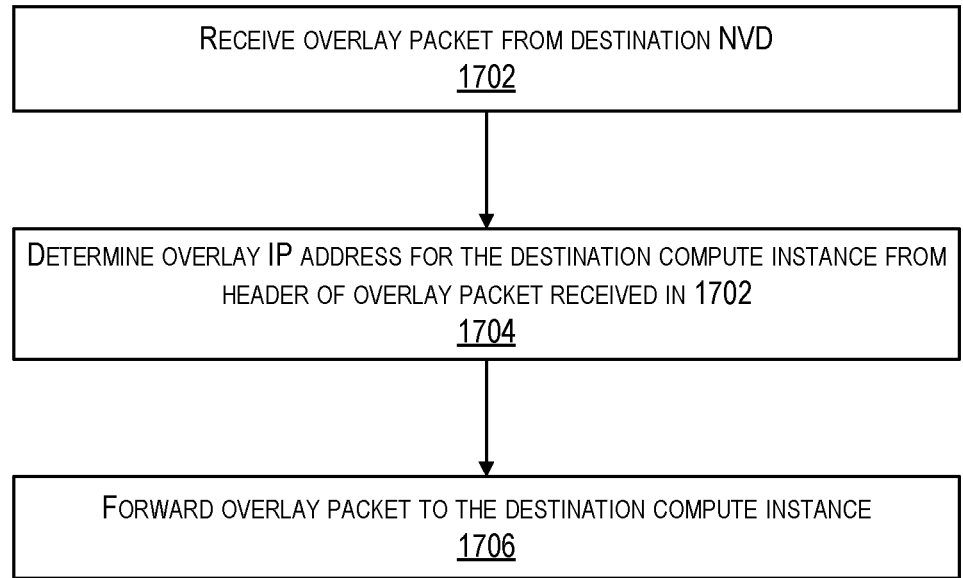
1700
RECEIVE OVERLAY PACKET FROM DESTINATION NVD
1702
DETERMINE OVERLAY IP ADDRESS FOR THE DESTINATION COMPUTE INSTANCE FROM
HEADER OF OVERLAY PACKET RECEIVED IN 1702
1704
FORWARD OVERLAY PACKET TO THE DESTINATION COMPUTE INSTANCE
1706
*FIG. 17*

TECHNIQUES FOR ROUTING PACKETS IN OVERLAY NETWORKS

BACKGROUND

The provision of cloud services by a cloud service provider (CSP) uses network virtualization. The CSP provides infrastructure (referred to as cloud service provider infrastructure or CSPI) that is used to provide the cloud services. The CSPI may comprise interconnected high-performance compute resources including various host machines, memory resources, and network resources that form a physical network, referred to as a substrate network or an underlay network. The CSPI resources may be spread across one or more data centers of the CSP, and the data centers that may be spread across one or more geographical regions.

Using network virtualization, a virtualized distributed environment is provided on top of the substrate network. The virtualization creates an overlay network (or a virtual network) over the physical substrate network. The substrate network thus provides the underlying basis for creating one or more overlay or virtual networks on top of the substrate network. An overlay or virtual network runs on top of a physical substrate network. The physical network (or substrate network or underlay network) comprises physical network devices such as physical switches, routers, computers and host machines, and the like. The components of an overlay or virtual network include compute instances (e.g., virtual machines (VMs)) executed by components of the substrate network, logical interfaces called virtual network interface cards (VNICs) associated with the compute instances, hypervisors, etc. The overlay networks may be implemented using software virtualization technologies executed by components of the substrate network. For example, the substrate network may include one or more network virtualization devices (NVDs) that execute software (e.g., a virtualization stack) that enables the overlay networks and communications between compute instances (e.g., VMs) in the various overlay networks. A given substrate network can support one or multiple overlay networks.

When a customer subscribes to a cloud service provided by a CSP, such as Infrastructure-as-a-Service (IaaS), an overlay network (referred to as the virtual cloud network or VCN) is created for the customer. The customer's compute instances (e.g., VMs) can then be deployed in the VCN.

To enable routing between entities in the overlay network (e.g., between compute instances in the overlay network), entities in the substrate network that perform the routing need to be aware of the physical location of the substrate entities that host the overlay entities. Each overlay entity is uniquely identified, for example, using a unique identifier or a combination of substrate network level identifiers. The substrate network entity doing the routing (e.g., an NVD) has to maintain mappings of the overlay network entities to the substrate network entities. These mappings are then consulted by the substrate network entity (e.g., by an NVD) to route packets originating from or targeted to compute instances.

Storing these mappings involves high memory usage. Additionally, various suitable data structures have to be stored by the NVDs that enable fast lookups of these mappings to ensure low latency in packet processing and forwarding. As the distributed network of a CSP grows (e.g., due to increase in customers, or geographical spread of the customers), the size of these mappings grows, leading to even further increased memory usage. This requires the CSP to provide substrate network routing devices (e.g., NVDs)

with increased memory capacities. This amounts to a significant uptick in costs for a CSP providing the networking resources.

The routing of packets by the NVDs using these mappings is performed in a stateful manner, which consumes significant CPU cycles. As the CSP's network grows, in order to route traffic with reduced latency, routing devices with more powerful CPUs have to be provided by the CSP. This further adds to the cost for a CSP. The routing of traffic between overlay networks is thus very resource- and cost-intensive and thus not very easily scalable.

BRIEF SUMMARY

The present disclosure relates generally to routing of packets in overlay networks. More particularly, novel techniques are described for routing data packets in overlay networks using information that is extracted from the packets themselves, and without using any routing state information stored on the routing devices. The novel techniques use less memory and compute resources than previous overlay network routing techniques. Per the novel techniques described herein, a network device, located in the data path between a compute instance in an overlay network that is the source of a packet and a compute instance in the overlay network that is the intended destination of the packet, is able to route the packet using only special encoded information included in the packet's header when the packet is received by the network device.

Various embodiments are described herein to illustrate various features. These embodiments include various methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

In certain implementations, the special encoded information is in the form of a special encoded address (referred to herein as an "encoded address") that is included in a field of the packet's header. The encoded address encodes various different pieces of information that are used by the network devices in the data path from the source compute instance to the destination compute instance to route the packet. The routing in the overlay network is thus accomplished without using any routing state information stored by the routing devices (e.g., by the network virtualization devices or NVDs), where the routing state information includes information identifying routes.

Various embodiments are described. At least one embodiment is directed to a computer-implemented method. Another embodiment is directed to a computing device comprising one or more processors and instructions that, when executed by the one or more processors, cause the computing device to perform any suitable combination of the method(s) disclosed herein. Still another embodiment is directed to a non-transitory computer-readable medium storing computer-executable instructions that, when executed by one or more processors of a computing cluster, cause the computing cluster to perform any suitable combination of the method(s) disclosed herein.

In certain implementations, a source network virtualization device (NVD) associated with a source compute instance receives an overlay packet originating at the source compute instance and to be communicated to a destination compute instance, the overlay packet comprising an overlay packet header. The source NVD extracts, from the overlay packet header, a first encoded address for the destination compute instance. The source NVD determines first information from a first section of the first encoded address and second information from a second section of the first encoded address. The source NVD then adds an encapsulation header to the overlay packet to create an encapsulated overlay packet. The first information is included in a first field of the encapsulation header, and the second information is included in a second field of the encapsulation header. Utilizing the encapsulation header, the encapsulated overlay packet is then communicated from the source NVD to a destination NVD associated with the destination compute instance. The source NVD is a substrate network component that implements a source virtual network interface card (VNIC) associated with the source compute instance. The source compute instance and the destination compute instance may be part of the same overlay network or may be part of different overlay networks.

In some implementations, the first information includes a substrate IP address for the destination NVD, and the first field is a destination address field in the encapsulation header. The second information may include an identifier identifying a destination virtual network interface card (VNIC) associated with the destination compute instance and implemented by the destination NVD, wherein destination VNIC enables communications to and from the destination compute instance.

In certain implementations, the source NVD causes a substrate address of the source NVD to be included in a source address field of the encapsulation header.

The first encoded address can take various different forms. The first encoded address for the destination compute instance can further comprise a third section that includes an identifier assigned to an overlay IP address of the destination compute instance. Additionally, the first encoded address can further comprise a fourth section that includes information indicating that the first encoded address is a special address encoding multiple pieces of information. In certain implementations, the first encoded address for the destination compute instance can further comprise a fifth section that includes information indicating a tunnel type.

In certain use cases, the encapsulated overlay packet may be communicated from the source NVD to the destination NVD comprises using a tunneling protocol to communicate the encapsulated overlay packet from the source NVD to the destination NVD. An example of a tunneling protocol is GENEVE.

The overlay packet received by the source NVD originates from the source compute instance that is executed by the source host machine. When the source host machine prepares the overlay packet for communication to the source NVD, the source host machine includes the first encoded address in a destination address field of the overlay packet header, and includes an overlay address of the source compute instance in a source address field of the overlay packet header.

There are different ways in which the source host machine obtains the first encoded address for the destination compute instance. In one embodiment, the source host machine receives the first encoded address from a domain name system (DNS) server in response to a request initiated by the source host machine to resolve a fully qualified domain name (FQDN) associated with the destination compute instance.

In certain implementations, the source NVD generates a second encoded address for the source compute instance, and updates a source address field of the overlay packet header to include the second encoded address. The encapsulated overlay packet is then communicated from the source NVD to the destination NVD.

Upon receiving the encapsulated overlay packet, the destination NVD decapsulates the encapsulated overlay packet to obtain the overlay packet, wherein the first encoded address is included in a destination address field of the overlay packet header of the overlay packet. The destination NVD then determines, from the first encoded address in the overlay packet header, an overlay IP address of the destination compute instance. The destination NVD updates the destination address field of the overlay packet header to include the overlay IP address of the destination compute instance. The overlay packet is then communicated from the destination NVD to a destination host machine executing the destination compute instance.

In certain implementations, upon receiving the overlay packet, the destination host machine forwards the packet to the destination compute instance based upon the overlay IP address of the destination compute instance included in the destination address field of the overlay packet header.

The foregoing, together with other features and embodiments will become more apparent upon referring to the following specification, claims, and accompanying drawings.

BRIEF DESCRIPTION OF THE DRAWINGS

To easily identify the discussion of any particular element or act, the most significant digit or digits in a reference number refer to the figure number in which that element is first introduced.

FIG. 8 illustrates an example overlay packet header and an encapsulation header and information included in the headers as an overlay packet is communicated from a client compute instance to a server compute instance utilizing novel routing techniques, according to certain embodiments.

FIG. 10 illustrates an exemplary encoded address format for a compute instance that encodes multiple pieces of information, according to certain embodiments.

FIG. 11 illustrates another exemplary format for an encoded address for a compute instance according to certain embodiments.

FIG. 12 illustrates an example flowchart depicting a method for creating an encoded address for a compute instance, according to certain embodiments.

FIGS. 13A and 13B illustrate an example flowchart depicting a method for updating one or more DNS servers (or a DNS service) with the encoded address for a compute instance, according to certain embodiments.

FIG. 14 illustrates an example flowchart depicting processing performed by a source host machine in communicating a packet from a source compute instance to a destination compute instance, according to certain embodiments.

FIGS. 15A and 15B illustrate an example flowchart depicting processing performed by a source NVD in communicating a packet from a source compute instance to a destination compute instance, according to certain embodiments.

FIG. 16 illustrates an example flowchart depicting processing performed by a destination NVD in communicating a packet from a source compute instance to a destination compute instance, according to certain embodiments.

FIG. 17 illustrates an example flowchart depicting processing performed by a destination host machine in communicating a packet from a source compute instance to a destination compute instance, according to certain embodiments.

DETAILED DESCRIPTION

Figure 1:
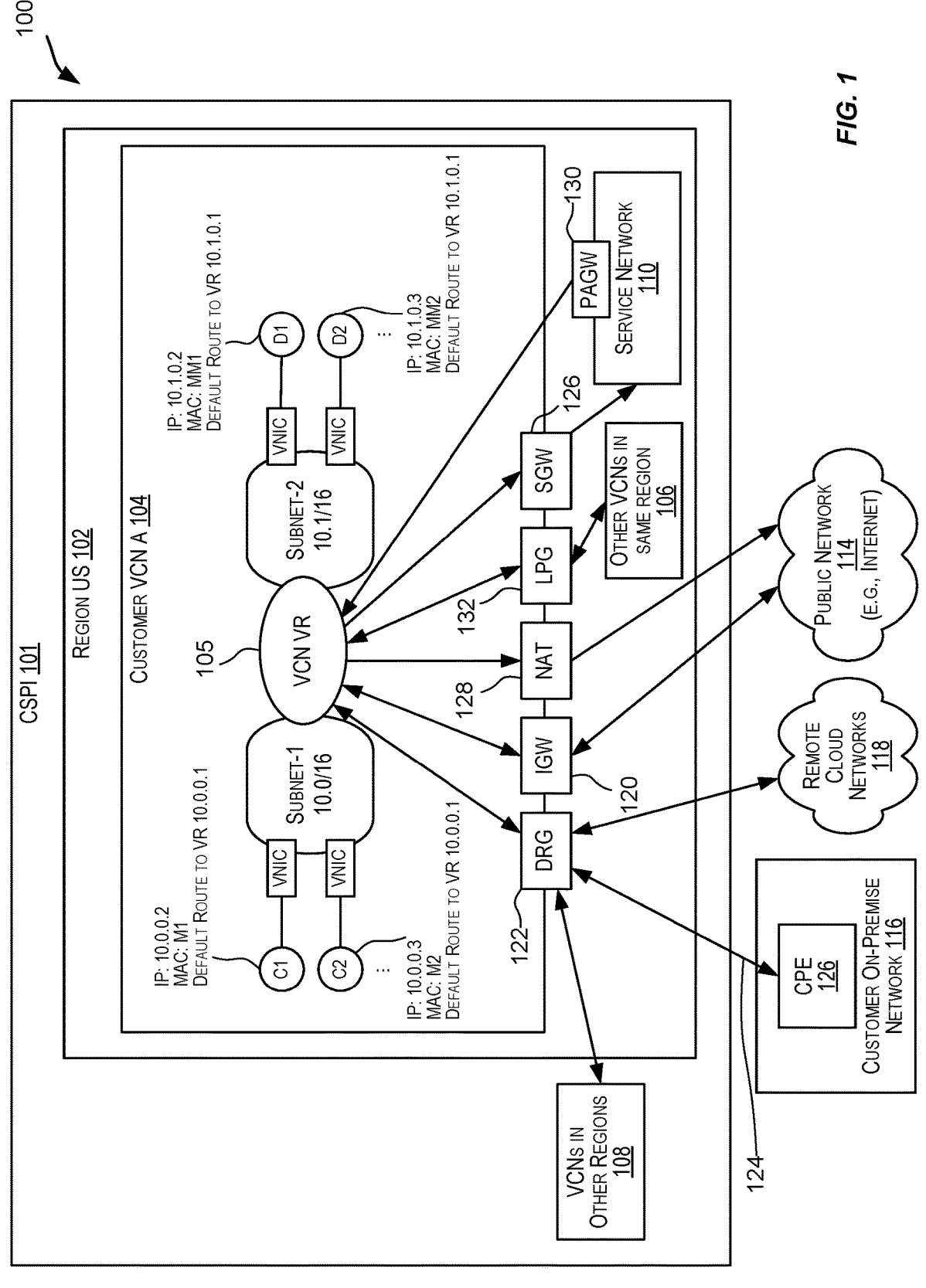
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to routing of packets in overlay networks. More particularly, novel techniques are described for routing data packets in overlay networks using information that is extracted from the packets themselves, and without using any routing state information stored on the routing devices. The novel techniques use less memory and compute resources than previous overlay network routing techniques. Per the novel techniques described herein, a network device, located in the data path between a compute instance in an overlay network that is the source of a packet and a compute instance in the overlay network that is the intended destination of the packet, is able to route the packet manner using only special encoded information included in the packet's header when the packet is received by the network device.

In certain implementations, the special encoded information is in the form of a special encoded address ("encoded address"), that is included in a field of the packet's header. The encoded address encodes various different pieces of information that are used by the network devices in the data path from the source compute instance to the destination compute instance to route the packet. The routing in the overlay network is thus accomplished without using any routing state information stored by the routing devices (e.g., by the network virtualization devices or NVDs), where the routing state information includes information identifying routes.

An overlay packet is a packet that is routed between entities in one or more overlay networks. For example, a packet that is routed between two virtual machines can be referred to as an overlay packet, and the virtual machines involved in the communication of the packet can be on the same or different overlay networks (or VCNs). For example, the data path followed by an overlay packet may originate at a source host machine that executes the source compute instance and end at a destination host machine that executes a destination compute instance that is the intended destination of the overlay packet. The source compute instance at the source host machine is configured to obtain an encoded address for the destination compute instance. In certain implementations, the encoded address for the destination compute instance may be obtained as a result of DNS resolution of the destination compute instance's fully qualified domain name (FQDN). Upon obtaining the encoded address for the destination compute instance, the encoded address is inserted in the destination address field of the overlay packet's header. The overlay packet with the header is then forwarded from a host machine hosting the source compute instance to a network virtualization device (NVD) (source NVD) that implements or hosts a virtual networking interface card (VNIC) for the source compute instance.

Per the techniques described in this disclosure, the host NVD is able to route the received packet from the source NVD to an NVD (destination NVD) hosting a VNIC for the destination compute instance using the encoded address included in the packet's header. In certain implementations, all the different pieces of information needed by the source NVD for routing the overlay packet are encoded in the encoded address that is included in the header of the overlay packet received by the source NVD. The NVD updates the packet header and also encapsulates the packet using information extracted from the encoded address. In certain implementations, encapsulating the packet includes adding an encapsulation header to the overlay packet to generate an encapsulated overlay packet, where the encapsulation header corresponds to a tunneling protocol used for communicating the encapsulated overlay packet from the source NVD to an NVD (destination NVD) hosting a VNIC for the destination compute instance. The encapsulation header is configured by the source NVD and includes information extracted by the source NVD from the encoded address. In this manner, the source NVD is able to route the overlay packet using only information extracted from the overlay packet. The overlay packet is routed by the source NVD without using any routing state information that may be stored by the source NVD, where the routing state information includes information identifying routes. The source NVD can route the overlay packet without storing or using any routing state information. Instead, the information that is used by the source NVD to route the overlay packet is extracted by the source NVD from the overlay packet itself.

Using the encapsulation added by the source, the encapsulated overlay packet is communicated from the source NVD to the destination NVD that executes a VNIC for the destination compute instance that is the intended destination for the packet. The destination NVD decapsulates the received packet, and the decapsulated packet is then forwarded to a host machine (destination host machine) executing the destination compute instance. The destination NVD is able to route the overlay packet to the destination host machine and eventually to the destination compute instance using the encoded address that is included in the overlay packet header. The destination NVD is thus also able to route the overlay packet to the destination compute instance without using any routing state information that may be stored by the destination NVD. The destination NVD can route the overlay packet without storing or using any routing state information. In this way, per the techniques described in this disclosure, network devices such as NVDs in a data path between a source compute instance and a destination compute instance are able to route an overlay packet from the source compute instance to the destination compute instance using a special IP address, referred as to an encoded address that is extracted from the overlay packet itself, without having to maintain any routing state information identifying routes. The source and destination compute instances may be in the same or different overlay networks.

As described in the Background section, the routing of traffic between overlay networks is very resource- and cost-intensive and thus not very easily scalable. As the number of customers of a CSP and network functions grow within a cloud computing environment, the routing state information maintained for different fleets of compute instances in such a cloud computing environment keeps increasing. In order to enable low latency routing in such growing networks, a CSP typically has to buy/provide new routing devices with increased memory and computing resources. This leads to a substantial increase in costs for the CSP. Novel techniques described in this disclosure are able to route packets between compute instances in overlay networks utilizing special encoded addresses that are extracted from the overlay packets being routed. The NVDs that facilitate the communication of a packet from a source compute instance (i.e., the source of a packet) to a destination compute instance (i.e., compute instance that is the intended destination of the packet) are able to route the packet using special information, i.e., the encoded address, contained in the packet header itself. Being able to route overlay packets using information extracted from the packets themselves and without needing to use any routing state information on the routing devices has several advantages. For example, the amount of memory and processing resources needed by the routing devices (e.g., by the NVDs) to perform such routing within the cloud computing environment is reduced. This is because the routing devices do not need to store any routing state information for routing the overlay packets. The computing resources and cycles that are needed to keep this routing state information up-to-date are also not needed anymore. Due to reduced need for memory and compute resources, even as the CSP's network increases in size, the routing can still be efficiently performed with low latency using existing network devices or devices that do not require devices with upgraded memory and processing capabilities. The complexity associated with conventional routing techniques in maintaining updated routing state information that is used for packet routing is also eliminated.

The techniques described herein are not limited to IP protocols. While the numerous examples described in this disclosure describe the use of encoded addresses for the IPv6 protocol, this is not intended to be limiting. In other user cases, the routing techniques described herein can also be used with other networking protocols, other than IPv6. For example, the encoded address can be computed for different networking protocols, other than IPv6, and may be in the formats of those different protocols. The novel routing techniques described herein can be used with any network protocol that provides for a header field that can accommodate an encoded address. When an encoded address is used with an IP protocol (e.g., IPv6 protocol), the special address is also sometimes referred to as an encoded IP address (e.g., encoded IPv6 address).

FIGS. 1-5 and the associated description provided in the "Example Virtual Networking Architecture" section below describes networking concepts including network virtualization, substrate networks, overlay networks, VNICs, etc., and provides examples of environments in which certain embodiments described in this disclosure may be implemented. FIGS. 6-17 describe examples and embodiments related to the improved routing techniques described in this disclosure. FIGS. 18-21 depict examples of architectures for implementing cloud infrastructures for providing one or more cloud services, where the infrastructures may incorporate teachings described herein. FIG. 22 depicts a block diagram illustrating an example computer system or device, according to at least one embodiment.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN-IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly-available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses (substrate IP addresses) in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions, and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 18, 19, 20, and 21 (see references 1816, 1916, 2016, and 2116) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based services using CSPI are depicted in FIGS. 1, 2, 3, 4, 5, 18, 19, 20, and 21, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 18, 19, 20, and 21 (for example, gateways referenced by reference numbers 1834, 1836, 1838, 1934, 1936, 1938, 2034, 2036, 2038, 2134, 2136, and 2138) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
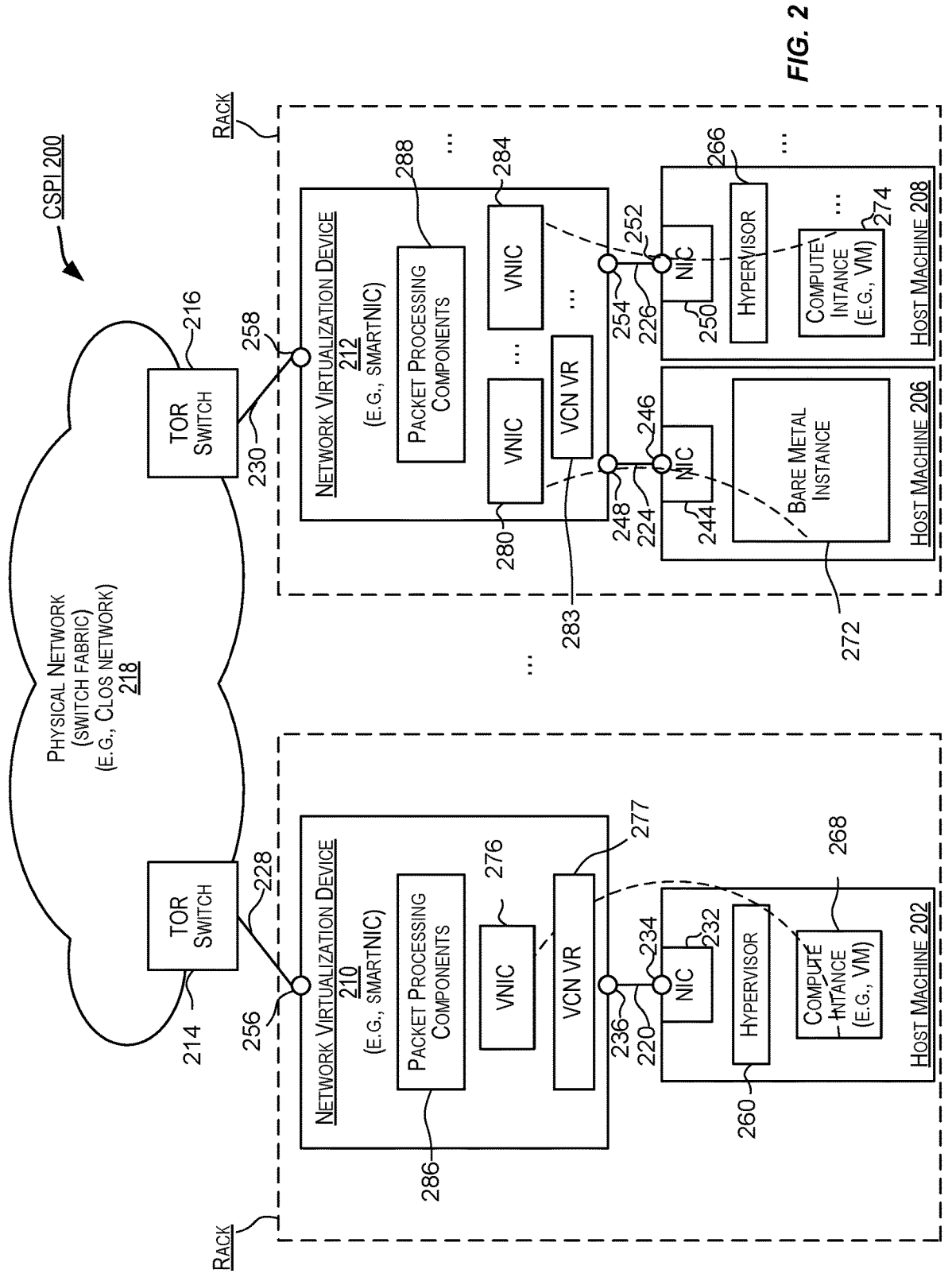
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
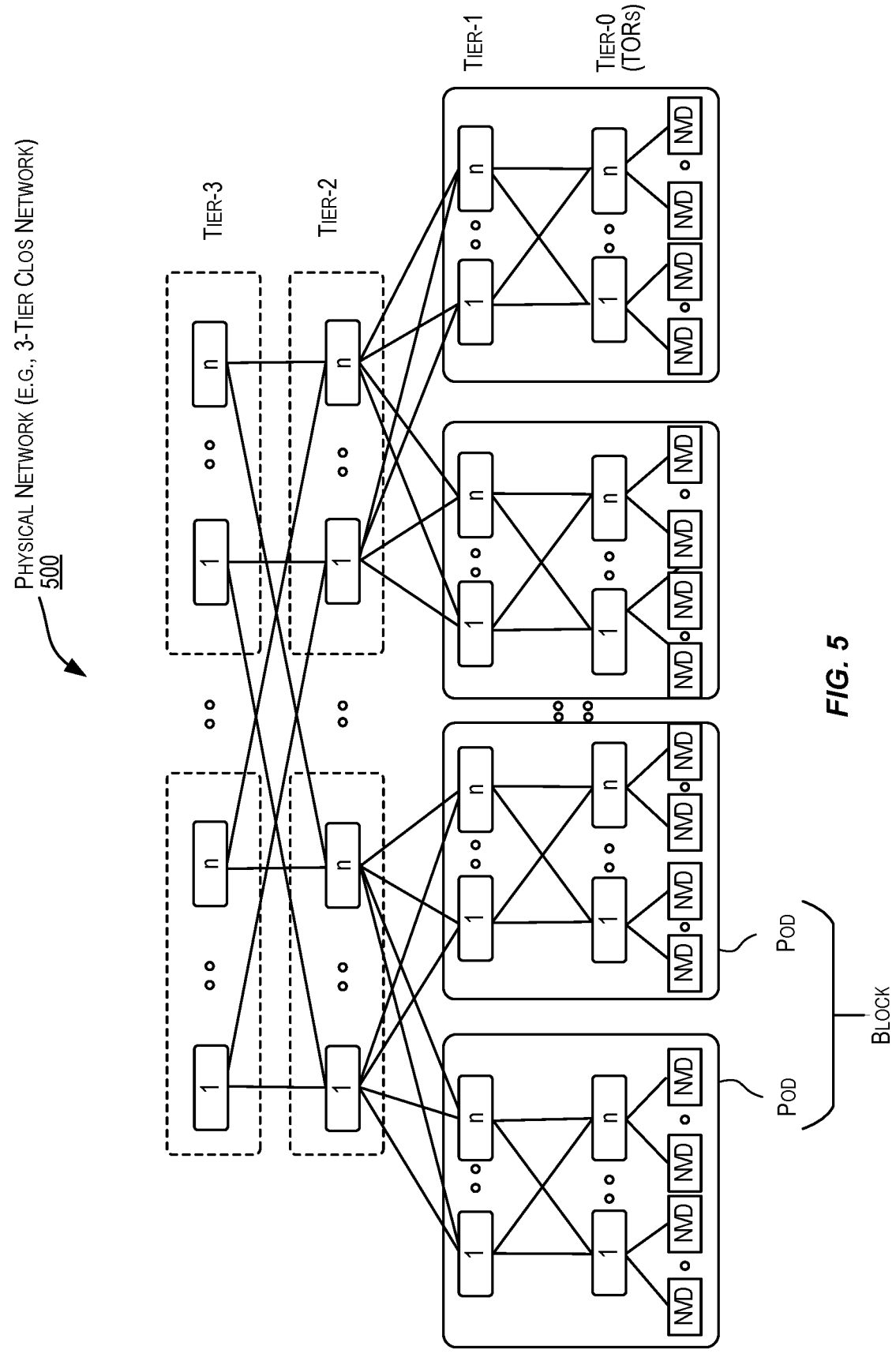
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
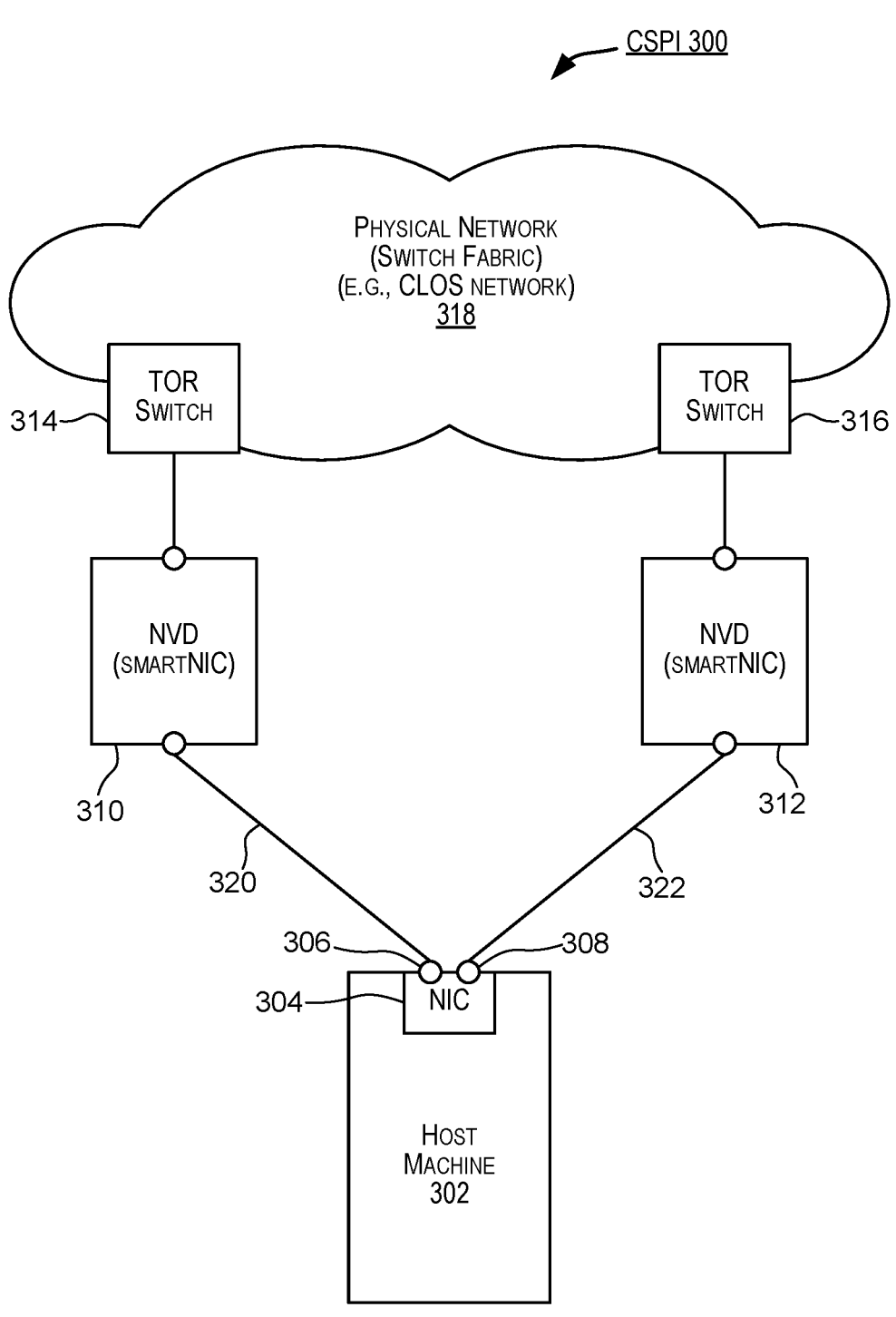
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 18, 19, 20, and 21 (see references 1816, 1916, 2016, and 2116) and described below. Examples of a VCN Data Plane are depicted in FIGS. 18, 19, 20, and 21 (see references 1818, 1918, 2018, and 2118) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
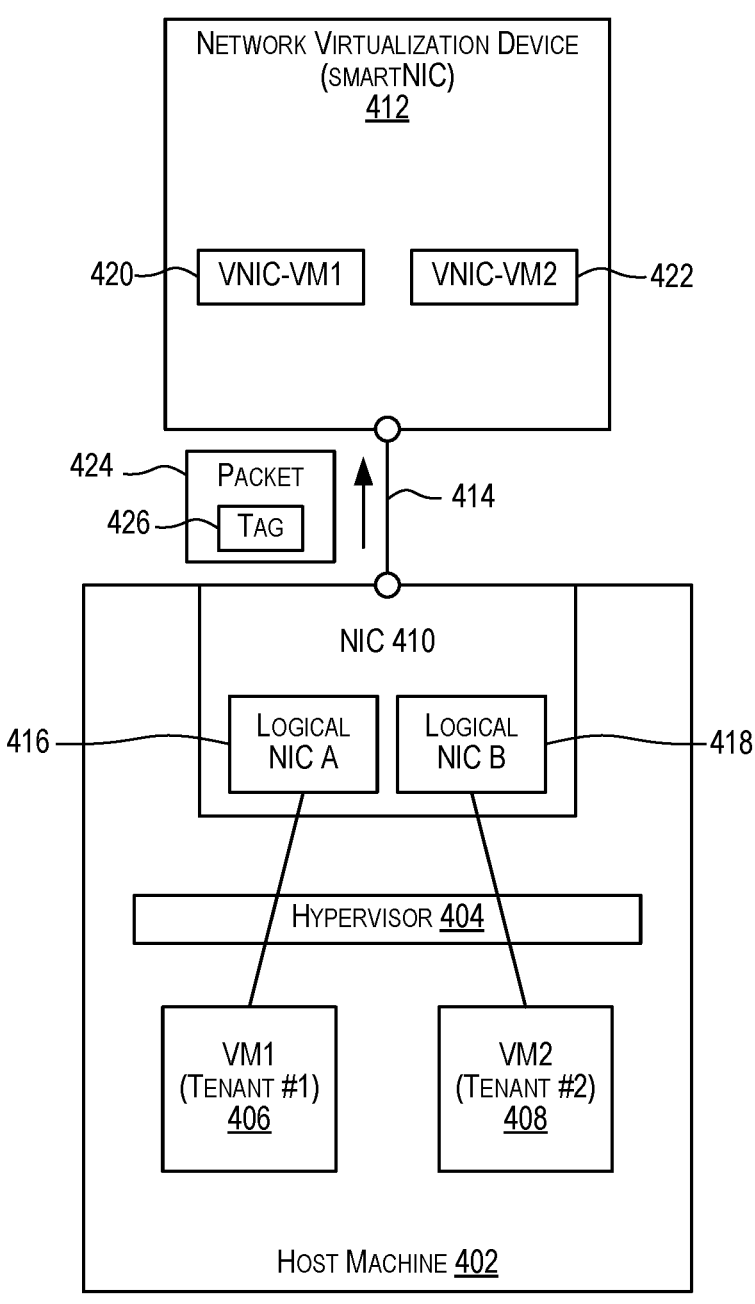
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE      TYPE>.<REALM>.[REGION].
       [FUTURE USE].<UNIQUE ID> where, ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

Novel Routing Techniques Using Encoded Addresses

The present disclosure discloses techniques that enable a network device to route overlay packets in an overlay network using information that is extracted from the overlay packets themselves, and without using any routing state information stored on the routing devices. Using the techniques described herein, a network device is able to route a packet solely using information included in the packet itself, without storing or using any routing state information, which include information identifying routes, that may be stored by the network device. The network device can route an overlay packet without having to store any routing state information.

Techniques are disclosed for routing packets in overlay networks using information extracted from the packets themselves. Network devices, such as NVDs, in a data path between a source compute instance and a destination compute instance are able to route an overlay packet from the source compute instance to the destination compute instance using a special IP address, referred as to an encoded address (or an encoded IP address when used for an IP protocol) included in the overlay packet, without having to maintain any routing state information.

A compute instance that is a source or origination point for a packet is referred to as a source compute instance. A communication from the source compute instance can comprise one or more packets. A compute instance that is the intended destination of a packet is referred to as the destination compute instance. A host machine that hosts or executes a source compute instance is referred to as the source host machine. A host machine that hosts or executes a destination compute instance is referred to as a destination host machine.

A VNIC is associated with a compute instance in the overlay network and provides a logical interface for the compute instance that enables communications to and from the compute instance. The VNIC for a compute instance is hosted or implemented by a network virtualization device (NVD). A VNIC associated with a source compute instance is referred to as a source VNIC. A VNIC associated with a destination compute instance is referred to as a destination VNIC. An NVD that hosts or implements a source VNIC is referred to as a source NVD. An NVD that hosts or implements a destination VNIC is referred to as a destination NVD.

Figure 10:
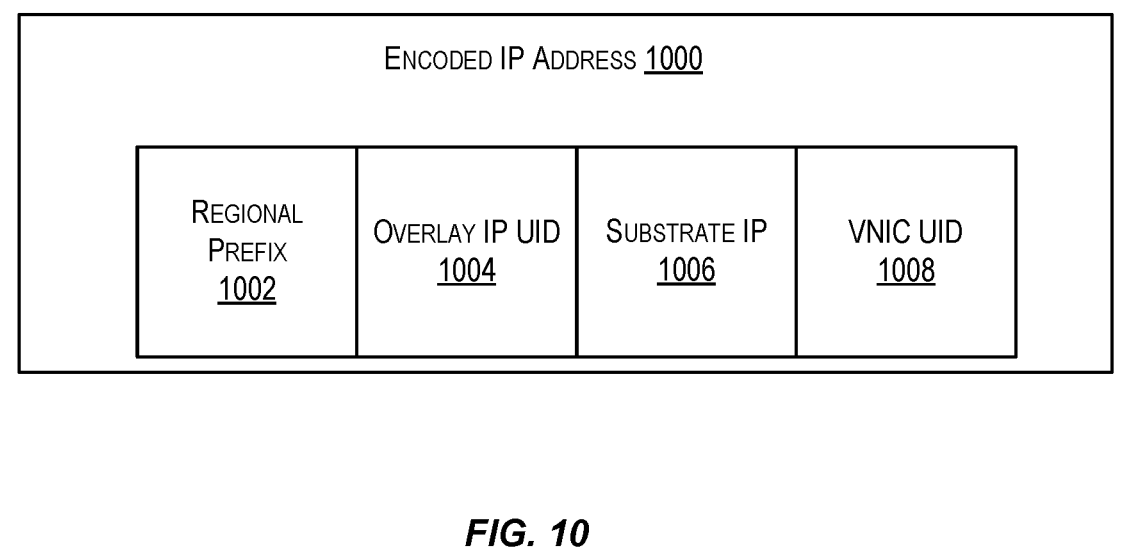

FIG. 10 illustrates an exemplary encoded address format 1000 for a compute instance that encodes multiple pieces of information, according to certain embodiments. As shown in FIG. 10, exemplary encoded address 1000 includes multiple sections or parts 1002-1008, each section encoding a particular piece of information related to a compute instance for which the encoded address is constructed. The example encoded address 1000 may be an IPv6 address. The example encoded address 1000 depicted in FIG. 10 encodes four pieces of information stored in four parts of the address. As shown, these parts include: (a) a regional prefix section 1002; (b) an overlay IP UID section 1004; (c) a substrate IP section 1006; and (d) a VNIC UID section 1008. In an embodiment where encoded address 1000 is an Internet protocol version 6 (IPv6) address, the lengths of the parts may be as follows:

Regional prefix section 1002: 56 bits
    Overlay IP UID section 1004: 8 bits
    Substrate IP section 1006: 32 bits
    VNIC UID section 1808: 32 bits.

These lengths are not intended to be limiting. In alternative embodiments, the lengths could be different.

In certain implementations, the regional prefix section 1002 includes a regional prefix value. In various embodiments, the regional prefix may be a static and well-known prefix in a cloud region for all client and server nodes (compute instances) within a distributed cloud computing environment that informs/indicates to an NVD (e.g., a smartNIC) receiving a packet with a regional prefix that the IP address in the packet is to be treated or interpreted as an encoded address. When a packet is received by an NVD, if the value in section 1002 is set to a well-known and understood prefix value, it indicates to the NVD that the IP address is to be treated as an encoded address that encodes various pieces of information.

The overlay IP UID section 1004 of encoded address 1000 identifies an identifier corresponding to an overlay IP address associated with the compute instance with which the encoded address is associated. The overlay IP address associated with a compute instance is the address that is assigned to a VNIC that is associated with the compute instance. In certain implementations, an identifier (UID) is assigned to each overlay IP address that is assigned to a VNIC, which is associated with the compute instance in the overlay network layer. This UID is included in section 1004 of the encoded address.

As indicated above, in an embodiment where the encoded address is a IPv6 address, the overlay IP UID section 1004 may have a length of 8 bits. This may allow for $2^{\wedge}8(256)$ UIDs and thus 256 different overlay IP addresses that can be associated with a VNIC in the overlay network in a region. This provides a sufficient number of overlay IP addresses that can be associated with a VNIC. The process of associating overlay IP addresses with VNICs and assigning a UID for each IP address is performed by a control plane. A new UID is assigned for each new overlay IP address associated with a VNIC. A UID is unique to a VNIC. However, the same UID may be assigned to a different or same IP address (e.g., an overlapping IP address) associated with another VNIC.

A control plane is responsible for providing management, deployment, and orchestration functions within a cloud environment provided by a CSP. In certain implementations, a control plane may be provided that is common to multiple cloud services. In some other embodiments, a particular cloud service may have its own control plane. A control plane is responsible for setting up one or more overlay networks over substrate networks, managing the overlay networks, enabling deployment of compute instances (e.g., workloads) in the overlay networks and managing the compute instances, configuring the compute instances to enable them to communicate with other entities such as others compute instances in the same or different overlay networks, and the like. The control plane controls determines how data (e.g., packets) is to be managed, routed, and processed. The actual communication of data occurs in the data plane based upon configurations configured by the control plane. A control plane may include one or more components including one or more software and/or hardware components. The software components of a control plane may be executed by one or more computer systems or network devices.

In certain implementations, instead of including the UID in encoded address 1000, the actual overlay IP address may itself be included in encoded address 1000. However, it is more convenient to use the UID for the overlay address instead of the overlay address itself since the number UID may be represented using a far fewer number of bits than the bits needed for representing the actual overlay IP address itself.

The encoded address encodes information that uniquely identifies the VNIC associated with a compute instance for which the encoded address is constructed. In certain implementations, each VNIC in a cloud region is uniquely identified by a set of constructs. For example, a VNIC may be uniquely identified using a VNIC identifier (e.g., VNIC_UID) and a substrate IP address of an NVD that hosts the VNIC. In certain implementations, no other VNIC in a cloud region has the same pair of VNIC_UID and NVD substrate IP address combination. These two pieces of information are included in substrate IP section 1006; and VNIC UID section 1008 of encoded address 1000. For a compute instance, an identifier (VNIC_UID) identifying the VNIC associated with the compute instance is stored in VNIC_UID section 1008. The substrate IP address of an NVD that hosts the VNIC for the compute instance is included in substrate IP section 1006. The NVD is part of the substrate network layer that implements underlying network connectivity (e.g., connectivity that is not visible to a customer/tenant), where this underlying connectivity enables overlay network connectivity (e.g., connectivity that is visible to the customer/tenant via a client overlay network layer and/or a server overlay network layer).

An encoded address that includes the various pieces of information shown in FIG. 10 is assured to be unique in a cloud region. For example, for a compute instance, a combination of the regional prefix bits in section 1002, the overlay IP UID value in section 1004, the substrate IP address value in section 1006, and the VNIC UID value in section 1008 of the encoded address 1000, is unique. Further, no other VNIC in the region may have the same pair of the substrate IP address and VNIC UID values in parts 1006 and 1008, respectively.

An example showing how an encoded address may be generated or constructed for an overlay IP address associated with a compute instance is shown below. The example below assumes certain values for the different pieces of information that are used to construct the encoded address. A compute instance in an overlay network can have multiple VNICs associated with it, and each of these VNICs can have one or multiple IP addresses associated with it. In this manner, multiple overlay IP addresses may be associated with a compute instance. Per the teaching described herein, an encoded address in the IP protocol format can be generated for each of these overlay IP addresses associated with the compute instance.

For example, the various pieces of information associated with a compute instance may have the following values:

Regional prefix=2001:0db8:abcd:12/56

Overlay IP UID having a value "10" assigned by the control plane for overlay IP address example "192.1.1.15" (8 bit value in hexadecimal: 0a) associated with a compute instance Substrate IP (of NVD hosting a VNIC for the compute instance)=172.24.1.100 (32 bit value in hexadecimal: 0xac180164)

VNIC_UID=2048 (32 bit value in hexadecimal: 00000800)

Given the above values, the generated 128 bit encoded address in IPv6 format may be as follows:

Encoded address=2001:0db8:abcd:120a:ac18:0164:0000:0800

In certain implementations, the construction or generation of an encoded address for a compute instance is performed by an NVD that hosts the VNIC associated with the compute instance.

FIG. 11 illustrates another exemplary format for an encoded address 1100 for a compute instance according to certain embodiments. In the example depicted in FIG. 11, encoded address 1100 includes multiple parts 1102-1112. These parts include: (a) a regional prefix section 1102; (b) an overlay IP UID section 1104; (c) a substrate IP section 1106; (d) a VNIC UID section 1108; (e) a reserve section 1110; and (f) a tunnel type section 1112. In an embodiment where encoded address 1100 is in the form of an Internet protocol version 6 (IPv6) address, the lengths of the parts may be as follows:

Regional prefix section 1102: 48 bits

Overlay IP UID section 1104: 8 bits

Substrate IP section 1106: 32 bits

VNIC UID section 1108: 32 bits

Reserve section 1110: 6 bits

Tunnel type section 1112: 2 bits.

In certain implementations, regional prefix section 1102, overlay IP UID section 1104, substrate IP section 1106, and VNIC UID section 1108 are similar to parts 1002, 1004, 1006, and 1008 depicted in FIG. 10 and described above. Encoded address 110 depicted in FIG. 11 includes two additional parts, namely, a reserve section 1110 (6 bits) and a tunnel type section 1112 (2 bits). Reserve section 1110 of the encoded address 1100 includes reserve bits. These bits may be used to convey additional information regarding the compute instance for which the encoded address is constructed. For example, the reserve bits can be used to encode any metadata about the sender or additional identifiers about the sender which can be useful for non-routing purposes like accounting, etc. The reserve bits may also be used to store other information such as additional information or metadata regarding the client or server.

Tunnel type section 1112 of the encoded address 1100 may be used to include information that identifies a specific tunneling technology or protocol to be used for communicating the packet, for example, protocol to be used for communicating the packet between source and destination NVDs. Since the tunneling protocol that is used also influences the encapsulation performed by an NVD, the information included in section 1112 also influences the type of encapsulation used by an NVD to communicate the packet from the NVD. The tunnel type section 1112 may include a two-bit value that is predetermined between a source compute instance and a destination compute instance.

Figure 6:
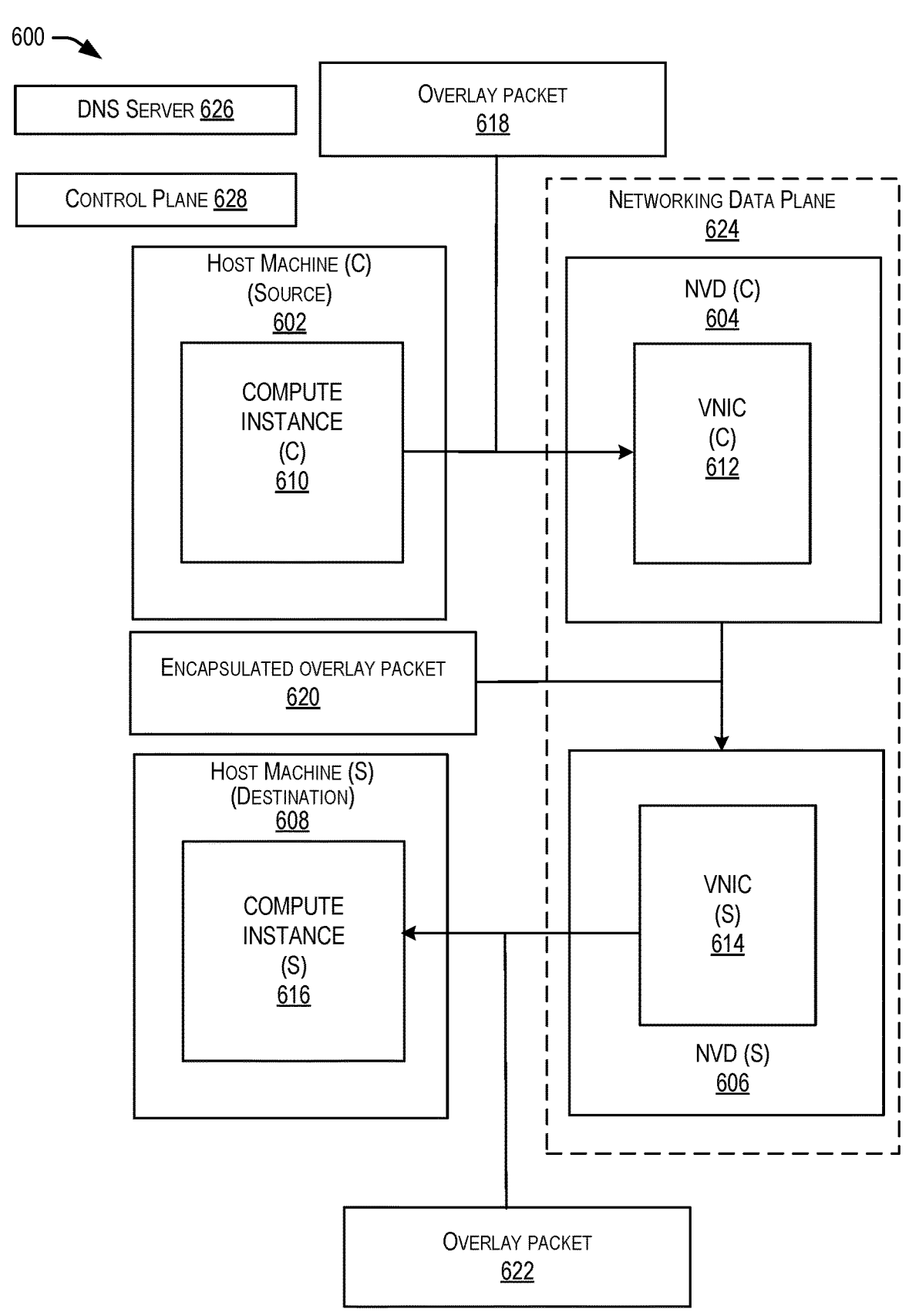
FIG. 6 is a simplified block diagram of a distributed environment in which novel routing techniques, as described in this disclosure, are used for communicating a packet from a client compute instance to a server compute instance, according to certain embodiments.
Figure 7:
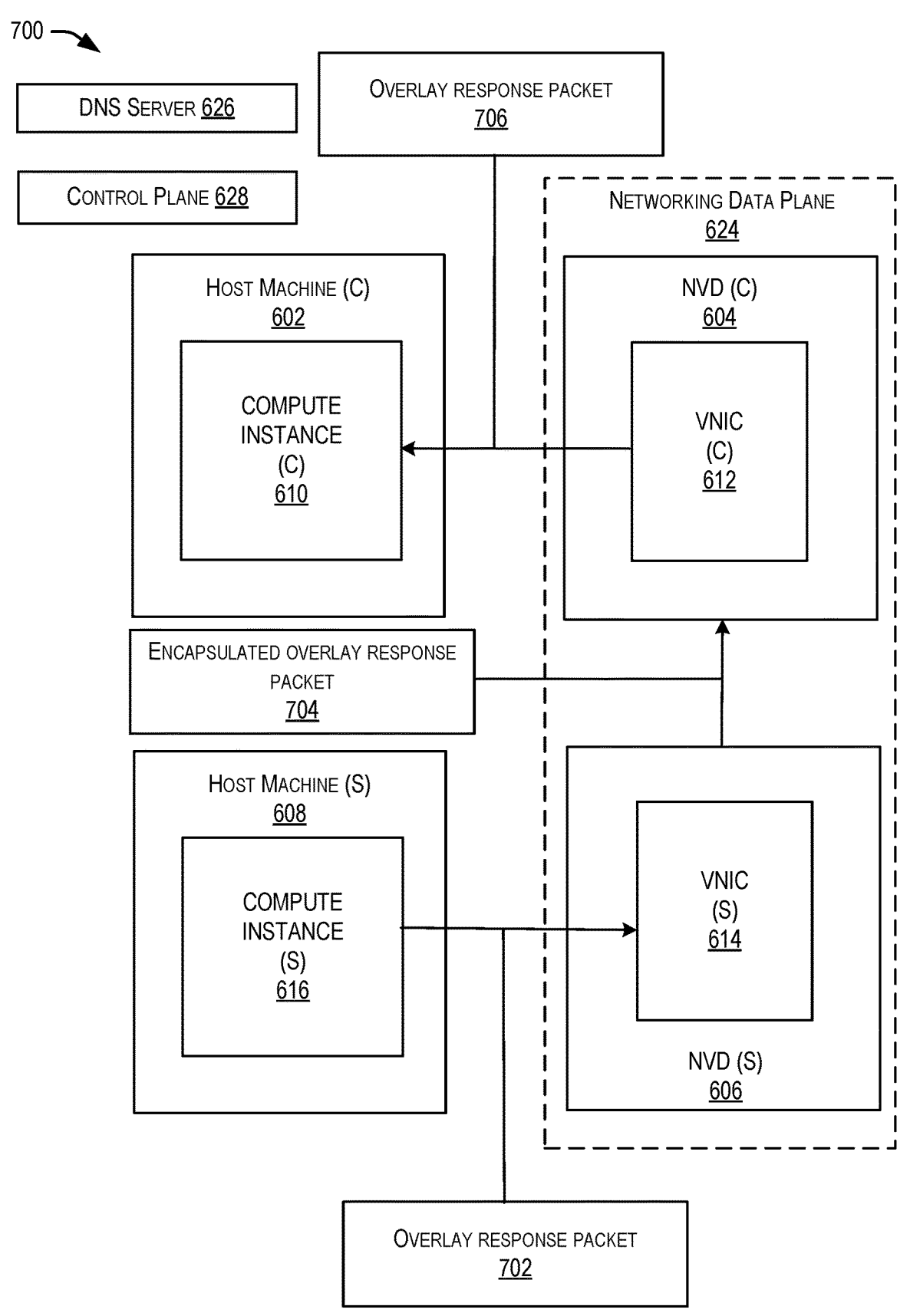
FIG. 7 is a simplified block diagram of a distributed environment in which novel routing techniques, as described in this disclosure, are used for communicating a response packet from a server compute instance to a client compute instance, according to certain embodiments.

FIG. 6 depicts an example of communicating an original overlay packet from a first compute instance to a second compute instance. FIG. 7 depicts a specific example of communicating an overlay response packet from the second compute instance to the first compute instance in response to the original packet received by the second compute instance from the first compute instance. In FIGS. 6 and 7, the terms "client" and "server" are used in the context of the compute instances, the VNICs, the NVDs, and the host machines for purposes of clarity. These client and server terms are however not intended to be limiting in any manner. A host machine hosting or executing a client compute instance is referred to as a client host machine. A VNIC associated with the client compute instance is referred to as the client VNIC. An NVD hosting or implementing the client VNIC is referred to as the client NVD. A host machine hosting or executing a server compute instance is referred to as a server host machine. A VNIC associated with the server compute instance is referred to as the server VNIC. An NVD hosting or implementing the server VNIC is referred to as the server NVD. The terms "client" and "server" are to be given any special meaning and are not intended to limit scope of claimed embodiments. The terms are being used being used solely for purposes of labeling the two compute instances for clarity of description.

FIG. 6 is a simplified block diagram of a distributed environment 600 in which novel routing techniques, as described in this disclosure, are used for communicating a packet from a client compute instance to a server compute instance, according to certain embodiments. Distributed environment 600 comprises multiple systems communicatively coupled to each other. The systems in FIG. 6 include a client host machine 602, a server host machine 608, a client NVD 604, a server NVD 606. FIG. 6 also depicts a DNS server 626 and a control plane 628.

Distributed environment 600 depicted in FIG. 6 is merely an example and is not intended to unduly limit the scope of claimed embodiments. Many variations, alternatives, and modifications are possible. For example, in some implementations, distributed environment 600 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 20:
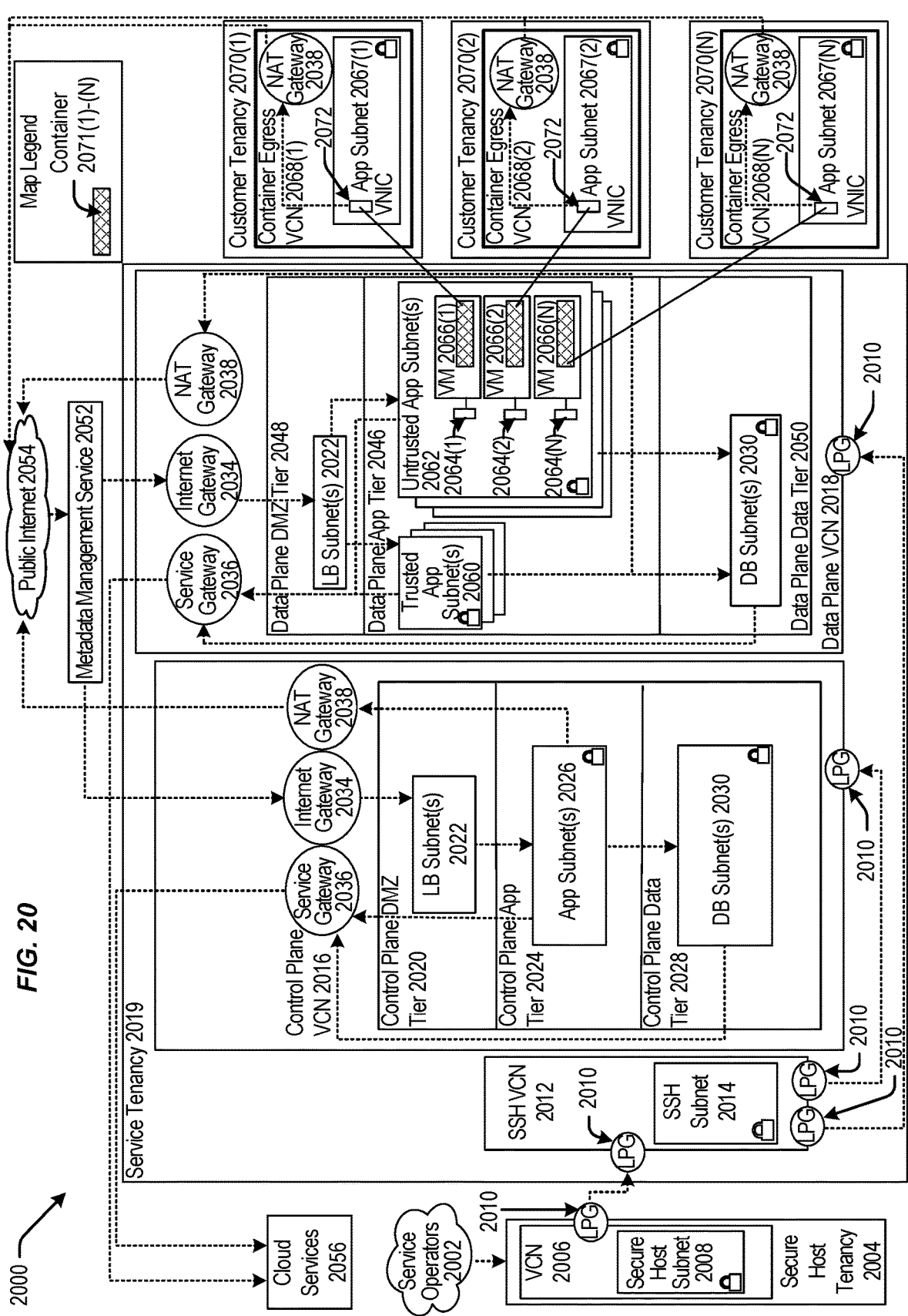
FIG. 20 is a block diagram illustrating another pattern for implementing a cloud infrastructure as a service system, according to at least one embodiment.

As shown in FIG. 6, client host machine 602 hosts or executes a client compute instance 610. FIG. 6 shows a packet originating at client compute instance 610 and whose destination is server compute instance 616 hosted or executed by server host machine 608. Client compute instance 610 and server compute instance 616 may each be a virtual machine (VM). Host machines 602 and 608 can be computing devices, such as servers, mobile devices, computers, computer nodes in a distributed network, etc. An example of a computing device is depicted in FIG. 20 and described in more detail below.

In the embodiment depicted in FIG. 6 (and in FIG. 7), each of the compute instances is associated with a VNIC. For example, as shown, client compute instance 610 is associated with client VNIC 612 and server compute instance 616 is associated with server VNIC 614. A VNIC is a logical network interface and when associated with a compute instance enables the compute instance to connect to a VCN in the overlay network and determines how the compute instance connects with endpoints inside and outside the VCN. Each VNIC resides in a subnet in a VCN. A unique identifier (VNIC_UID) may be associated with and used to identify each VNIC. A compute instance can have multiple VNICs associated with it. A VNIC can in turn have one or more multiple IP addresses associated with the VNIC. For a compute instance associated with a VNIC, the compute instance can be accessed in the overlay network using the IP addresses assigned to the VNIC. In certain implementations, a primary VNIC is automatically created for a compute instance when the compute instance is launched. One or more security rules or policies may also be associated with a VNIC. For a VNIC associated with a compute instance, the rules and policies associated with the VNIC are used to determine how packets are to be routed to and from the compute instance.

A VNIC is a component of the overlay network and is implemented or hosted by a physical component of the substrate network upon which the overlay network is run. In the embodiments depicted in FIGS. 6 and 7, the VNICs are implemented or hosted by network virtualization devices (NVDs), which are physical components of the substrate network. Client VNIC 612 is implemented by client NVD 604 and server VNIC 614 is implemented by server NVD 606. Each of NVDs 604 and 606 can implement one or more VNICs associated with one or more compute instances. Each NVD may execute software (e.g., a virtualization stack) that enables network virtualization functions including enabling communications between compute instances in different VCNs or overlay networks. In certain implementations, for example, NVDs 604 and 606 may be in the form of network cards referred to as smartNICs.

As an example, client compute instance 610 may belong to a customer of a cloud services provider (CSP) and server compute instance 616 may belong to a cloud service provided by the CSP and subscribed-to by the customer. The cloud service may be associated with a particular FQDN (e.g., oracleservice.oracle.com), and server compute instance 616 may be accessible using that particular FQDN. Accordingly, when client compute instance 610 wants to access the cloud service, it may do so using the FQDN associated with the cloud service and server compute instance 616.

For purposes of describing the novel routing techniques disclosed in this disclosure, it is assumed that client compute instance 610 wishes to communicate with server compute instance 616. This communication involves the communication of overlay packet 618 from client compute instance 610 to server compute instance 616. An overlay packet is a packet that is to be communicated in the overlay network. Overlay packet 618 may include a payload section and a header section. In certain implementations, the header may include multiple fields including a source address field, a destination address field, a protocol field, a source port field, and a destination port field. For example, overlay packet 618 may include an overlay packet header 802 as shown in FIG. 8. As shown in FIG. 8, overlay packet header 802 includes a number of fields including: a source address field 810 in which the IP address of the packet sender is entered; a destination address field 812 in which the IP address of the intended destination of the packet is entered; a protocol field 814 in which information identifying the communication protocol is entered (in this case TCP); a source port field 816 in which information identifying the port associated with the packet sender is entered; a destination port field 818 in which information identifying a port associated with the destination of the packet is entered.

In FIG. 8, the overlay packet header is referenced using reference numbers 802, 804, and 808. These numbers all reference the same header of the overlay packet. The different reference numbers are used to show the three different states of the header during three different communications depicted in FIG. 6. More specifically, header 802 refers to the header when the overlay packet is communicated from client host machine 602 to client NVD 604, header 804 refers to the header when the encapsulated overlay packet is communicated from client NVD 604 to server NVD 606, and header 808 refers to the header when the overlay packet is communicated from server NVD 606 to server host machine 608. The 802, 804, and 808 references thus refer to the same header.

In order to commence communication of overlay packet 618 from client host machine 602, client compute instance 610 is responsible for filling the various fields of the packet header. It is assumed that client compute instance 610 knows the FQDN corresponding to server compute instance 616. Client compute instance 610 initiates a DNS resolution request for the particular FQDN (e.g., oracleservice.oracle-.com). DNS server 626 responds to the DNS resolution request by responding with the encoded address associated with the FQDN in the DNS server's records. Client compute instance 610 then inserts the encoded address received from DNS server 626 into the destination address field 812 of header 802 of overlay packet 618. Description for how DNS server 626 is configured to respond with the encoded address for the particular FQDN is depicted in FIGS. 13A and 13B and described below.

In certain implementations, the encoded address for server compute instance 616 encodes the following pieces of information:

Regional prefix part: Static prefix indicating that the IP address is to be treated as an encoded address Overlay IP UID part: UID for overlay IP address assigned to server VNIC 614 associated with server compute instance 616

Substrate IP part: Substrate IP address of server NVD 606 hosting server VNIC 614 associated with server compute instance 616

VNIC UID part: VNIC_UID that uniquely identifies server VNIC 614

Client compute instance 610 also fills in the other fields of header 800. Source address field 810 is set to the overlay IP address of client compute instance 610. The overlay IP address of client compute instance 610 is the IP address that is assigned to client VNIC 612 that is associated with client compute instance 610. Protocol field 814 is set to TCP to identify TCP as the communication protocol. The source and destination port fields 816 and 818 are set to appropriate values corresponding to the port for client compute instance 610 and the port for server compute instance 616.

Overlay packet 618 is then communicated from client host machine 602. Based upon client VNIC 612 associated with client compute instance 610, the packet is forwarded from client host machine 602 to client NVD 604 that hosts client VNIC 612.

Upon receiving overlay packet 618, client NVD 604 extracts information from the header of the packet, including extracting the encoded address for server compute instance 616 inserted in the destination address field 812 of the packet header. From the extracted encoded address, client NVD 604 determines: (1) the UID for overlay IP address assigned to server VNIC 614 associated with server compute instance 616; (2) the substrate IP address of server NVD 606 hosting server VNIC 614 associated with server compute instance 616; and (3) the VNIC identifier (VNIC_UID) that uniquely identifies server VNIC 614.

Client NVD 604 then performs processing to prepare the packet for communication to server NVD 606 that implements server VNIC 614 associated with server compute instance 616, which is the intended destination of the packet. As part of this processing, client NVD 604 encapsulates overlay packet 618 to create an encapsulated overlay packet 620. As part of the processing, client NVD 604 also updates one or more fields of the overlay packet header.

As indicated above, as part of preparing the packet, client NVD 604 may update one or more fields of the packet header in the encapsulated packet. In some embodiments, the contents of source address field 810 are updated by client NVD 604. For example, the existing contents of the source address field 810 are replaced with the encoded address for client compute instance 610. In certain implementations, the encoded address for client compute instance 610 encodes the following pieces of information:

Regional prefix part: Static prefix indicating that the IP address is to be treated as an encoded address Overlay IP UID part: UID for overlay IP address assigned to client VNIC 612 associated with client compute instance 610

Substrate IP part: Substrate IP address of client NVD 604 hosting client VNIC 612 associated with client compute instance 610

VNIC UID part: VNIC_UID the uniquely identifies client VNIC 612

In certain implementations, the encoded address for client compute instance 610 is known to client NVD 604. For example, client NVD 604 receives the information (e.g., information identifying the UID, and the VNIC_UID) that is needed to construct the encoded address for client compute instance 610 when client NVD 604 is configured to host client VNIC 612 associated with client compute instance 610. At that time, client NVD 604 receives information identifying client VNIC 612 that is associated with client compute instance 610 and is to be hosted by client NVD 604. Client NVD 604 also knows its own substrate IP address. Accordingly, it can generate or construct an encoded address for client compute instance 610.

Client NVD 604 updates the source field 810 of header 802 to include this encoded address for client compute instance 610. For example, as shown in FIG. 8, the value in field 810 in overlay packet header 802 is changed to the encoded address for client compute instance 610 in header 804. Adding the encoded address to the overlay packet enables any response sent by server compute instance 616 to client compute instance 610 to be also routed by the client and server NVDs in the data path from server compute instance 616 to client compute instance 610 (as described below with respect to FIGS. 7 and 9) without using any routing state information stored by the client or the server NVDs.

As indicated above, client NVD 604 also encapsulates the packet to prepare the packet for communication to server NVD 606. In certain implementations, the overlay packet is communicated from client NVD 604 to server NVD 606 using a tunneling protocol (e.g., GENEVE—Generic Network Virtualization Encapsulation). As part of preparing the packet, client NVD 604 encapsulates the packet using information extracted from the encoded address for server compute instance 616 that is inserted in destination address field 812 in the received overlay packet 618. As part of the encapsulating, client NVD 604 appends an encapsulation header to the overlay packet 618 to create an encapsulated overlay packet 620. The encapsulation header includes multiple fields that are filled in by client NVD 604 using information extracted from the encoded IP address for server compute instance 616 extracted from the header of overlay packet 618 received by client NVD 604.

An example encapsulation header 806 for encapsulated overlay packet 620 is depicted in FIG. 8. As shown in the example in FIG. 8, encapsulation header 806 includes a source substrate address field 820, a destination substrate address field 822, and a destination VNIC identifier field 824. The substrate IP address of client NVD 604 is entered in source substrate address field 820. Client NVD 604 fills in the values in destination substrate address field 822 and destination VNIC identifier field 824 based upon the information extracted from the encoded address for server compute instance 616 received in the header of overlay packet 618. As indicated above, the encoded address for server compute instance 616 includes a section that identifies the substrate IP address of server NVD 606 and another section that identifies a unique identifier (VNIC_UID) for server VNIC 614. Client NVD 604 extracts the substrate IP address of server NVD 606 from the encoded address for server compute instance 616 and inserts the address into destination address field 822 of encapsulation header 806. Client NVD 604 extracts the VNIC_UID information from the encoded address of server compute instance 616 and inserts the identifier in field 824 of encapsulation header 806. Accordingly, the values for fields 822 and 824 of encapsulation header 806 are both determined by client NVD 604 from the encoded address extracted from field 812 of header 802 of received overlay packet 618.

The encapsulated overlay packet 620 is then communicated from client NVD 604 to the server NVD 606. In certain implementations, the encapsulated overlay packet 620 is communicated from client NVD 604 to server NVD 606 using a tunneling protocol. Various different tunneling protocols may be used. The encapsulated overlay packet 620 is communicated via physical networking devices of a substrate network layer.

As described above, the routing of encapsulated overlay packet 620 from client NVD 604 to server NVD 606 is performed using information contained in header 802 of received overlay packet 618 and without using any routing state information stored by client NVD. More specifically, the packet is routed using information encoded in the encoded address that is included in field 812 in header 802 of received overlay packet 618. The various pieces of information encoded by the encoded address for server compute instance 616 enable routing of the packet to be performed by client NVD 604 without using any routing state information stored by client NVD 604. Client NVD 604 can route encapsulated overlay packet 620 using only information extracted from encapsulated overlay packet 620 and without needing to store or use routing state information.

The encapsulated overlay packet 620 is then received by the server NVD 606. Upon receiving the encapsulated overlay packet 620, the server NVD 606 decapsulates the packet to generate overlay packet 622. Decapsulation involves removing the encapsulation header from the encapsulated overlay packet 620 to obtain the overlay packet 622.

Server NVD 606 then prepares overlay packet 622 for communication from server NVD 606 to server host machine 608. As part of this preparation, server NVD 606 updates the destination address field 812 of the overlay packet 622 to include the overlay IP address for server compute instance 616. Server NVD 606 determines this overlay IP address of server compute instance 616 from the encoded address for server compute instance 616 that is included in field 812 of the encapsulated overlay packet 620 received by server NVD 606. As previously described, the encoded address for server compute instance 616 includes a section that identifies an identifier (UID) for the overlay address assigned to server VNIC 614 that is associated with server compute instance 616. This overlay IP address assigned to server VNIC 614 is the overlay IP address for server compute instance 616. Server NVD 606 extracts the UID from the encoded address for server compute instance 616 included in field 812. Server NVD 606 then determines the overlay IP address that the extracted UID maps to, and inserts that overlay IP address value in field 812 of packet header 808.

After performing decapsulation and updating the overlay packet's 622 header 808, the overlay packet 622 may be communicated from server NVD 606 to server host machine 608 that hosts or executes server compute instance 616. Upon receiving overlay packet 622 from server NVD 606, server host machine 608 uses the information included in header 808 of the overlay packet to forward the overlay packet to server compute instance 616. The client compute instance 610 and server compute instance 616 may be part of the same overlay network (e.g., same VCN) or may belong to two different VCNs or overlay networks.

Similar to client NVD 604, server NVD 606 is also able to route the overlay packet from server NVD 606 to the destination server compute instance 616 using solely information contained in the encapsulated overlay packet 620 and without having to maintain any routing state information identifying routes. For example, server NVD 606 is able to route the packet to server host machine 608 using information encoded in the encoded address for server compute instance 616 that is included in field 812 of header 804 of encapsulated overlay packet 620.

FIG. 6 (and FIG. 7) depicts a control plane 628. As previously described, a control plane is responsible for providing management, deployment, and orchestration functions with a cloud environment provided by a CSP. A control plane is responsible for setting up one or more overlay networks over substrate networks, managing the overlay networks, enabling deployment of compute instances (e.g., workloads) in the overlay networks and managing the compute instances, configuring the compute instances to enable them to communicate with other entities such as others compute instances in the same or different overlay networks, and the like. The control plane controls determines how data (e.g., packets) is to be managed, routed, and processed. The actual communication of data occurs in the data plane based upon configurations configured by the control plane. For example, control plane 628 performs functions such as: enabling compute instance to be deployed in one or more overlay networks, providing the mappings of overlay network components to components of the substrate network, associating VNICs with compute instances, assigning one or more overlay IP addresses to a VNIC associated with a compute instance, generating and assigning unique identifiers (e.g., UIDs) for overlay addresses assigned to a VNIC, selecting and configuring an NVD to host or implement a VNIC associated with a compute instance, setting policies associated with a VNIC that determine how routing is to be performed for the VNIC, etc.

In this manner, both the client NVD 604 and the server NVD 606 that are in the data path from client compute instance 610 to server compute instance 616 are able to route the overlay packet using information that is extracted from the overlay packet itself, and without using any routing state information stored on client NVD 604 or server NVD 606. Fewer NVD memory and processing resources are used for performing such routing as compared to resources used for performing conventional routing using routing state information. Accordingly, even NVDs with reduced memory and processing capabilities are able to perform fast and efficient routing of packets. The encoded IP address-based routing techniques described in this disclosure thus enable improved routing performance by the network devices, where the routing is performed using fewer memory and processing resources while maintaining the desired reduced latency and without having to upgrade the memory and processing capabilities of the network devices as the network of the CSP grows. The complexity associated with conventional routing techniques in maintaining updated and synchronized routing state information that is used for packet routing is also eliminated. This is important for scaling the CSP's communication network as the number of customers and network functions grow within a CSP's cloud computing environment. Using the techniques described herein, the costs associated with the scaling are reduced since the CSP is not forced to procure new upgraded network devices with expanded memory and computing resources. By enabling routing based upon routing information extracted from the packet itself, the techniques described herein enable the routing to be performed using network devices with lower memory and processing resources.

Upon receiving overlay packet 622 from client compute instance 610, the server compute instance 616 may prepare and send an overlay response packet back to client compute instance 610. FIG. 7 is a simplified block diagram of a distributed environment 700 in which novel routing techniques, as described in this disclosure, are used for communicating a response packet from a server compute instance 616 to a client compute instance 610, according to certain embodiments. The components depicted in FIG. 7 are the same as the ones depicted in FIG. 6 and described above. While FIG. 6 depicts the communication of overlay packet 618 from client compute instance 610 to server compute instance 616, FIG. 7 depicts communication of an overlay response packet 702 from server compute instance 616 to client compute instance 610. A response overlay packet is a packet that is communicated by a particular compute instance to another compute instance in response to a packet previously received by the particular compute instance from the another compute instance. The response packet is communicated to the other compute instance, which may be in the same or a different overlay network from the compute instance sending the response packet.

Figure 9:
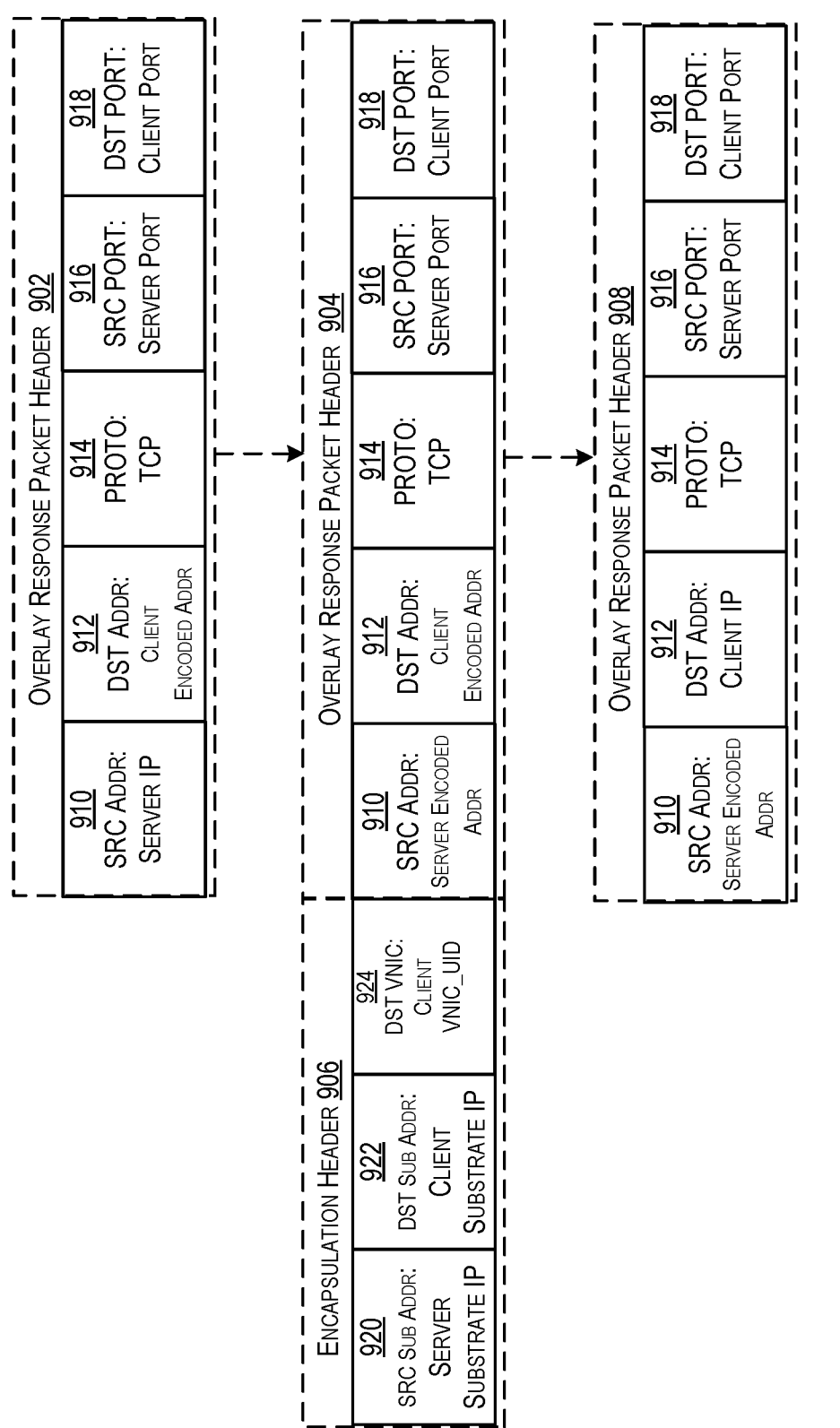
FIG. 9 illustrates an example overlay packet header and an encapsulation header and information included in the headers as an overlay response packet is communicated from a server compute instance to a client compute instance utilizing novel routing techniques, according to certain embodiments.

Overlay response packet 702 may include a payload section and a header section. In certain implementations, the header may include multiple fields including a source address field, a destination address field, a protocol field, a source port field, and a destination port field. For example, overlay packet 702 may include an overlay packet header 902 as shown in FIG. 9. As shown in FIG. 9, overlay response packet header 902 includes a number of fields including: a source address field 910 in which the IP address of the packet sender is entered; a destination address field 912 in which the IP address of the intended destination of the packet is entered; a protocol field 914 in which information identifying the communication protocol is entered; a source port field 916 in which information identifying the port associated with the packet sender is entered; a destination port field 918 in which information identifying a port associated with the destination of the packet is entered.

In FIG. 9, the overlay response packet header is referenced using reference numbers 902, 904, and 908. These numbers all reference the same header of the overlay response packet. The different reference numbers are used to show the three different states of the header during three different communications depicted in FIG. 7. More specifically, header 902 refers to the header when the overlay response packet is communicated from server host machine 608 to server NVD 606, header 904 refers to the header when the encapsulated overlay packet is communicated from server NVD 606 to client NVD 604, and header 908 refers to the header when the overlay response packet is communicated from client NVD 604 to client host machine 602. The 902, 904, and 908 references thus refer to the same header. The fields of header 902/904/908 depicted in FIG. 9 are the same as the fields of header 802/804/808 depicted in FIG. 8.

In order to commence communication of overlay packet 702 from server host machine 608 to client compute instance 610, server compute instance 616 is responsible for filling the various fields of the packet header of overlay packet 702. As shown in FIG. 9, source address field 910 is set to the overlay IP address associated with server compute instance 616, which is the source of overlay packet 702. In certain implementations, this is the IP address assigned to server VNIC 614 that is associated with server compute instance 616.

The destination address field 912 is set to the encoded address for client compute instance 610. Server compute instance 616 knows this encoded address from a previous packet received by server compute instance 616 from client compute instance 610, for example, overlay packet 622 received by server compute instance 616 from client compute instance 610 as depicted in FIG. 6. For example, as shown in FIG. 8, the encoded address of client compute instance 610 is included in the source address field 810 of the packet header 808. This encoded address for client compute instance 610 is entered into field 912 of header 902 of overlay packet 702.

As previously described, in certain implementations, the encoded address for client compute instance 610 encodes the following pieces of information:

Regional prefix part: Static prefix indicating that the IP address is to be treated as an encoded address Overlay IP UID part: UID for overlay IP address assigned to client VNIC 612 associated with client compute instance 610

Substrate IP part: Substrate IP address of client NVD 604 hosting client VNIC 612 associated with client compute instance 610

VNIC UID part: VNIC_UID the uniquely identifies client VNIC 612

Protocol field 914 is set to TCP to identify TCP as the communication protocol. The source and destination port fields 916 and 918 are set to appropriate values corresponding to the port for server compute instance 616 and the port for client compute instance 610.

Overlay response packet 702 is then communicated from server host machine 608 to server NVD 606 that hosts or executes server VNIC 614 associated with server compute instance 616. Based upon server VNIC 614 associated with server compute instance 616, the packet is forwarded from server host machine 608 to server NVD 606 that hosts or implements server VNIC 614.

Upon receiving overlay response packet 702, server NVD 606 extracts information from the header of the packet, including extracting the encoded address for client compute instance 610 inserted in the destination address field 912 of the packet header 902. In certain implementations, from the extracted encoded address, server NVD 606 determines: (1) the UID for overlay IP address assigned to client VNIC 612 associated with client compute instance 610; (2) the substrate IP address of client NVD 604 hosting client VNIC 612 associated with client compute instance 610; and (3) the VNIC identifier (VNIC_UID) that uniquely identifies client VNIC 612.

Server NVD 606 then performs processing to prepare the packet for communication to client NVD 604 that implements client VNIC 612 associated with client compute instance 610, which is the intended destination of the packet. As part of this processing, server NVD 606 encapsulates overlay response packet 702 to create an encapsulated overlay response packet 704. As part of the processing, server NVD 606 also updates one or more fields of the overlay packet header.

As indicated above, as part of preparing the packet, server NVD 606 may update one or more fields of packet header in the encapsulated packet. In some embodiments, the contents of source address field 910 are updated by client NVD 604. For example, the existing contents of the source address field 910 are replaced with the encoded address for server compute instance 616. In certain implementations, the encoded address for server compute instance 616 encodes the following pieces of information:

Regional prefix part: Static prefix indicating that the IP address is to be treated as an encoded address
  Overlay IP UID part: UID for overlay IP address assigned to server VNIC 614 associated with server compute instance 616
  Substrate IP part: Substrate IP address of server NVD 606 hosting server VNIC 614 associated with server compute instance 616
  VNIC UID part: VNIC_UID that uniquely identifies server VNIC 614

In certain implementations, the encoded address for server compute instance 616 is known to server NVD 606. For example, server NVD 606 receives the information (e.g., information identifying the UID, and the VNIC_UID) that is needed to construct the encoded address for server compute instance 616 when server NVD 606 is configured to host server VNIC 614 associated with server compute instance 616. At that time, server NVD 606 receives information identifying server VNIC 614 that is associated with server compute instance 616 and is to be hosted by server NVD 606. Server NVD 606 also knows its own substrate IP address. Accordingly, it can generate or construct an encoded address for server compute instance 616.

Server NVD 606 updates the source field 910 of header 904 to include this encoded address for server compute instance 616. For example, as shown in FIG. 9, the value in field 910 in overlay response packet header 904 is changed to the encoded address for server compute instance 616.

Adding the encoded address to the overlay packet enables any response sent by client compute instance 610 to server compute instance 616 to be also routed by the client and server NVDs in the data path from the client compute instance 610 to the server compute instance 616 using information extracted from the response and without using any routing state information stored by the client or the server NVDs.

As indicated above, server NVD 606 also encapsulates the response packet to prepare the packet for communication to client NVD 604. In certain implementations, the overlay packet is communicated from server NVD 606 to client NVD 604 using a tunneling protocol (e.g., GENEVE). As part of preparing the packet, server NVD 606 encapsulates the packet using information extracted from the encoded address for client compute instance 610 that is inserted in destination address field 912 in the received overlay response packet 702. As part of the encapsulating, server NVD 606 appends an encapsulation header to the overlay response packet 702 to create an encapsulated overlay response packet 704. The encapsulation header includes multiple fields that are filled in by server NVD 606 using information extracted from the encoded address IP for client compute instance 610 extracted from the header of overlay response packet 702 received by server NVD 606.

An example encapsulation header 906 for encapsulated overlay response packet 704 is depicted in FIG. 9. As shown in the example in FIG. 9, encapsulation header 906 includes a source substrate address field 920, a destination substrate address field 922, and a destination VNIC identifier field 924. The substrate IP address of server NVD 606 is entered in source substrate address field 920. Server NVD 606 fills in the values in destination substrate address field 922 and destination VNIC identifier field 924 based upon the information extracted from the encoded address for client compute instance 610 received in the header 902 of overlay packet 702. As indicated above, the encoded address for client compute instance 610 includes a section that identifies the substrate IP address of client NVD 604 and another section that identifies a unique identifier (VNIC_UID) for client VNIC 612. Server NVD 606 extracts the substrate IP address of client NVD 604 from the encoded address for client compute instance 610 and inserts the address into destination address field 922 of encapsulation header 906. Server NVD 606 extracts the VNIC_UID information from the encoded address of client compute instance 610 and inserts the identifier in field 924 of encapsulation header 906. Accordingly, the values for fields 922 and 924 of encapsulation header 906 are both determined by server NVD 606 from the encoded address extracted from field 912 of header 902 of received overlay response packet 702.

The encapsulated overlay response packet 704 is then communicated from server NVD 606 to the client NVD 604. In certain implementations, the encapsulated overlay response packet 704 is communicated from server NVD 606 to client NVD 604 using a tunneling protocol. Various different tunneling protocols may be used. The encapsulated overlay response packet 704 is communicated via physical networking devices of a substrate network layer.

The routing of encapsulated overlay response packet 704 from server NVD 606 to client NVD 604 is performed using information contained in the header 902 of received packet 702. More specifically, the packet is routed using information encoded in the encoded address that is included in field 912 in header 902 of received overlay response packet 702. The various pieces of information encoded by the encoded address for client compute instance 610 enable routing of the packet to be performed by server NVD 606 without using any routing state information stored by server NVD 606. Server NVD 606 can route overlay response packet 704 using only information extracted from the packet itself and without needing to store or use routing state information.

The encapsulated overlay response packet 704 is then received by client NVD 604. Upon receiving the encapsulated overlay response packet 704, client NVD 604 decapsulates the packet to generate overlay response packet 706. Decapsulation involves removing the encapsulation header from the encapsulated overlay response packet 704 to obtain the overlay response packet 706.

Client NVD 604 then prepares overlay packet 706 for communication from client NVD 604 to client host machine 602. As part of this preparation, client NVD 604 updates the destination address field 912 of the overlay packet 922 to include the overlay IP address for client compute instance 610. Client NVD 604 determines this overlay IP address of client compute instance 610 from the encoded address for client compute instance 610 that is included in field 912 of the encapsulated overlay packet 704 received by client NVD 604. As previously described, the encoded address for client compute instance 610 includes a section that identifies an identifier (UID) for the overlay address assigned to client VNIC 612 that is associated with client compute instance 610. This overlay IP address assigned to client VNIC 612 is the overlay IP address for client compute instance 610. Client NVD 604 extracts the UID from the encoded address for client compute instance 610 included in field 912. Client NVD 604 then determines the overlay IP address that the extracted UID maps to, and inserts that overlay IP address value in field 912 of packet header 908.

After performing decapsulation and updating the overlay response packet's 706 header 908, the overlay packet 706 may be communicated from client NVD 604 to client host machine 602 that hosts or executes client compute instance 610. Upon receiving overlay packet 706 from client NVD 604, client host machine 602 uses the information included in header 908 of the overlay packet to forward the overlay packet to client compute instance 610. The client compute instance 610 and server compute instance 616 may be part of the same overlay network (e.g., same VCN) or may belong to two different VCNs or overlay networks.

In this manner, in the data path from server compute instance 616 to client compute instance 610, client NVD 604 is also able to route the overlay packet to the destination client compute instance 610 using solely information contained in the encapsulated overlay response packet 620 and without having to use or maintain any routing state information. Accordingly, both the client NVD 604 and the server NVD 606 are able to route the overlay packet based upon information included in the headers of the packet, including the overlay packet header and the encapsulated overlay packet header. For example, client NVD 604 and server NVD 606 are able to route the overlay packet based upon the encoded address for server compute instance 616 included in the packet header 802/804/808.

As depicted in FIGS. 6, 7, 8, and 9, and described above, using the encoded address, the NVDs in the data path from a source compute instance to a destination compute instance are able to perform routing of packets in the overlay network based solely upon the encoded address contained in the packets received by the NVDs. The NVDs do not have to store any routing state information for the routing the packets, or do not have to use any routing state information that may have been stored by the NVDs. Such overlay network routing uses a lot less memory and processing resources than those required for performing routing using routing state information. This enables NVDs, even with reduced memory and processing capabilities, to be able to perform fast and efficient routing of packets. The complexity associated with conventional routing techniques in maintaining updated and synchronized routing state information that is used for conventional packet routing is also eliminated. This all enables better scaling solutions for a CSP. As the CSP's communication network grows, for example, due to an increase in the number of customers and network, the techniques disclosed herein can be used to scale routing equipment at reduced costs.

FIG. 12 illustrates an example flowchart 1200 depicting a method for creating an encoded address for a compute instance, according to certain embodiments. The processing depicted in FIG. 12 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 12 and described below is intended to be illustrative and non-limiting. Although FIG. 12 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 12 may include a greater number or a lesser number of steps than those depicted in FIG. 12.

In certain embodiments, such as in the embodiment depicted in FIGS. 6 and 7, the processing depicted in FIG. 12 may be performed by any component that is tasked with generating an encoded address. For example, the processing may be performed by client NVD 604 when it generates an encoded address for client compute instance 610. As another example, the processing depicted in FIG. 12 may be performed by server NVD 606 when it generates an encoded address for server compute instance 616.

Flowchart 1200 depicts processing for generating an encoded address that has a format depicted in FIG. 10. The processing in FIG. 12 can be easily extended for generating an encoded address according to the format depicted in FIG. 11. For example, in addition to the processing described below for flowchart 1200, additional processing may be performed to fill in reserve fields 1110 and tunnel type 1112 to generate an encoded address per the format depicted in FIG. 11.

Processing may begin at 1202, with ascertaining the preconfigured regional prefix that indicates to any receiver of a packet that the IP address in the packet is to be treated as an encoded IP address. This prefix may be preconfigured and well known by all necessary network devices and host machines in a cloud network. For example, the prefix may be preconfigured for a CSP's environment and set by the control plane for the CSP's environment.

At 1204, for the compute instance for which the encoded address is being generated, information is determined that can be used to determine an overlay IP address assigned to the compute instance for which the encoded address is to be generated. In certain implementations, as part of 1204, the overlay IP address that is assigned to the compute instance is one that is assigned to a VNIC that is assigned to the compute instance. As part of the processing performed in 1204, information is identified that can be used to determine this overlay IP address. In certain implementations, the information determined in 1204 is in the form of a unique identifier (UID) that is assigned to each overlay IP address assigned to a VNIC. The UID is unique to the VNIC and maps to a particular overlay IP address assigned to the VNIC for the compute instance. The UID is generally assigned by the control plane for an overlay IP address when the overlay IP address is assigned to the VNIC.

At 1206, a substrate IP address of the NVD that hosts or implements the VNIC associated with the compute instance is determined. At 1208, information that uniquely identifies the VNIC associated with the compute instance is determined. For example, the information determined in 1208 may be a VNIC identifier (VNIC_UID) identifying the VNIC. The VNIC_UID is generally assigned by the control plane when the VNIC is created.

At 1210, an encoded address is generated or constructed for the compute instance based upon the different pieces of information determined in 1202, 1204, 1206, and 1208. For example, the four pieces of information determined in 1202, 1204, 1206, and 1208 may be put together to generate an encoded IPv6 address per the format depicted in FIG. 10 and described above. For example, the information determined in 1202 may be included in the first 56 bits of the encoded address that is generated, the information determined in 1204 may be included in the next 8 bits of the encoded address, the information determined in 1206 may be included in the next 32 bits of the encoded address, and the information determined in 1208 may be included in the last 32 bits of the encoded address.

At 1212, processing may be initiated that causes one or more DNS servers to update their DNS records such that the encoded address generated in 1210 is associated with the FQDN for the compute instance. This then allows any DNS resolution request for the FQDN for the compute instance to be resolved to the encoded address generated in 1210. More details on processing that is performed to update the DNS servers is depicted in FIGS. 13A and 13B and described below.

A compute instance in an overlay network can have multiple overlay IP addresses associated with it. For example, multiple VNICs may associated with the compute instance, and each of these VNICs can have one or multiple IP addresses associated with it. In this manner, multiple overlay IP addresses may be associated with a compute instance. The processing depicted in FIG. 12 and described above can be used to generate an encoded IP address for each of these overlay IP addresses associated with the compute instance.

FIGS. 13A and 13B illustrate an example flowchart 1300 depicting a method for updating one or more DNS servers (or a DNS service) with the encoded address for a compute instance, according to certain embodiments. The processing depicted in FIGS. 13A and 13B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 13A and 13B and described below is intended to be illustrative and non-limiting. Although FIGS. 13A and 13B depict the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIGS. 13A and 13B may include a greater number or a lesser number of steps than those depicted in FIGS. 13A and 13B. In certain embodiments, such as in the embodiment depicted in FIGS. 13A and 13B, the processing may be performed by a service control plane (CP), an NVD, and a DNS server. While FIGS. 13A and 13B depict a single DNS server, this is not intended to be limiting in any way. The processing depicted in FIGS. 13A and 13B can be used to update multiple DNS servers or even a DNS service that provides DNS functionality.

As an example, the processing depicted in flowchart 1300 may be performed for a compute instance that is owned by a cloud service, where the cloud service has an associated unique Fully Qualified Domain Name (FQDN), which is unique globally or within the scope of a particular network such as "www.CSP.com" (e.g., "www.oracle.com"). For purposes of this example, the FQDN may be "www.CSP-service.CSP.com" (e.g., "oracleservice.oracle.com").

An FQDN is a full and unique address associated with an entity that can be accessed over a communication network such as the Internet. An FQDN comprises a host name and a domain, and can be used to access a cloud service endpoint (e.g., a compute instance (e.g., a virtual machine) associated with the cloud service, a website, a computer, and other network addressable entities. Any entity that wishes to communicate with an entity associated with an FQDN is assumed to know that destination entity's FQDN.

For example, if a client (e.g., a client compute instance 610 depicted in FIG. 6) wants to communicate or interact with a service (e.g., with a compute instance owned by the service), the client is assumed to know the service's FQDN. When a packet is to be sent from the client compute instance to the service, the client initiates a DNS resolution with a DNS server using the service's FQDN to get an IP address corresponding to the FQDN. Once the IP address corresponding to the FQDN is known, for a packet to be communicated from the client compute instance to the service, this IP address received from the DNS server as a result of the FQDN resolution is inserted into a "Destination Address" field of a header of the packet, thereby indicating that the entity associated with the IP address is the intended destination of the packet. The packet is then forwarded from the client compute instance to the destination compute instance.

In order to make use of the novel routing techniques described in this disclosure, for an entity participating in the novel routing technique, a DNS record, stored by the DNS server for that entity and used by the DNS server for resolving the entity's FQDN, is updated such that the special encoded address (e.g., the encoded address for an IPv6 address) computed for the entity is associated with the entity's FQDN. FIGS. 13A and 13B depict an example method for updating a DNS server to associate the encoded address with the relevant FQDN.

It is assumed that a service is associated with a particular FQDN, for example, "oracleservice.oracle.com", and a compute instance owned by the service is to be made reachable using the particular FQDN. At 1302, a VNIC is associated with the compute instance and an overlay IP address is assigned to the VNIC. The processing in 1302 is typically performed by a control plane of the service. The VNIC represents a virtual network interface for the compute instance that enables communications to and from the compute instance in the overlay network. The overlay IP address assigned to the VNIC is the overlay IP address for the compute instance and which can be used to communicate with the compute instance. For purposes of the description for FIGS. 13A and 13B, this overlay IP address is referred to as the "original IP address" to differentiate it from the encoded address that is computed later. The FQDN may be unique either globally or within the scope of a particular cloud network.

As indicated above, a VNIC is a logical network interface for the compute instance with which the VNIC is associated. The VNIC enables the compute instance to connect to an overlay network (e.g., virtual cloud network or VCN) and determines how the instance connects with endpoints inside and outside the VCN. In certain implementations, each VNIC resides in a subnet in a VCN. A unique identifier (VNIC_UID) may be associated with the VNIC and used to identify the VNIC. A compute instance can have multiple VNICs associated with it.

A compute instance can have one or more VNICs associated with it. A VNIC can have one or more IP addresses associated with the VNIC. In certain implementations, a primary VNIC is automatically created for a compute instance when the compute instance is launched. Assignments of VNICs to compute instances and overlay IP addresses to VNICs may be performed by a control plane.

At 1304, an NVD is identified and assigned to host or implement the VNIC associated with the compute instance in 103. The processing in 1304 is typically performed by the control plane of the service. The NVD (also sometimes referred to as a smartNIC) is a physical device that is part of the substrate network and is configured to host or implement the VNIC. The NVD performs several network virtualization related functions including routing of packets in the overlay network. For example, the NVD executes a virtual networking program or stack that is responsible for routing of packets to and from entities in the overlay network. An NVD can host or implement VNICs assigned to one or more compute instances.

At 1306, configuration information related to the compute instance and the VNIC assigned to the compute instance and to be implemented by the NVD identified in 1304 is sent to the NVD. The processing in 1306 is typically performed by the control plane of the service. The configuration information can include information related to the VNIC associated with the compute instance in 1304, information identifying the original IP address, information identifying the FQDN, and other information. Information related to the VNIC may include information identifying a VNIC identifier (e.g., VNIC_UID), a unique identifier (UID) that maps to the original IP address, etc. In certain implementations, the information sent to the NVD in 1306 includes all the information pieces needed by the NVD to compute an encoded address for the compute instance.

At 1308, the NVD receives the configuration information for the compute instance and the associated VNIC. At 1310, the NVD generates or constructs an encoded address for the compute instance based upon the information received in 1308. The NVD may then store the encoded address computed in 1308, and also store an association between the particular FQDN, the computed encoded address, the VNIC, and the original IP address.

In certain implementations, the encoded address computed in 1310 is in the IPv6 format and sometimes referred to as the encoded IPv6 address or encoded address in IPv6 format. An IPv6 address is 128 bits long, as opposed to an IPv4 address that is 32 bits long. An IPv6 address can be written using hexadecimal numbers, where each hexadecimal number represents 4 bits. The hexadecimal numbers can be grouped into eight groups or blocks, each group containing 4 hexadecimal numbers. Example of an IPv6 address: "2023:abcd:9a70:34a1c:b1c2:d6a6:b1d7:a9b9".

While the examples described in this disclosure describe the use of encoded addresses for the IPv6 protocol, this is not intended to be limiting. In other user cases, the routing techniques described herein can also be used with other networking protocols, other than IPv6. For example, the encoded address computed in 1310 can be for a different networking protocol, other than IPv6, and may be in the format of that different protocol. The novel routing techniques described herein can be used with any network protocol that provides for a header field that can accommodate an encoded address.

At 1312, the service owning the compute instance sends an FQDN update message to one or more DNS servers, where the update message includes the original IP address and the particular FQDN (e.g., "oracleservice.oracle.com") associated with the service. The processing in 1312 is typically performed by the control plane of the service.

At 1314, a DNS server receives the FQDN update message sent in 1312. Processing then continues with 1320 depicted in FIG. 13B. While FIGS. 13A and 13B depict a single DNS server, this is not intended to be limiting. There could be multiple DNS servers that perform the processing depicted in FIGS. 13A and 13B.

At 1320, the DNS server stores or updates a DNS record associating the particular FQDN with the original IP address. At 1322, the DNS server broadcasts a discovery message with the original IP address and the particular FQDN.

The discovery message broadcasted in 1320 may be received/intercepted by multiple NVDs in the distributed environment, including the NVD that is configured to host the VNIC assigned to the compute instance and associated with original IP address. Accordingly, at 1324, the NVD hosting the VNIC for the compute instance intercepts the broadcasted discovery message.

The NVD then performs a series of checks to determine whether it should respond to the discovery message. At 1326, the NVD checks if it hosts a VNIC associated with the original IP address and the FQDN identified in the discovery message. Upon determining that the NVD does host a VNIC associated with the original IP address and the FQDN identified in the discovery message, processing continues with 1328. Else, processing ends.

At 1328, the NVD checks if the encoded address feature is enabled for the original IP address and the associated VNIC. If enabled, then processing continues with 1330, else processing ends. In certain implementations, the VNIC with which the original IP address is associated may store information (e.g., a flag, a flag bit) indicating whether the VNIC, which is associated with the original IP address and the compute instance with which the VNIC is associated, participates in the novel routing described herein, i.e., whether the novel routing feature is enabled for the original IP address and the associated VNIC. The service provider has the flexibility to decide whether the novel routing feature is enabled or for a particular original IP address for a compute instance. In certain implementations, information indicative of whether or not the feature is enabled may be sent out as part of the configuration information sent out in 1306. The ability to turn the feature on or off for certain IP addresses enables both the novel routing and the regular routing (i.e., that does not involve the use of an encoded address, as described herein) to be supported in parallel by the routing devices. This also provides backward compatibility to support services and associated compute instances that have not been upgraded to support the novel routing features described in this disclosure.

Upon determining in 1328 that the novel routing feature is enabled for the original IP address, at 1330, the NVD generates and sends a response to the DNS server, responsive to the discovery message intercepted in 1324, where the response includes the encoded address generated by the NVD in 1310. The particular FQDN may also be included in the response. In certain use cases, information identifying an expiry time may be included in the response, where the expiry time is indicative of a time period (e.g., how long) the encoded address is valid before being considered to have expired.

At 1332, the DNS server receives the NVD's response to the discovery message, where the response includes the encoded address. At 1334, the DNS server updates the DNS record stored (e.g., stored in 1320) for the particular FQDN by replacing the original IP address associated with the particular FQDN with the encoded address received in 1332.

After the update in 1332 is performed, whenever the DNS server receives a DNS resolution request for the particular FQDN (e.g., for oracleservice.oracle.com), the DNS will respond with the encoded address, instead of the original IP address. In this manner, the DNS server is now configured to support the novel routing feature. For example, when an IPv6 capable client triggers a DNS resolution for the particular FQDN, the DNS server will return the encoded address in the AAAA record, which maps a domain name to the IP address (Version 6) of the computer hosting the domain. In various embodiments, kernels are programmed to use an IPv6 address over an IPv4 address to route traffic. If there is an expiry time associated with the FQDN, the DNS server may ensure that the FQDN-to-encoded address record is updated and marked as expired once the expiry time has elapsed.

In the processing described above, in certain implementations, only the NVDs have to be aware of an encoded address. The service or the control plane may not be aware of the encoded address. Likewise, the DNS server is not aware of whether an IP address is an encoded address or a regular IP address. Processing performed by the DNS server is the same as before and does not need to be modified.

As indicated above, the control plane need not be aware of encoded address, but may be aware of particular NVDs participating in the novel routing scheme. The control plane need not be aware of how the novel routing techniques described herein are implemented (e.g., using encoded IP addresses). In certain implementations, control plane may assign UIDs for NVDs' participation in the novel routing. Assignment of UID does not imply participation in the novel routing since usage of UID may remain unknown to control plane.

As depicted in FIG. 6 and described above, when a packet is communicated from client compute instance 610 to server compute instance 616, the data path taken by the packet originates at client host machine 602 that hosts or executes the client compute instance 610 and terminates at server host machine 608 that hosts or executes server compute instance 616, and traverses client NVD 604 and server NVD 606. The packet is communicated from client host machine 602 to client NVD 604, then from client NVD 604 to server NVD 606, and then from server NVD 606 to server host machine 608. In this communication from the client compute instance 610 to server compute instance 616, the client compute instance 610 is the source of the packet and may be referred to as the source compute instance and server compute instance 616 is the destination of the packet and may be referred to as the destination compute instance. In this communication, client host machine 602 may be referred to as the source host machine, client VNIC 612 may be referred to as the source VNIC, client NVD 604 may be referred to as the source NVD, server VNIC 614 may be referred to as the destination VNIC, server NVD 606 may be referred to as the destination NVD, and server host machine 608 may be referred to as the destination host machine.

When a response is communicated from the server compute instance 616 to the client compute instance 610, as depicted in FIG. 7 and described above, the data path taken by the packet originates at server host machine 608 that hosts or executes the server compute instance 616 and terminates at client host machine 602 that hosts or executes client compute instance 610, and traverses server NVD 606 and client NVD 604. The packet is communicated from server host machine 608 to server NVD 606, then from server NVD 606 to client NVD 604, and then from client NVD 604 to client host machine 602. In this communication from the server compute instance 616 to client compute instance 610, the server compute instance 616 is the source of the packet and may be referred to as the source compute instance and client compute instance 610 is the destination of the packet and may be referred to as the destination compute instance. In this communication, server host machine 608 may be referred to as the server host machine 608, server VNIC 614 may be referred to as the source VNIC, server NVD 606 may be referred to as the source NVD, client VNIC 612 may be referred to as the destination VNIC, client NVD 604 may be referred to as the destination NVD, and client host machine 602 may be referred to as the destination host machine.

In general, when a packet is communicated from a source compute instance to a destination compute instance, the processing performed for routing the packet along the data path from the source compute instance to the destination compute instance comprises the following: (a) processing performed at the source host machine; (b) processing performed at the source NVD; (c) processing performed at the destination NVD; and (d) processing performed at the destination host machine. The processing performed in (a), (b), (c), and (d) according to certain embodiments is depicted in FIGS. 14, 15A, 15B, 16, and 17, and described below. The processing depicted in each of these figures may be implemented in software (e.g., code, instructions, program) executed by one or more processing units (e.g., processors, cores) of the respective systems, using hardware, or combinations thereof. The software may be stored on a non-transitory storage medium (e.g., on a memory device). The methods presented in these figures and described below are intended to be illustrative and non-limiting. Although the figures depict the various processing steps occurring in a particular sequence or order, this is not intended to be limiting. In certain alternative embodiments, the processing may be performed in some different order or some steps may also be performed in parallel. It should be appreciated that in alternative embodiments the processing depicted in each of the figures may include a greater number or a lesser number of steps than those depicted in the individual figures.

FIG. 14 illustrates an example flowchart 1400 depicting processing performed by a source host machine in communicating a packet from a source compute instance to a destination compute instance, according to certain embodiments. The source host machine may be a computer system, or device that hosts or executes the source compute instance. For example, in the embodiment depicted in FIG. 6 showing communication of an overlay packet from client compute instance 610 to server compute instance 616, client host machine 602 is the source host machine. As another example, in the embodiment depicted in FIG. 7 showing communication of an overlay response packet from server compute instance 616 to client compute instance 610, server host machine 608 is the source host machine.

Processing starts at 1402, when an overlay packet is created on a source host machine that executes a source compute instance, where the packet is to be communicated from the source compute instance to a destination compute instance. The overlay packet may include a payload section and a packet header.

At 1404, the source host machine obtains an overlay IP address for the destination compute instance. The processing performed in 1404 may depend upon whether the packet being communicated is a response packet or an original packet. A response packet is one that is being communicated from the source compute instance to the destination compute instance in response to another packet previously received by the source compute instance from the destination compute instance. A packet that is being communicated from the source compute instance to the destination compute instance and which is not a response packet may be referred to as an original packet. For example, overlay packet 618 depicted in FIG. 6 is an original packet whereas overlay response packet 702 depicted in FIG. 7 is an overlay response packet.

If the packet that is to be communicated from the source compute instance to the destination compute instance is an original overlay packet, then the destination IP address for the destination compute instance may be obtained using the FQDN for the destination compute instance. As part of the processing performed in 1404, the source compute instance may initiate a DNS lookup or resolution for the destination compute instance's FQDN. The DNS server responds back with the IP address corresponding to the FQDN to be resolved. The source compute instance executing on a source host machine may thus receive a particular IP address from a DNS server in 1404, where that particular IP address is associated with the destination compute instance's FQDN in the DNS records.

For example, for the communication depicted in FIG. 6, on original overlay packet is being sent from client compute instance 610 on client host machine 602 to server compute instance 616 on server host machine 608. Assuming that the FQDN for server compute instance 616 (the destination compute instance for the communication depicted in FIG. 6) is "oracleservice.oracle.com", then client host machine 602 may initiate a DNS lookup using "oracleservice.oracle.com" and the DNS server 626 may respond back with an IP address associated with this FQDN in the DNS records.

If the packet that is to be communicated from the source compute instance to the destination compute instance is an overlay response packet, then in 1404, the source host machine may obtain the destination IP address for the destination compute instance from a header of a previously received packet by the source host machine to which a response is being sent. For example, in the communication depicted in FIG. 7, an overlay response packet is being communicated from server compute instance 616 to client compute instance 610, where the response packet is in response to overlay packet 622 received by server compute instance 616 from client compute instance 610 as depicted in FIG. 6. As shown in FIG. 8, original overlay packet 622 includes a header that comprises a source address field 810 (shown in FIG. 8) that includes the encoded address of client compute instance 610 that is the source of the packet and to whom a response is to be sent. When an overlay response packet is to be communicated from server compute instance 616 to client compute instance 610 (i.e., client compute instance 610 is now the destination compute instance for the communication shown in FIG. 7), server host machine 608 obtains the encoded address for client compute instance 610 from field 810 of the received original packet 622.

At 1406, a packet header for the overlay packet created in 1402 is configured for communication of the packet from the source compute instance to the destination compute instance. This involves, at 1408, setting the fields of the header to appropriate values. In certain implementations: the source address field (e.g., field 810 in FIG. 8, or field 910 in FIG. 9) is set to the overlay IP address of the source compute instance; the destination address field (e.g., field 812 in FIG. 8, or field 912 in FIG. 9) is set to the encoded address obtained in 1404 for the destination compute instance; the protocol field (e.g., field 814 in FIG. 8, or field 914 in FIG. 9) is set to TCP to indicate TCP as the protocol to be used for the communication; the source port field (e.g., field 816 in FIG. 8, or field 916 in FIG. 9) is set to the port associated with the source compute instance; and the destination port field (e.g., field 818 in FIG. 8, or field 918 in FIG. 9) is set to the port associated with the destination compute instance.

At 1410, the overlay packet, with the header as configured in 1406 and 1408, is communicated from the source host machine to the source NVD that hosts the VNIC associated with the source compute instance. In certain implementations, processing of the packet then continues per flowchart 1500 depicted in FIGS. 15A and 15B, and described below.

FIGS. 15A and 15B illustrate an example flowchart 1500 depicting processing performed by a source NVD in communicating a packet from a source compute instance to a destination compute instance, according to certain embodiments. The source NVD is a physical routing component of the substrate network and hosts or executes a VNIC associated with the source compute instance. For example, in the embodiment depicted in FIG. 6 showing communication of an overlay packet from client compute instance 610 to server compute instance 616, client NVD 604 is the source NVD. As another example, in the embodiment depicted in FIG. 7 showing communication of an overlay response packet from server compute instance 616 to client compute instance 610, server NVD 606 is the source NVD.

Processing commences at 1502 when a source NVD implementing a VNIC for a source compute instance receives an overlay packet from the source host machine executing the source compute instance. At 1504, the source NVD extracts information from the header of the received overlay packet to determine information to be used for routing the received overlay packet from the source NVD. The processing performed in 1504 by the source NVD includes, at 1506, extracting the destination IP address from the destination address field of the received packet's header.

For example, for the communication depicted in FIG. 6, when client NVD 604 receives overlay packet 618 from client host machine 602, client NVD 604 extracts the destination IP address from field 812 of header 802 depicted in FIG. 8. As another example, for the communication depicted in FIG. 7, when server NVD 606 receives overlay packet 702 from server host machine 608, server NVD 606 extracts the destination IP address from field 912 of header 902 depicted in FIG. 9.

At 1508, the source NVD determines whether the address extracted in 1506 is to be treated as an encoded address or a regular IP address. In certain implementations, this is done by inspecting a particular section of the IP address extracted in 1506. As depicted in FIG. 10 and described above, an encoded address comprises a special regional prefix section 1004 that identifies whether an IP address is to be treated as an encoded address or a regular address. Accordingly, as part of the processing in 1508, the source NVD looks at the particular section of the address extracted in 1506 to determine whether the extracted destination address is an encoded address or a regular address. If the source NVD determines that the destination address extracted in 1506 does include the well-known prefix, then the address is treated as a regular address and processing continues with regular address processing (not shown in FIG. 15A). Flowchart 1500 depicted in FIG. 15A assumes that the source NVD determines in 1508 that the destination address extracted in 1506 is an encoded address.

At 1510, the source NVD extracts from the encoded address extracted in 1506 various pieces of information needed by the source NVD to route the overlay packet from the source NVD. In certain implementations, the source NVD determines the following from the encoded address: (1) the substrate IP address of the destination NVD; and (2) the information (e.g., VNIC_UID) that uniquely identifies the destination VNIC.

The source NVD then prepares the overlay packet for communication from the source NVD to the destination NVD. As part of this preparation, at 1512, the source NVD generates an encapsulated overlay packet by adding an encapsulation header to the overlay packet received in 1502. The encapsulation header is added to facilitate communication of the encapsulated overlay packet from the source NVD to the destination NVD via a tunnelling protocol (e.g., using the GENEVE protocol).

At 1514, the source NVD configures the encapsulation header added in 1512 with information that facilitates communication of the encapsulated overlay packet from the source NVD to the destination NVD. As part of this configuring, at 1516, various fields of the encapsulation header are set to certain values. For example: the substrate IP address of the source NVD is entered in the source address field; the substrate IP address of the destination NVD, which is extracted in 1510 from the destination compute instance encoded address, is entered in the destination address field; and the information uniquely identifying the destination VNIC, which is extracted in 1510 from the destination encoded address, is entered in the destination VNIC field.

For example, the client NVD 604 is the source NVD for the communication depicted in FIG. 6. As part of the processing performed in 1516, client NVD 604 sets the various fields of encapsulation header 806 depicted in FIG. 8 as follows:

Source address field 820=Substrate IP address of client NVD 604

Destination address field 822=Substrate IP address of server NVD 606 (this information is determined by the source NVD in 1510 from the destination encoded address extracted from the overlay packet header in 1506)

Destination VNIC field 824=Information (e.g., VNIC_UID) uniquely identifying the server VNIC 614 (this information is determined by the source NVD in 1510 from the destination encoded address extracted from the overlay packet header in 1506).

As another example, the server NVD 606 is the source NVD for the communication depicted in FIG. 7. As part of the processing performed in 1516, server NVD 606 sets the various fields of encapsulation header 906 depicted in FIG. 9 as follows:

Source address field 920=Substrate IP address of server NVD 606

Destination address field 922=Substrate IP address of the client NVD 604 (this information is determined by the source NVD in 1510 from the destination encoded address extracted from the overlay packet header in 1506)

Destination VNIC field 924=Information (e.g., VNIC_UID) uniquely identifying client VNIC 612 (this information is determined by the source NVD in 1510 from the destination encoded address extracted from the overlay packet header in 1506).

Processing then continues with 1520 in FIG. 15B.

In 1520, the source NVD determines the encoded address for the source compute instance. As described above, a source NVD may generate the encoded address for a source compute instance when the source NVD is configured to host or implement the source VNIC associated with the source compute instance. For example, as depicted in 1308 and 1310 in FIG. 13A, the source NVD may receive information that is needed for generating an encoded address for a source compute instance when the NVD is configured to implement the source VNIC associated with the source compute instance, and the source NVD may then generate the encoded address for the source compute instance using the received information. Accordingly, the source NVD knows of the encoded address for the source compute instance.

For example, for the communication depicted in FIG. 6 where client NVD 604 is the source NVD, as part of the processing 1520, the client NVD 604 may determine the encoded address for client compute instance 610. As another example, for the communication depicted in FIG. 7 where server NVD 606 is the source NVD, as part of the processing 1520, the server NVD 606 may determine the encoded address for server compute instance 616.

At 1522, the source address field of the overlay packet header in the encapsulated overlay packet is updated to include the encoded address determined in 1520 for the source compute instance. For example, for the communication depicted in FIG. 6 where client NVD 604 is the source NVD, as part of the processing 1522, source address field 810 of overlay packet header 804 is updated to include the encoded address for client compute instance 610 determined in 1520. As another example, for the communication depicted in FIG. 7 where server NVD 606 is the source NVD, as part of the processing 1522, source address field 910 of overlay packet header 904 is updated to include the encoded address for server compute instance 616 determined in 1520.

At 1524, the encapsulated overlay packet is communicated from the source NVD to the destination NVD using the information in the encapsulation header of the packet. In certain implementations, processing of the packet then continues per flowchart 1600 depicted in FIG. 16 and described below.

FIG. 16 illustrates an example flowchart 1600 depicting processing performed by a destination NVD in communicating a packet from a source compute instance to a destination compute instance, according to certain embodiments. Like the source NVD, the destination NVD is a physical routing component of the substrate network and hosts or implements a destination VNIC associated with the destination compute instance. For example, in the embodiment depicted in FIG. 6 showing communication of an overlay packet from client compute instance 610 to server compute instance 616, server NVD 606 is the destination NVD. As another example, in the embodiment depicted in FIG. 7 showing communication of an overlay response packet from server compute instance 616 to client compute instance 610, client NVD 604 is the destination NVD.

As depicted in FIG. 16, processing starts at 1602, when the destination NVD receives an encapsulated overlay packet from a source NVD. For example, in the embodiment depicted in FIG. 6 that shows communication of an overlay packet from client compute instance 610 to server compute instance 616, in 1602, server NVD 606 receives encapsulated overlay packet 620 communicated by client NVD 604. As another example, in the embodiment depicted in FIG. 7 that shows communication of an overlay response packet from server compute instance 616 to client compute instance 610, in 1602, client NVD 604 receives encapsulated overlay response packet 704 communicated by server NVD 606.

At 1604, the destination NVD decapsulates the received packet. This includes removing the encapsulated header from the received packet to obtain an overlay packet.

At 1606, the destination NVD determines the overlay IP address for the destination compute instance from the encoded address that is included in the header of the overlay packet obtained in 1604. As previously indicated, the encoded address for the destination compute instance includes a section that identifies a unique identifier (UID) that corresponds to an overlay IP address that is assigned to the destination VNIC which is associated with the destination compute instance. This overlay IP address assigned to the destination VNIC is the overlay IP address of the destination compute instance. Accordingly, as part of the processing performed in 1606, the destination NVD determines the UID from encoded address for the destination compute instance, and uses the UID to determine the corresponding overlay IP address of the destination compute instance.

At 1608, the destination NVD updates the destination address field of the overlay packet to include the overlay IP address for the destination compute instance determined in 1606. For example, as depicted in FIG. 8, the value included in field 812 of header 808 is changed from the encoded address for the server compute instance (which is the destination compute instance) to the overlay IP address for server compute instance 616. As another example, as depicted in FIG. 9, the value included in field 912 of header 908 is changed from the encoded address for the client compute instance (which is the destination compute instance) to the overlay IP address for client compute instance 610.

At 1610, the overlay packet is communicated from the destination NVD to the destination host machine that executes the destination compute instance. For example, in the embodiment depicted in FIG. 6 that shows communication of an overlay packet from client compute instance 610 to server compute instance 616, in 1610, the packet is communicated from server NVD 606 to server host machine 608. As another example, in the embodiment depicted in FIG. 7 that shows communication of an overlay response packet from server compute instance 616 to client compute instance 610, in 1610, the response packet is communicated from client NVD 604 to client host machine 602. In certain implementations, processing of the packet then continues per flowchart 1700 depicted in FIG. 17, and described below.

FIG. 17 illustrates an example flowchart 1700 depicting processing performed by a destination host machine in communicating a packet from a source compute instance to a destination compute instance, according to certain embodiments. The destination host machine may be a computer system or device that hosts or executes the destination compute instance. For example, in the embodiment depicted in FIG. 6 showing communication of an overlay packet from client compute instance 610 to server compute instance 616, server host machine 608 is the destination host machine. As another example, in the embodiment depicted in FIG. 7 showing communication of an overlay response packet from server compute instance 616 to client compute instance 610, client host machine 602 is the destination host machine.

As depicted in FIG. 17, processing starts at 1702, when the destination host machine receives an overlay packet from a destination NVD. The destination compute instance then performs processing to determine which particular compute instance hosted or executed by destination host machine is the intended recipient of the received overlay packet. As part of this processing, at 1704, the destination host machine determines an overlay IP address included in the destination address field in the header of the received overlay packet.

For example, in the embodiment depicted in FIG. 6 that shows communication of an overlay packet from client compute instance 610 to server compute instance 616, the packet received by server host machine 608 (which is the destination host machine) has a header 808 as shown in FIG. 8. Destination address field 812 of header 808 includes information that identifies the overlay IP address of server compute instance 616 (which is the destination compute instance).

As another example, in the embodiment depicted in FIG. 7 that shows communication of an overlay packet from server compute instance 616 to client compute instance 610, the packet received by client host machine 602 (which is the destination host machine) has a header 908 as shown in FIG. 9. Destination address field 912 of header 908 includes information that identifies the overlay IP address of client compute instance 610 (which is the destination compute instance).

At 1706, the overlay packet is forwarded to the compute instance (the destination compute instance) hosted or executed by the destination host machine corresponding to the IP address determined in 1704. This concludes the communication of a packet from the source compute instance to the destination compute instance.

In the various embodiments described above, the VNICs associated with the source and destination instances are executed by NVDs implementing the VNICs. For example, the source NVD implements the source VNIC and the destination NVD implements the destination VNIC. In some other embodiments, the functionality provided by the NVDs may be centralized in a fleet of host machines implementing the VNICs. These host machines may be part of a VNIC-as-a-Service (VNICaaS) system. The VNICaaS system may include a fleet of computing devices (e.g., servers) executing multiple VNICs and performing routing of packets originating from and/or destined to compute instances associated with the VNICs in VCNs and overlay networks. In such an embodiment, an overlay packet may be communicated from a source host machine executing a source compute instance to the VNICaaS system that implements the source VNIC. The VNICaaS system may then perform the source VNIC related functionality and processing discussed above. The destination VNIC may also be implemented by the VNICaaS system. Accordingly, functionality related to the destination VNIC and described above may be performed by the VNICaaS system.

The novel routing techniques described in this disclosure enable overlay packets to be routed in overlay networks utilizing a special encoded address, also referred to as an encoded address, and without using any routing state information stored on the routing devices. The NVDs in the data path traversed by an overlay packet from the source compute instance to a destination compute instance are able to route the packet using the encoded address included in a header of the packet received by the NVDs. As a result, the amount of memory and processing resources needed by the routing devices (e.g., by the NVDs) to perform such routing within the cloud computing environment is reduced. Due to reduced need for memory and compute resources, even as the CSP's network increases in size, the routing can still be efficiently performed with low latency using existing network devices or devices that do not require upgraded memory and processing capabilities. The complexity associated with conventional routing techniques in maintaining updated routing state information that is used for packet routing is also eliminated.

Various embodiments and use cases described in this disclosure describe the use of the encoded addresses for routing packets in the overlay network using the TCP/IP protocol. This however is not intended to be limiting. The techniques described herein can also be used with other networking protocols, not just TCP/IP. The special encoded addresses are thus not limited to representing IP addresses. The novel routing techniques described herein can be used with any network protocol that provides for a header field that can accommodate an encoded address.

Example Cloud Infrastructure Architectures for Providing Cloud Services

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 18:
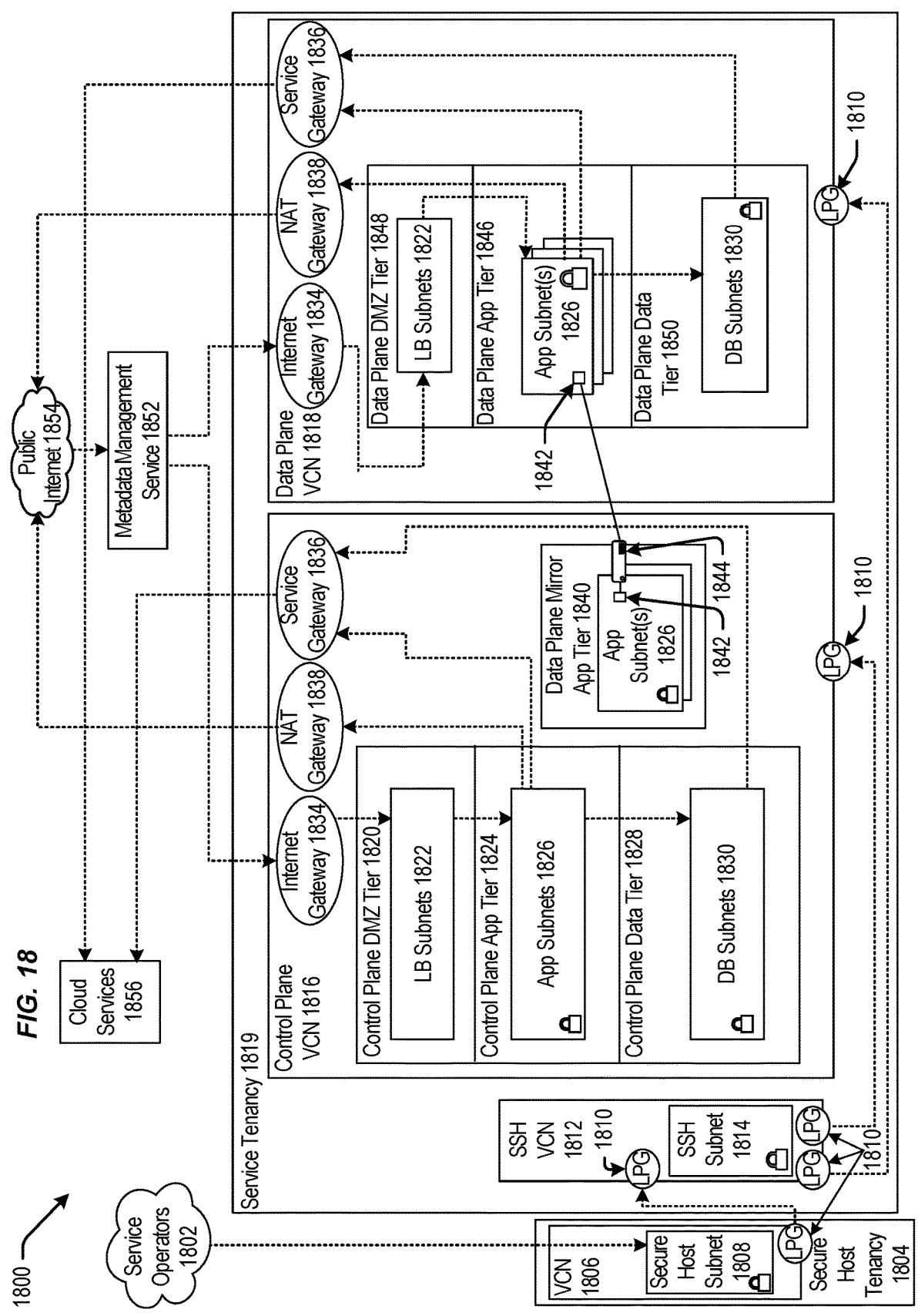
FIG. 18 is a block diagram illustrating one pattern for implementing a cloud infrastructure as a service system, according to at least one embodiment.

FIG. 18 is a block diagram 1800 illustrating an example pattern of an IaaS architecture, according to at least one embodiment. Service operators 1802 can be communicatively coupled to a secure host tenancy 1804 that can include a virtual cloud network (VCN) 1806 and a secure host subnet 1808. In some examples, the service operators 1802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1806 and/or the Internet.

The VCN 1806 can include a local peering gateway (LPG) 1810 that can be communicatively coupled to a secure shell (SSH) VCN 1812 via an LPG 1810 contained in the SSH VCN 1812. The SSH VCN 1812 can include an SSH subnet 1814, and the SSH VCN 1812 can be communicatively coupled to a control plane VCN 1816 via the LPG 1810 contained in the control plane VCN 1816. Also, the SSH VCN 1812 can be communicatively coupled to a data plane VCN 1818 via an LPG 1810. The control plane VCN 1816 and the data plane VCN 1818 can be contained in a service tenancy 1819 that can be owned and/or operated by the IaaS provider.

The control plane VCN 1816 can include a control plane demilitarized zone (DMZ) tier 1820 that acts as a perimeter network (e.g., portions of a corporate network between the corporate intranet and external networks). The DMZ-based servers may have restricted responsibilities and help keep breaches contained. Additionally, the DMZ tier 1820 can include one or more load balancer (LB) subnet(s) 1822, a control plane app tier 1824 that can include app subnet(s) 1826, a control plane data tier 1828 that can include database (DB) subnet(s) 1830 (e.g., frontend DB subnet(s) and/or backend DB subnet(s)). The LB subnet(s) 1822 contained in the control plane DMZ tier 1820 can be communicatively coupled to the app subnet(s) 1826 contained in the control plane app tier 1824 and an Internet gateway 1834 that can be contained in the control plane VCN 1816, and the app subnet(s) 1826 can be communicatively coupled to the DB subnet(s) 1830 contained in the control plane data tier 1828 and a service gateway 1836 and a network address translation (NAT) gateway 1838. The control plane VCN 1816 can include the service gateway 1836 and the NAT gateway 1838.

The control plane VCN 1816 can include a data plane mirror app tier 1840 that can include app subnet(s) 1826. The app subnet(s) 1826 contained in the data plane mirror app tier 1840 can include a virtual network interface controller (VNIC) 1842 that can execute a compute instance 1844. The compute instance 1844 can communicatively couple the app subnet(s) 1826 of the data plane mirror app tier 1840 to app subnet(s) 1826 that can be contained in a data plane app tier 1846.

The data plane VCN 1818 can include the data plane app tier 1846, a data plane DMZ tier 1848, and a data plane data tier 1850. The data plane DMZ tier 1848 can include LB subnet(s) 1822 that can be communicatively coupled to the app subnet(s) 1826 of the data plane app tier 1846 and the Internet gateway 1834 of the data plane VCN 1818. The app subnet(s) 1826 can be communicatively coupled to the service gateway 1836 of the data plane VCN 1818 and the NAT gateway 1838 of the data plane VCN 1818. The data plane data tier 1850 can also include the DB subnet(s) 1830 that can be communicatively coupled to the app subnet(s) 1826 of the data plane app tier 1846.

The Internet gateway 1834 of the control plane VCN 1816 and of the data plane VCN 1818 can be communicatively coupled to a metadata management service 1852 that can be communicatively coupled to public Internet 1854. Public Internet 1854 can be communicatively coupled to the NAT gateway 1838 of the control plane VCN 1816 and of the data plane VCN 1818. The service gateway 1836 of the control plane VCN 1816 and of the data plane VCN 1818 can be communicatively couple to cloud services 1856.

In some examples, the service gateway 1836 of the control plane VCN 1816 or of the data plane VCN 1818 can make application programming interface (API) calls to cloud services 1856 without going through public Internet 1854. The API calls to cloud services 1856 from the service gateway 1836 can be one-way: the service gateway 1836 can make API calls to cloud services 1856, and cloud services 1856 can send requested data to the service gateway 1836. But cloud services 1856 may not initiate API calls to the service gateway 1836.

In some examples, the secure host tenancy 1804 can be directly connected to the service tenancy 1819, which may be otherwise isolated. The secure host subnet 1808 can communicate with the SSH subnet 1814 through an LPG 1810 that may enable two-way communication over an otherwise isolated system. Connecting the secure host subnet 1808 to the SSH subnet 1814 may give the secure host subnet 1808 access to other entities within the service tenancy 1819.

The control plane VCN 1816 may allow users of the service tenancy 1819 to set up or otherwise provision desired resources. Desired resources provisioned in the control plane VCN 1816 may be deployed or otherwise used in the data plane VCN 1818. In some examples, the control plane VCN 1816 can be isolated from the data plane VCN 1818, and the data plane mirror app tier 1840 of the control plane VCN 1816 can communicate with the data plane app tier 1846 of the data plane VCN 1818 via VNICs 1842 that can be contained in the data plane mirror app tier 1840 and the data plane app tier 1846.

In some examples, users of the system, or customers, can make requests, for example create, read, update, or delete (CRUD) operations, through public Internet 1854 that can communicate the requests to the metadata management service 1852. The metadata management service 1852 can communicate the request to the control plane VCN 1816 through the Internet gateway 1834. The request can be received by the LB subnet(s) 1822 contained in the control plane DMZ tier 1820. The LB subnet(s) 1822 may determine that the request is valid, and in response to this determination, the LB subnet(s) 1822 can transmit the request to app subnet(s) 1826 contained in the control plane app tier 1824. If the request is validated and requires a call to public Internet 1854, the call to public Internet 1854 may be transmitted to the NAT gateway 1838 that can make the call to public Internet 1854. Metadata that may be desired to be stored by the request can be stored in the DB subnet(s) 1830.

In some examples, the data plane mirror app tier 1840 can facilitate direct communication between the control plane VCN 1816 and the data plane VCN 1818. For example, changes, updates, or other suitable modifications to configuration may be desired to be applied to the resources contained in the data plane VCN 1818. Via a VNIC 1842, the control plane VCN 1816 can directly communicate with, and can thereby execute the changes, updates, or other suitable modifications to configuration to, resources contained in the data plane VCN 1818.

In some embodiments, the control plane VCN 1816 and the data plane VCN 1818 can be contained in the service tenancy 1819. In this case, the user, or the customer, of the system may not own or operate either the control plane VCN 1816 or the data plane VCN 1818. Instead, the IaaS provider may own or operate the control plane VCN 1816 and the data plane VCN 1818, both of which may be contained in the service tenancy 1819. This embodiment can enable isolation of networks that may prevent users or customers from interacting with other users' or other customers' resources. Also, this embodiment may allow users or customers of the system to store databases privately without needing to rely on public Internet 1854, which may not have a desired level of threat prevention, for storage.

In other embodiments, the LB subnet(s) 1822 contained in the control plane VCN 1816 can be configured to receive a signal from the service gateway 1836. In this embodiment, the control plane VCN 1816 and the data plane VCN 1818 may be configured to be called by a customer of the IaaS provider without calling public Internet 1854. Customers of the IaaS provider may desire this embodiment since database(s) that the customers use may be controlled by the IaaS provider and may be stored on the service tenancy 1819, which may be isolated from public Internet 1854.

Figure 19:
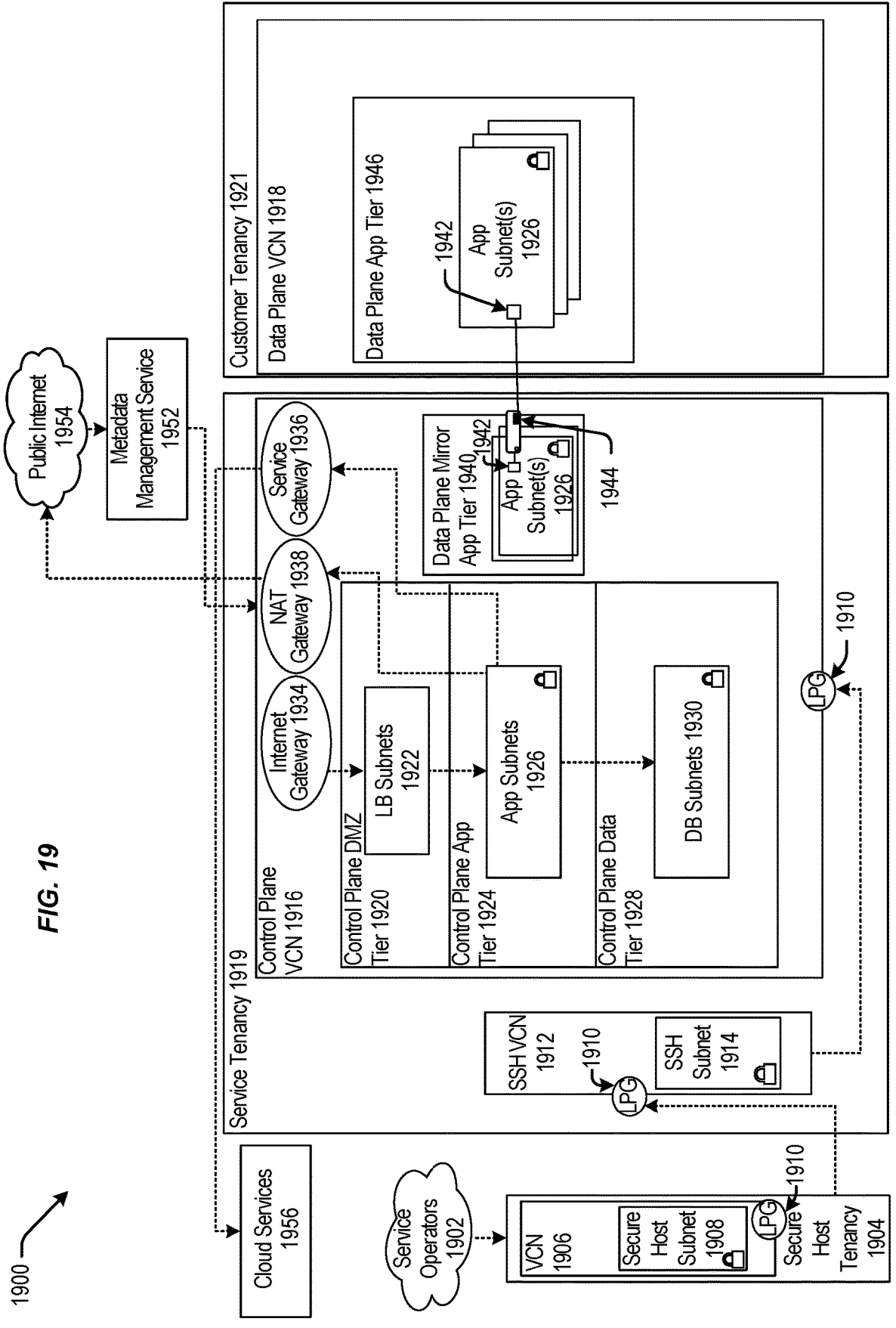
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1802 of FIG. 18) can be communicatively coupled to a secure host tenancy 1904 (e.g., the secure host tenancy 1804 of FIG. 18) that can include a virtual cloud network (VCN) 1906 (e.g., the VCN 1806 of FIG. 18) and a secure host subnet 1908 (e.g., the secure host subnet 1808 of FIG. 18). The VCN 1906 can include a local peering gateway (LPG) 1910 (e.g., the LPG 1810 of FIG. 18) that can be communicatively coupled to a secure shell (SSH) VCN 1912 (e.g., the SSH VCN 1812 of FIG. 18) via an LPG 1810 contained in the SSH VCN 1912. The SSH VCN 1912 can include an SSH subnet 1914 (e.g., the SSH subnet 1814 of FIG. 18), and the SSH VCN 1912 can be communicatively coupled to a control plane VCN 1916 (e.g., the control plane VCN 1816 of FIG. 18) via an LPG 1910 contained in the control plane VCN 1916. The control plane VCN 1916 can be contained in a service tenancy 1919 (e.g., the service tenancy 1819 of FIG. 18), and the data plane VCN 1918 (e.g., the data plane VCN 1818 of FIG. 18) can be contained in a customer tenancy 1921 that may be owned or operated by users, or customers, of the system.

The control plane VCN 1916 can include a control plane DMZ tier 1920 (e.g., the control plane DMZ tier 1820 of FIG. 18) that can include LB subnet(s) 1922 (e.g., LB subnet(s) 1822 of FIG. 18), a control plane app tier 1924 (e.g., the control plane app tier 1824 of FIG. 18) that can include app subnet(s) 1926 (e.g., app subnet(s) 1826 of FIG. 18), a control plane data tier 1928 (e.g., the control plane data tier 1828 of FIG. 18) that can include database (DB) subnet(s) 1930 (e.g., similar to DB subnet(s) 1830 of FIG. 18). The LB subnet(s) 1922 contained in the control plane DMZ tier 1920 can be communicatively coupled to the app subnet(s) 1926 contained in the control plane app tier 1924 and an Internet gateway 1934 (e.g., the Internet gateway 1834 of FIG. 18) that can be contained in the control plane VCN 1916, and the app subnet(s) 1926 can be communicatively coupled to the DB subnet(s) 1930 contained in the control plane data tier 1928 and a service gateway 1936 (e.g., the service gateway 1836 of FIG. 18) and a network address translation (NAT) gateway 1938 (e.g., the NAT gateway 1838 of FIG. 18). The control plane VCN 1916 can include the service gateway 1936 and the NAT gateway 1938.

The control plane VCN 1916 can include a data plane mirror app tier 1940 (e.g., the data plane mirror app tier 1840 of FIG. 18) that can include app subnet(s) 1926. The app subnet(s) 1926 contained in the data plane mirror app tier 1940 can include a virtual network interface controller (VNIC) 1942 (e.g., the VNIC of 1842) that can execute a compute instance 1944 (e.g., similar to the compute instance 1844 of FIG. 18). The compute instance 1944 can facilitate communication between the app subnet(s) 1926 of the data plane mirror app tier 1940 and the app subnet(s) 1926 that can be contained in a data plane app tier 1946 (e.g., the data plane app tier 1846 of FIG. 18) via the VNIC 1942 contained in the data plane mirror app tier 1940 and the VNIC 1942 contained in the data plane app tier 1946.

The Internet gateway 1934 contained in the control plane VCN 1916 can be communicatively coupled to a metadata management service 1952 (e.g., the metadata management service 1852 of FIG. 18) that can be communicatively coupled to public Internet 1954 (e.g., public Internet 1854 of FIG. 18). Public Internet 1954 can be communicatively coupled to the NAT gateway 1938 contained in the control plane VCN 1916. The service gateway 1936 contained in the control plane VCN 1916 can be communicatively couple to cloud services 1956 (e.g., cloud services 1856 of FIG. 18).

In some examples, the data plane VCN 1918 can be contained in the customer tenancy 1921. In this case, the IaaS provider may provide the control plane VCN 1916 for each customer, and the IaaS provider may, for each customer, set up a unique compute instance 1944 that is contained in the service tenancy 1919. Each compute instance 1944 may allow communication between the control plane VCN 1916, contained in the service tenancy 1919, and the data plane VCN 1918 that is contained in the customer tenancy 1921. The compute instance 1944 may allow resources, which are provisioned in the control plane VCN 1916 that is contained in the service tenancy 1919, to be deployed or otherwise used in the data plane VCN 1918 that is contained in the customer tenancy 1921.

In other examples, the customer of the IaaS provider may have databases that live in the customer tenancy 1921. In this example, the control plane VCN 1916 can include the data plane mirror app tier 1940 that can include app subnet(s) 1926. The data plane mirror app tier 1940 can reside in the data plane VCN 1918, but the data plane mirror app tier 1940 may not live in the data plane VCN 1918. That is, the data plane mirror app tier 1940 may have access to the customer tenancy 1921, but the data plane mirror app tier 1940 may not exist in the data plane VCN 1918 or be owned or operated by the customer of the IaaS provider. The data plane mirror app tier 1940 may be configured to make calls to the data plane VCN 1918 but may not be configured to make calls to any entity contained in the control plane VCN 1916. The customer may desire to deploy or otherwise use resources in the data plane VCN 1918 that are provisioned in the control plane VCN 1916, and the data plane mirror app tier 1940 can facilitate the desired deployment, or other usage of resources, of the customer.

In some embodiments, the customer of the IaaS provider can apply filters to the data plane VCN 1918. In this embodiment, the customer can determine what the data plane VCN 1918 can access, and the customer may restrict access to public Internet 1954 from the data plane VCN 1918. The IaaS provider may not be able to apply filters or otherwise control access of the data plane VCN 1918 to any outside networks or databases. Applying filters and controls by the customer onto the data plane VCN 1918, contained in the customer tenancy 1921, can help isolate the data plane VCN 1918 from other customers and from public Internet 1954.

In some embodiments, cloud services 1956 can be called by the service gateway 1936 to access services that may not exist on public Internet 1954, on the control plane VCN 1916, or on the data plane VCN 1918. The connection between cloud services 1956 and the control plane VCN 1916 or the data plane VCN 1918 may not be live or continuous. Cloud services 1956 may exist on a different network owned or operated by the IaaS provider. Cloud services 1956 may be configured to receive calls from the service gateway 1936 and may be configured to not receive calls from public Internet 1954. Some cloud services 1956 may be isolated from other cloud services 1956, and the control plane VCN 1916 may be isolated from cloud services 1956 that may not be in the same region as the control plane VCN 1916. For example, the control plane VCN 1916 may be located in "Region 1," and cloud service "Deployment 16," may be located in Region 1 and in "Region 2." If a call to Deployment 16 is made by the service gateway 1936 contained in the control plane VCN 1916 located in Region 1, the call may be transmitted to Deployment 16 in Region 1. In this example, the control plane VCN 1916, or Deployment 16 in Region 1, may not be communicatively coupled to, or otherwise in communication with, Deployment 16 in Region 2.

FIG. 20 is a block diagram 2000 illustrating another example pattern of an IaaS architecture, according to at least one embodiment. Service operators 2002 (e.g., service operators 1802 of FIG. 18) can be communicatively coupled to a secure host tenancy 2004 (e.g., the secure host tenancy 1804 of FIG. 18) that can include a virtual cloud network (VCN) 2006 (e.g., the VCN 1806 of FIG. 18) and a secure host subnet 2008 (e.g., the secure host subnet 1808 of FIG. 18). The VCN 2006 can include an LPG 2010 (e.g., the LPG 1810 of FIG. 18) that can be communicatively coupled to an SSH VCN 2012 (e.g., the SSH VCN 1812 of FIG. 18) via an LPG 2010 contained in the SSH VCN 2012. The SSH VCN 2012 can include an SSH subnet 2014 (e.g., the SSH subnet 1814 of FIG. 18), and the SSH VCN 2012 can be communicatively coupled to a control plane VCN 2016 (e.g., the control plane VCN 1816 of FIG. 18) via an LPG 2010 contained in the control plane VCN 2016 and to a data plane VCN 2018 (e.g., the data plane 1818 of FIG. 18) via an LPG 2010 contained in the data plane VCN 2018. The control plane VCN 2016 and the data plane VCN 2018 can be contained in a service tenancy 2019 (e.g., the service tenancy 1819 of FIG. 18).

The control plane VCN 2016 can include a control plane DMZ tier 2020 (e.g., the control plane DMZ tier 1820 of FIG. 18) that can include load balancer (LB) subnet(s) 2022 (e.g., LB subnet(s) 1822 of FIG. 18), a control plane app tier 2024 (e.g., the control plane app tier 1824 of FIG. 18) that can include app subnet(s) 2026 (e.g., similar to app subnet(s) 1826 of FIG. 18), a control plane data tier 2028 (e.g., the control plane data tier 1828 of FIG. 18) that can include DB subnet(s) 2030. The LB subnet(s) 2022 contained in the control plane DMZ tier 2020 can be communicatively coupled to the app subnet(s) 2026 contained in the control plane app tier 2024 and to an Internet gateway 2034 (e.g., the Internet gateway 1834 of FIG. 18) that can be contained in the control plane VCN 2016, and the app subnet(s) 2026 can be communicatively coupled to the DB subnet(s) 2030 contained in the control plane data tier 2028 and to a service gateway 2036 (e.g., the service gateway of FIG. 18) and a network address translation (NAT) gateway 2038 (e.g., the NAT gateway 1838 of FIG. 18). The control plane VCN 2016 can include the service gateway 2036 and the NAT gateway 2038.

The data plane VCN 2018 can include a data plane app tier 2046 (e.g., the data plane app tier 1846 of FIG. 18), a data plane DMZ tier 2048 (e.g., the data plane DMZ tier 1848 of FIG. 18), and a data plane data tier 2050 (e.g., the data plane data tier 1850 of FIG. 18). The data plane DMZ tier 2048 can include LB subnet(s) 2022 that can be communicatively coupled to trusted app subnet(s) 2060 and untrusted app subnet(s) 2062 of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include one or more primary VNICs 2064(1)-(N) that can be communicatively coupled to tenant virtual machines (VMs) 2066(1)-(N). Each tenant VM 2066(1)-(N) can be communicatively coupled to a respective app subnet 2067(1)-(N) that can be contained in respective container egress VCNs 2068(1)-(N) that can be contained in respective customer tenancies 2070(1)-(N). Respective secondary VNICs 2072(1)-(N) can facilitate communication between the untrusted app subnet(s) 2062 contained in the data plane VCN 2018 and the app subnet contained in the container egress VCNs 2068(1)-(N). Each container egress VCNs 2068(1)-(N) can include a NAT gateway 2038 that can be communicatively coupled to public Internet 2054 (e.g., public Internet 1854 of FIG. 18).

The Internet gateway 2034 contained in the control plane VCN 2016 and contained in the data plane VCN 2018 can be communicatively coupled to a metadata management service 2052 (e.g., the metadata management system 1852 of FIG. 18) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively couple to cloud services 2056.

In some embodiments, the data plane VCN 2018 can be integrated with customer tenancies 2070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2046. Code to run the function may be executed in the VMs 2066(1)-(N), and the code may not be configured to run anywhere else on the data plane VCN 2018. Each VM 2066(1)-(N) may be connected to one customer tenancy 2070. Respective containers 2071(1)-(N) contained in the VMs 2066(1)-(N) may be configured to run the code. In this case, there can be a dual isolation (e.g., the containers 2071(1)-(N) running code, where the containers 2071(1)-(N) may be contained in at least the VM 2066(1)-(N) that are contained in the untrusted app subnet(s) 2062), which may help prevent incorrect or otherwise undesirable code from damaging the network of the IaaS provider or from damaging a network of a different customer. The containers 2071 (1)-(N) may be communicatively coupled to the customer tenancy 2070 and may be configured to transmit or receive data from the customer tenancy 2070. The containers 2071 (1)-(N) may not be configured to transmit or receive data from any other entity in the data plane VCN 2018. Upon completion of running the code, the IaaS provider may kill or otherwise dispose of the containers 2071(1)-(N).

In some embodiments, the trusted app subnet(s) 2060 may run code that may be owned or operated by the IaaS provider. In this embodiment, the trusted app subnet(s) 2060 may be communicatively coupled to the DB subnet(s) 2030 and be configured to execute CRUD operations in the DB subnet(s) 2030. The untrusted app subnet(s) 2062 may be communicatively coupled to the DB subnet(s) 2030, but in this embodiment, the untrusted app subnet(s) may be configured to execute read operations in the DB subnet(s) 2030. The containers 2071(1)-(N) that can be contained in the VM 2066(1)-(N) of each customer and that may run code from the customer may not be communicatively coupled with the DB subnet(s) 2030.

In other embodiments, the control plane VCN 2016 and the data plane VCN 2018 may not be directly communicatively coupled. In this embodiment, there may be no direct communication between the control plane VCN 2016 and the data plane VCN 2018. However, communication can occur indirectly through at least one method. An LPG 2010 may be established by the IaaS provider that can facilitate communication between the control plane VCN 2016 and the data plane VCN 2018. In another example, the control plane VCN 2016 or the data plane VCN 2018 can make a call to cloud services 2056 via the service gateway 2036. For example, a call to cloud services 2056 from the control plane VCN 2016 can include a request for a service that can communicate with the data plane VCN 2018.

Figure 21:
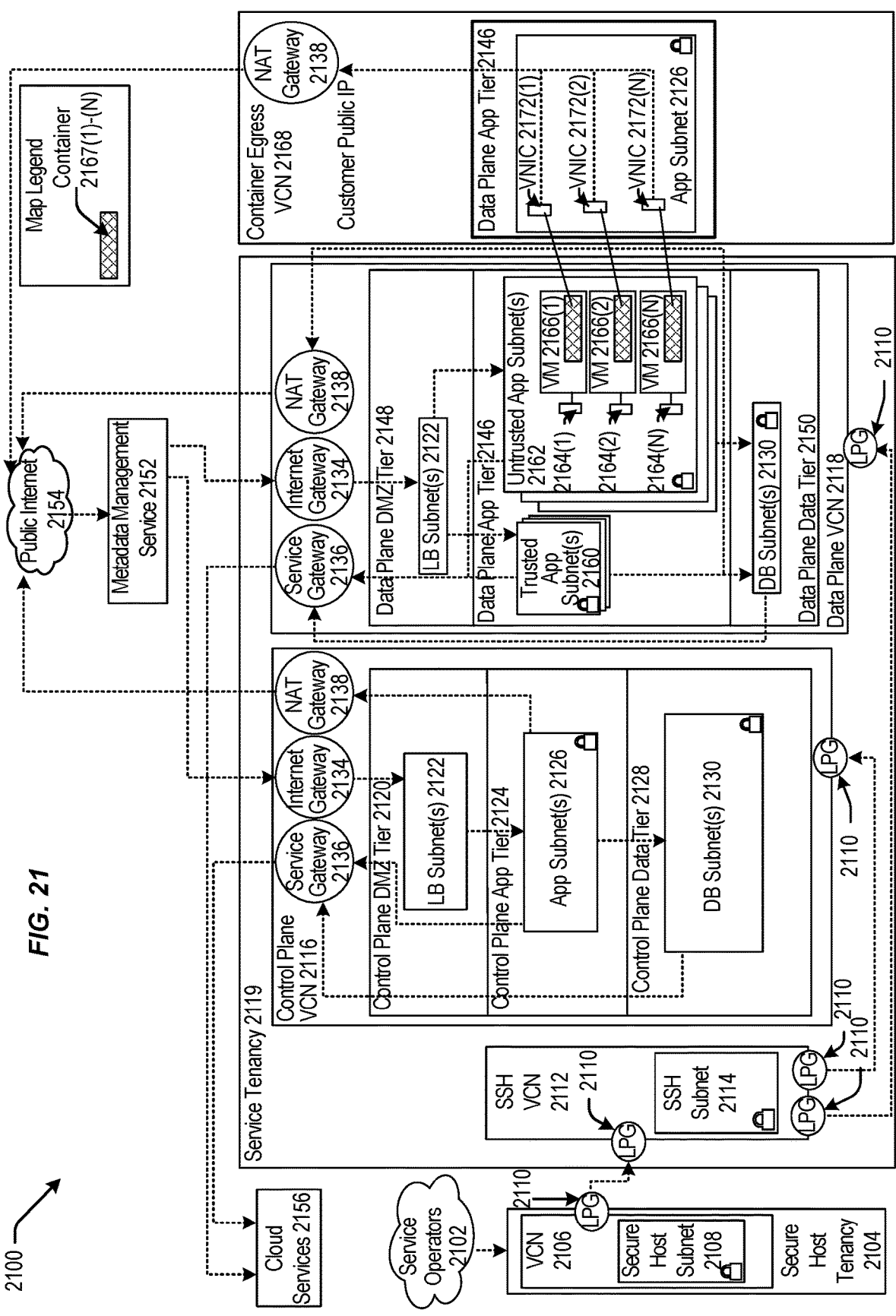
FIG. 21 is a block diagram illustrating another pattern for implementing a cloud infrastructure as a service system, according to at least one embodiment.
Figure 22:
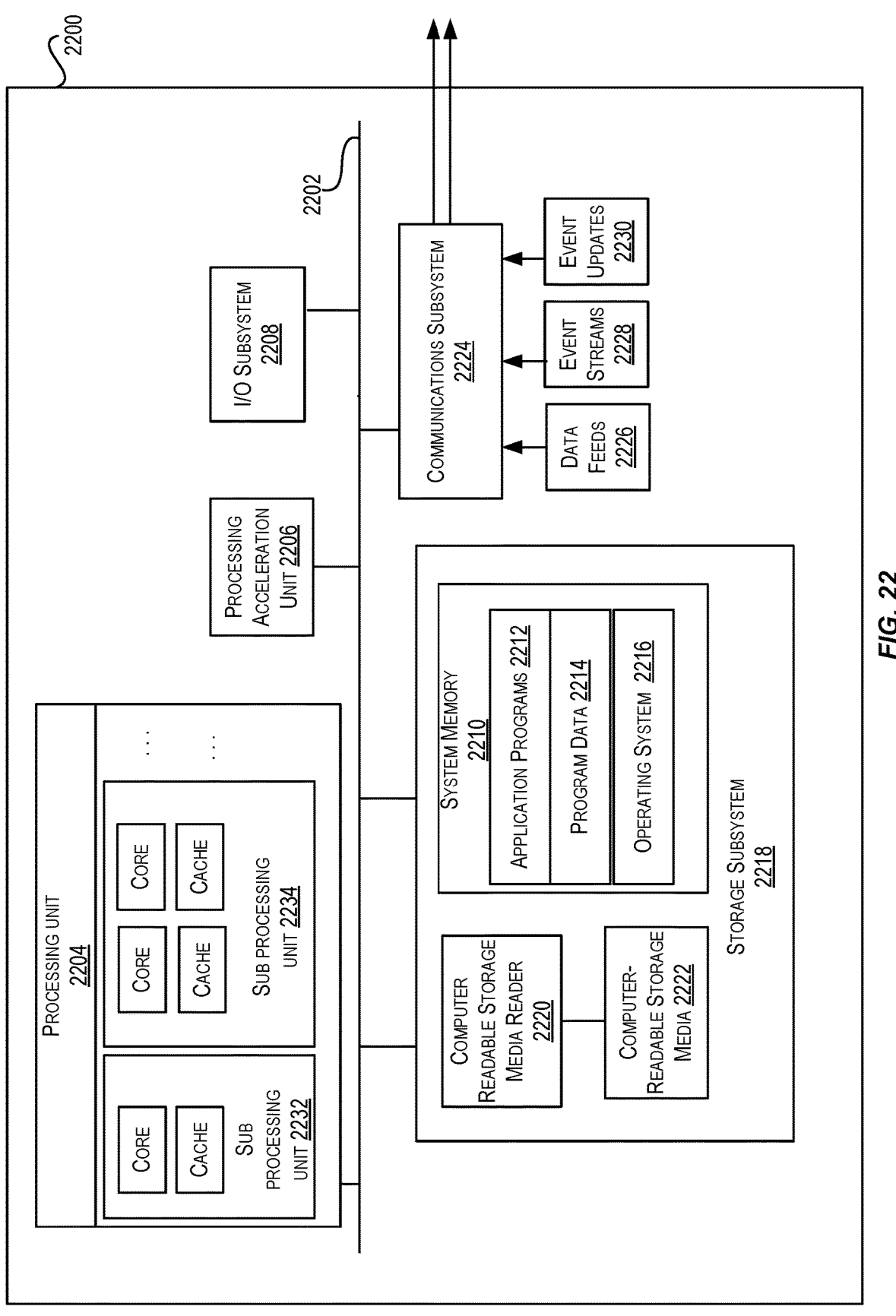
FIG. 22 is a block diagram illustrating an example computer system, according to at least one embodiment.

FIG. 21 is a block diagram 2100 illustrating another example pattern of an IaaS architecture, according to at least one embodiment. Service operators 2102 (e.g., service operators 1802 of FIG. 18) can be communicatively coupled to a secure host tenancy 2104 (e.g., the secure host tenancy 1804 of FIG. 18) that can include a virtual cloud network (VCN) 2106 (e.g., the VCN 1806 of FIG. 18) and a secure host subnet 2108 (e.g., the secure host subnet 1808 of FIG. 18). The VCN 2106 can include an LPG 2110 (e.g., the LPG 1810 of FIG. 18) that can be communicatively coupled to an SSH VCN 2112 (e.g., the SSH VCN 1812 of FIG. 18) via an LPG 2110 contained in the SSH VCN 2112. The SSH VCN 2112 can include an SSH subnet 2114 (e.g., the SSH subnet 1814 of FIG. 18), and the SSH VCN 2112 can be communicatively coupled to a control plane VCN 2116 (e.g., the control plane VCN 1816 of FIG. 18) via an LPG 2110 contained in the control plane VCN 2116 and to a data plane VCN 2118 (e.g., the data plane 1818 of FIG. 18) via an LPG 2110 contained in the data plane VCN 2118. The control plane VCN 2116 and the data plane VCN 2118 can be contained in a service tenancy 2119 (e.g., the service tenancy 1819 of FIG. 18).

The control plane VCN 2116 can include a control plane DMZ tier 2120 (e.g., the control plane DMZ tier 1820 of FIG. 18) that can include LB subnet(s) 2122 (e.g., LB subnet(s) 1822 of FIG. 18), a control plane app tier 2124 (e.g., the control plane app tier 1824 of FIG. 18) that can include app subnet(s) 2126 (e.g., app subnet(s) 1826 of FIG. 18), a control plane data tier 2128 (e.g., the control plane data tier 1828 of FIG. 18) that can include DB subnet(s) 2130 (e.g., DB subnet(s) 2030 of FIG. 20). The LB subnet(s) 2122 contained in the control plane DMZ tier 2120 can be communicatively coupled to the app subnet(s) 2126 contained in the control plane app tier 2124 and to an Internet gateway 2134 (e.g., the Internet gateway 1834 of FIG. 18) that can be contained in the control plane VCN 2116, and the app subnet(s) 2126 can be communicatively coupled to the DB subnet(s) 2130 contained in the control plane data tier 2128 and to a service gateway 2136 (e.g., the service gateway of FIG. 18) and a network address translation (NAT) gateway 2138 (e.g., the NAT gateway 1838 of FIG. 18). The control plane VCN 2116 can include the service gateway 2136 and the NAT gateway 2138.

The data plane VCN 2118 can include a data plane app tier 2146 (e.g., the data plane app tier 1846 of FIG. 18), a data plane DMZ tier 2148 (e.g., the data plane DMZ tier 1848 of FIG. 18), and a data plane data tier 2150 (e.g., the data plane data tier 1850 of FIG. 18). The data plane DMZ tier 2148 can include LB subnet(s) 2122 that can be communicatively coupled to trusted app subnet(s) 2160 (e.g., trusted app subnet(s) 2060 of FIG. 20) and untrusted app subnet(s) 2162 (e.g., untrusted app subnet(s) 2062 of FIG. 20) of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include primary VNICs 2164(1)-(N) that can be communicatively coupled to tenant virtual machines (VMs) 2166(1)-(N) residing within the untrusted app subnet(s) 2162. Each tenant VM 2166(1)-(N) can run code in a respective container 2167(1)-(N), and be communicatively coupled to an app subnet 2126 that can be contained in a data plane app tier 2146 that can be contained in a container egress VCN 2168. Respective secondary VNICs 2172(1)-(N) can facilitate communication between the untrusted app subnet(s) 2162 contained in the data plane VCN 2118 and the app subnet contained in the container egress VCN 2168. The container egress VCN can include a NAT gateway 2138 that can be communicatively coupled to public Internet 2154 (e.g., public Internet 1854 of FIG. 18).

The Internet gateway 2134 contained in the control plane VCN 2116 and contained in the data plane VCN 2118 can be communicatively coupled to a metadata management service 2152 (e.g., the metadata management system 1852 of FIG. 18) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively couple to cloud services 2156.

In some examples, the pattern illustrated by the architecture of block diagram 2100 of FIG. 21 may be considered an exception to the pattern illustrated by the architecture of block diagram 2000 of FIG. 20 and may be desirable for a customer of the IaaS provider if the IaaS provider cannot directly communicate with the customer (e.g., a disconnected region). The respective containers 2167(1)-(N) that are contained in the VMs 2166(1)-(N) for each customer can be accessed in real-time by the customer. The containers 2167(1)-(N) may be configured to make calls to respective secondary VNICs 2172(1)-(N) contained in app subnet(s) 2126 of the data plane app tier 2146 that can be contained in the container egress VCN 2168. The secondary VNICs 2172(1)-(N) can transmit the calls to the NAT gateway 2138 that may transmit the calls to public Internet 2154. In this example, the containers 2167(1)-(N) that can be accessed in real-time by the customer can be isolated from the control plane VCN 2116 and can be isolated from other entities contained in the data plane VCN 2118. The containers 2167(1)-(N) may also be isolated from resources from other customers.

In other examples, the customer can use the containers 2167(1)-(N) to call cloud services 2156. In this example, the customer may run code in the containers 2167(1)-(N) that requests a service from cloud services 2156. The containers 2167(1)-(N) can transmit this request to the secondary VNICs 2172(1)-(N) that can transmit the request to the NAT gateway that can transmit the request to public Internet 2154. Public Internet 2154 can transmit the request to LB subnet(s) 2122 contained in the control plane VCN 2116 via the Internet gateway 2134. In response to determining the request is valid, the LB subnet(s) can transmit the request to app subnet(s) 2126 that can transmit the request to cloud services 2156 via the service gateway 2136.

It should be appreciated that IaaS architectures 1800, 1900, 2000, 2100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 22 illustrates an example computer system 2200, in which various embodiments may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all types of devices and mechanisms for outputting information from computer system 2200 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 2200 may comprise a storage subsystem 2218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2204 provide the functionality described above. Storage subsystem 2218 may also provide a repository for storing data used in accordance with the present disclosure.

As depicted in the example in FIG. 22, storage subsystem 2218 can include various components including a system memory 2210, computer-readable storage media 2222, and a computer readable storage media reader 2220. System memory 2210 may store program instructions that are loadable and executable by processing unit 2204. System memory 2210 may also store data that is used during the execution of the instructions and/or data that is generated during the execution of the program instructions. Various different kinds of programs may be loaded into system memory 2210 including but not limited to client applications, Web browsers, mid-tier applications, relational database management systems (RDBMS), virtual machines, containers, etc.

System memory 2210 may also store an operating system 2216. Examples of operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2200 executes one or more virtual machines, the virtual machines along with their guest operating systems (GOSs) may be loaded into system memory 2210 and executed by one or more processors or cores of processing unit 2204.

System memory 2210 can come in different configurations depending upon the type of computer system 2200. For example, system memory 2210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2210 may include a basic input/output system (BIOS) containing basic routines that help to transfer information between elements within computer system 2200, such as during start-up.

Computer-readable storage media 2222 may represent remote, local, fixed, and/or removable storage devices plus storage media for temporarily and/or more permanently containing, storing, computer-readable information for use by computer system 2200 including instructions executable by processing unit 2204 of computer system 2200.

Computer-readable storage media 2222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Machine-readable instructions executable by one or more processors or cores of processing unit 2204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments, and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    receiving, at a source network virtualization device (NVD) associated with a source compute instance, an overlay packet originating at the source compute instance and to be communicated to a destination compute instance, the overlay packet comprising an overlay packet header;
    extracting, by the source NVD from the overlay packet header, a first encoded address for the destination compute instance;
    determining, by the source NVD, first information from a first section of the first encoded address;
    determining, by the source NVD, second information from a second section of the first encoded address;
    adding, by the source NVD, an encapsulation header to the overlay packet to create an encapsulated overlay packet;
    including, by the source NVD, the first information in a first field of the encapsulation header;
    including, by the source NVD, the second information in a second field of the encapsulation header; and
    communicating, utilizing the encapsulation header, the encapsulated overlay packet from the source NVD to a destination NVD associated with the destination compute instance.

2. The method of claim 1, wherein:
    the first information includes a substrate IP address for the destination NVD; and
    the first field is a destination address field in the encapsulation header.

3. The method of claim 2, wherein:
    the second information includes an identifier identifying a destination virtual network interface card (VNIC) associated with the destination compute instance and implemented by the destination NVD, wherein the destination VNIC enables communications to and from the destination compute instance.

4. The method of claim 3 further comprising:
    including, by the source NVD, a substrate address of the source NVD in a source address field of the encapsulation header.

5. The method of claim 1, wherein the first encoded address for the destination compute instance further comprises:
    a third section that includes an identifier assigned to an overlay IP address of the destination compute instance.

6. The method of claim 5 wherein the first encoded address for the destination compute instance further comprises:
    a fourth section that includes information indicating that the first encoded address is a special address encoding multiple pieces of information.

7. The method of claim 6 wherein the first encoded address for the destination compute instance further comprises:
    a fifth section that includes information indicating a tunnel type.

8. The method of claim 1 wherein the source NVD implements a source virtual network interface card (VNIC) associated with the source compute instance.

9. The method of claim 1 wherein communicating the encapsulated overlay packet from the source NVD to the destination NVD comprises using a tunneling protocol to communicate the encapsulated overlay packet from the source NVD to the destination NVD.

10. The method of claim 1, further comprising:
    including, by a source host machine executing the source compute instance, the first encoded address in a destination address field of the overlay packet header; and
    including, by the source host machine, an overlay address of the source compute instance in a source address field of the overlay packet header.

11. The method of claim 10, wherein the first encoded address is received by the source host machine from a domain name system (DNS) server in response to a request initiated by the source host machine to resolve a fully qualified domain name (FQDN) associated with the destination compute instance.

12. The method of claim 1, further comprising:
    generating, by the source NVD, a second encoded address for the source compute instance; and
    updating, by the source NVD, a source address field of the overlay packet header to include the second encoded address.

13. The method of claim 12, further comprising:
    receiving, by the destination NVD, the encapsulated overlay packet communicated from the source NVD;
    decapsulating, by the destination NVD, the encapsulated overlay packet to obtain the overlay packet, wherein the first encoded address is included in a destination address field of the overlay packet header of the overlay packet;
    determining, by the destination NVD and from the first encoded address in the overlay packet header, an overlay IP address of the destination compute instance;
    updating, by the destination NVD, the destination address field of the overlay packet header to include the overlay IP address of the destination compute instance; and
    communicating the overlay packet to a destination host machine executing the destination compute instance.

14. The method of claim 13 further comprising:
    receiving, by the destination host machine, the overlay packet communicated from the destination NVD; and forwarding, by the destination host machine and based upon the overlay IP address of the destination compute instance included in the destination address field of the overlay packet header, the overlay packet to the destination compute instance.

15. The method of claim 1 wherein the source compute instance is on a first overlay network and the destination compute instance is on a second overlay network that is different from the first overlay network.

16. A system comprising:
a source host machine executing a source compute instance; and
a source network virtualization device (NVD) associated with the source compute instance, the source NVD implementing a source virtual network interface card (VNIC) associated with the destination compute instance;
wherein the source NVD is configured to:
receive an overlay packet originating at the source compute instance and to be communicated to a destination compute instance, the overlay packet comprising an overlay packet header;
extract a first encoded address from the overlay packet header;
determine first information from a first section of the first encoded address;
determine second information from a second section of the first encoded address;
add an encapsulation header to the overlay packet to create an encapsulated overlay packet;
include the first information in a first field of the encapsulation header;
include the second information in a second field of the encapsulation header; and
communicate the encapsulated overlay packet to a destination NVD associated with the destination compute instance.

17. The system of claim 16 wherein:
the first information includes a substrate IP address for the destination NVD;
the first field is a destination address field in the encapsulation header; and
the second information includes an identifier identifying a destination virtual network interface card (VNIC) associated with the destination compute instance and implemented by the destination NVD, wherein the destination VNIC enables communications to and from the destination compute instance.

18. The system of claim 16 wherein the first encoded address is received from a domain name system (DNS) server in response to a request to resolve a fully qualified domain name (FQDN) associated with the destination compute instance.

19. The system of claim 16:
wherein the source NVD is configured to:
generate a second encoded address for the source compute instance, and
update a source address field of the overlay packet header to include the second encoded address; and
wherein the destination NVD is configured to:
receive the encapsulated overlay packet communicated from the source NVD,
decapsulate the encapsulated overlay packet to obtain the overlay packet, wherein the first encoded address is included in a destination address field of the overlay packet header of the overlay packet,
determine, from the first encoded address in the overlay packet header, an overlay IP address of the destination compute instance,
update the destination address field of the overlay packet header to include the overlay IP address of the destination compute instance, and
communicate the overlay packet to a destination host machine executing the destination compute instance.

20. A non-transitory computer-readable medium storing a set of instructions, the set of instructions when executed by one or more processors cause processing to be performed comprising:
receiving an overlay packet originating at a source compute instance and to be communicated to a destination compute instance, the overlay packet comprising an overlay packet header;
extracting, from the overlay packet header, a first encoded address for the destination compute instance;
determining first information from a first section of the first encoded address;
determining second information from a second section of the first encoded address;
adding an encapsulation header to the overlay packet to create an encapsulated overlay packet;
including the first information in a first field of the encapsulation header;
including the second information in a second field of the encapsulation header; and
communicating, utilizing the encapsulation header, the encapsulated overlay packet;
wherein the first information includes a substrate IP address for the destination NVD the first field is a destination address field in the encapsulation header; and
wherein the second information includes an identifier identifying a destination virtual network interface card (VNIC) associated with the destination compute instance, wherein the destination VNIC enables communications to and from the destination compute instance.

* * * * *